United States Patent
Gunderson et al.

(10) Patent No.: US 6,268,803 B1
(45) Date of Patent: Jul. 31, 2001

(54) SYSTEM AND METHOD OF AVOIDING COLLISIONS

(75) Inventors: Richard A. Gunderson, Eden Prairie, MN (US); Michael A. Parisi; Richard P. Gorman, both of Jamison, PA (US); Kurtis W. Melin, Forest Lake, MN (US)

(73) Assignee: Altra Technologies Incorporated, Eden Prairie, MN (US)

( * ) Notice: Subject to any disclaimer, the term of this patent is extended or adjusted under 35 U.S.C. 154(b) by 0 days.

(21) Appl. No.: 09/130,279

(22) Filed: Aug. 6, 1998

(51) Int. Cl.[7] ................................................. G08G 1/16
(52) U.S. Cl. .................. 340/903; 340/431; 340/436; 340/53; 367/99; 180/168; 343/7; 179/146
(58) Field of Search .................... 340/903, 431, 340/436, 53; 367/99; 180/168; 343/7; 179/146

(56) References Cited

U.S. PATENT DOCUMENTS

| Re. 31,509 | 1/1984 | Neidell .................... 343/9 R |
|---|---|---|
| 3,707,708 | 12/1972 | Dan ...................... 340/213.2 |
| 3,797,309 | 3/1974 | Joy et al. ................. 73/194 B |
| 3,891,966 | * 6/1975 | Szatankay ................... 340/53 |
| 3,978,481 | 8/1976 | Angwin et al. ............. 343/7 VM |
| 4,056,761 | 11/1977 | Jacoby et al. .............. 318/116 |
| 4,072,945 | 2/1978 | Katsumata et al. ......... 343/7 VM |
| 4,104,632 | 8/1978 | Fujiki et al. ............. 343/7 VM |
| 4,125,826 | 11/1978 | Rasmussen et al. ........... 340/63 |
| 4,146,891 | 3/1979 | Fujiki et al. ............ 343/77 VM |
| 4,148,028 | 4/1979 | Fujiki ....................... 343/7 |
| 4,158,841 | 6/1979 | Wuchner et al. ........... 343/7 VM |
| 4,162,488 | 7/1979 | Silverman et al. ........... 340/505 |
| 4,204,096 | 5/1980 | Barcus et al. ............ 179/146 R |
| 4,308,536 | 12/1981 | Sims, Jr. et al. ............. 343/7 |
| 4,379,497 | * 4/1983 | Hainsworth et al. .......... 180/168 |
| 4,489,321 | 12/1984 | Hoffa et al. ................. 343/8 |
| 4,537,271 | 8/1985 | Ito et al. ................... 180/131 |
| 4,546,840 | 10/1985 | Yukishige et al. ............ 180/169 |

(List continued on next page.)

OTHER PUBLICATIONS

Blind–Sight Product Brochure, (May 7, 1996).
Sonar Safety Systems Product, (1996).
ECCO SCAN Product Literature, (1996).
"Driver's Manual for the CL–400 Reverse Parking Aid", TICI Software Systems Ltd. and Silcon Heights Ltd., In: Rechovot, Israel, 1–9, (Jun., 1997).
Benites, E., "A Demonstration of Multisensor Tracking", Naval Weapons Center, China Lake, CA, 307–311.
Blackman, S.S., Multiple —Target Tracking with Radar Applications, Artech House, Inc., Norwood, MA, pp. 98–107, 280–299,, (1986).

*Primary Examiner*—Daniel J. Wu
*Assistant Examiner*—Tai T. Nguyen
(74) *Attorney, Agent, or Firm*—Schwegman, Lundberg, Woessner & Kluth, P.A.

(57) ABSTRACT

A collision avoidance system including a control module, a first transmitting device connected to the control module, wherein the first transmitting device transmits a signal, a first receiving device connected to the control module, wherein the first receiving device receives a return of the signal transmitted from the first transmitting device and transmits a first return signal representative of the return to the control device, a second transmitting device connected to the control module, wherein the second transmitting device transmits a signal, and a second receiving device connected to the control module device, wherein the second receiving device receives a return of the signal transmitted from the second transmitting device and transmits a second return signal representative of the return to the control device, wherein the control module includes measurement circuitry used to measure the first and second return signals and display means for displaying a transverse location of an object as a function of said first and second return signals.

28 Claims, 35 Drawing Sheets

U.S. PATENT DOCUMENTS

| | | | |
|---|---|---|---|
| 4,580,251 | 4/1986 | Koukovinis | 367/140 |
| 4,612,530 | 9/1986 | Kurth | 340/63 |
| 4,679,175 | 7/1987 | Eder et al. | 367/98 |
| 4,681,431 | 7/1987 | Sims et al. | 356/4 |
| 4,692,764 | 9/1987 | Bonar | 342/71 |
| 4,737,788 | 4/1988 | Kennedy | 342/29 |
| 4,759,063 | 7/1988 | Chaum | 380/30 |
| 4,759,064 | 7/1988 | Chaum | 380/30 |
| 4,815,046 | 3/1989 | Dorr | 367/95 |
| 4,823,042 | 4/1989 | Coffey et al. | 310/322 |
| 4,920,520 | 4/1990 | Gobel et al. | 367/99 |
| 4,953,141 | 8/1990 | Novak et al. | 367/108 |
| 5,029,290 | 7/1991 | Parsons et al. | 340/533 |
| 5,059,946 | 10/1991 | Hollowbush | 340/435 |
| 5,153,559 | 10/1992 | Atsumi | 340/435 |
| 5,181,011 | 1/1993 | Okano | 340/438 |
| 5,212,467 | 5/1993 | Park et al. | 340/435 |
| 5,235,316 | 8/1993 | Qualizza | 340/436 |
| 5,249,163 | 9/1993 | Erickson | 367/149 |
| 5,251,188 | 10/1993 | Parsons et al. | 367/140 |
| 5,286,099 | 2/1994 | Fujita et al. | 303/103 |
| 5,373,482 | 12/1994 | Gauthier | 367/99 |
| 5,389,912 | 2/1995 | Arvin | 340/435 |
| 5,418,359 | 5/1995 | Juds et al. | 250/221 |
| 5,424,747 | 6/1995 | Chazelas et al. | 342/70 |
| 5,455,557 | 10/1995 | Noll et al. | 340/431 |
| 5,471,215 | 11/1995 | Fukuhara | 342/70 |
| 5,483,501 | 1/1996 | Park et al. | 367/140 |
| 5,485,892 | 1/1996 | Fujita | 180/167 |
| 5,517,197 | 5/1996 | Algeo et al. | 342/70 |
| 5,541,891 | 7/1996 | Waldmann et al. | 367/99 |
| 5,572,428 | 11/1996 | Ishida et al. | 364/461 |
| 5,583,479 | 12/1996 | Hettich et al. | 340/426 |
| 5,587,938 | 12/1996 | Hoetzel | 364/578 |
| 5,653,922 | * 8/1997 | Cho et al. | 340/903 |
| 5,684,474 | * 11/1997 | Gilon et al. | 340/903 |
| 5,714,947 | * 2/1998 | Richardson et al. | 340/903 |
| 5,734,336 | * 3/1998 | Smithline | 340/803 |
| 5,767,793 | * 6/1998 | Avravante et al. | 340/903 |

* cited by examiner

SYSTEM AND METHOD OF AVOIDING COLLISIONS

BACKGROUND OF THE INVENTION

1. Field of the Invention

The present invention relates generally to sensor-based systems, and more particularly to a multi-sensor collision avoidance system which combines data from two or more sensors to provide range, range rate, or location information.

2. Background Information

The roads are becoming more and more congested with vehicular traffic. As traffic congestion has increased, the number of accidents has also increased. Some of these accidents can be traced to driver inattentiveness or to the failure of the driver to see another vehicle. What is needed is a system and method for warning drivers of possible problems before the problems result in an accident.

Systems for making drivers aware of objects external to their vehicle have been around for a long time. Mirrors, and sometimes combinations of mirrors, are being used to reveal locations hidden to the driver's view (i.e. "blind spots"). Mirrors, however, have a deficiency in that the driver can only look in one spot at any one time. If they look behind the vehicle, see that the way is clear, start looking elsewhere and then a vehicle pulls behind them, they won't see it and may back into the vehicle. There is a similar problem with changing lanes. Mirrors don't work well in changing lanes, particularly in tractor-trailer rigs, since, as soon as the rig begins to turn, the mirror that looked down along the side of the vehicle is directed into the side of the trailer and the driver is blinded to activity on that side of his truck.

More recently, trucking and bussing companies have used backup alarms to warn bystanders that the truck is backing. The problem with backup alarms is that if you have somebody with a hearing problem, or if you had an immovable object such as a car or a trash container, the alarm isn't going to move that object out of the way.

Companies have also experimented with the use of video systems to view blind spots. For example, garbage pickup trucks for Browning-Ferris are using video systems which have a video camera installed on the back of the truck and a monitor up in the cab. Some recreational vehicle (RV) owners are doing the same thing. The problem with the video system approach is that such systems are expensive (even if you use an inexpensive approach, it would likely cost into the $1,000–$1,500 price range) and video monitors mounted in the cab can distract the driver from what is happening outside his vehicle. Finally, video lenses do not give depth perception. So, when drivers are backing a vehicle, they don't know how close they are to an object they are trying to avoid.

A final approach taken by a number of companies is the use of sensors to locate objects external to the vehicle. Electronic Controls Company of Boise, Idaho sells an ultrasonic sensor system that assists drivers in determining all is clear before the driver changes lanes, backs up or docks. The system includes ultrasonic sensors mounted on the back and sides of the vehicle and an alert module mounted in the cab of the vehicle. Each ultrasonic sensor continuously monitors a defined detection zone for objects moving within the zone. When a vehicle enters the detection zone, the sensor measures the time between sending the sound wave and receiving its reflection and sends that measurement to the cab.

Sonar Safety Systems of Santa Fe Springs, Calif. has a rear-mounted sensor system which detects objects in three distance zones from the rear of the vehicle. That is, it doesn't display distance to the object. Instead, the system provides alarms and audible feedback that inform the driver whether the obstacle is real close (Zone III), out a little farther (Zone II), or even farther out yet (Zone I). And it only looks up to 8 feet behind the vehicle. They also have a single sensory unit where they only put one sensor in the back.

A common problem with rear-mounted sensors to date is that sensors mounted on the rear of the vehicle detect the distance from the sensor to the object, not the perpendicular distance from the vehicle to the object. In addition, these systems do not communicate to the driver the transverse location of the object (i.e., is the object directly behind the vehicle, off to the side, or far enough to the left or right that the driver will not hit it). Furthermore, range measurement often does not exist, or is inaccurate.

The collision avoidance systems used to date are deficient in other ways as well. For instance, the systems provide only partial coverage around the periphery of the vehicle. That is, they either lack a forward-looking detection capability, lack range and range rate measurement capability or they lack sufficient detection capability around the periphery of the vehicle to eliminate blind spots. Furthermore, even if present, range measurement often is inaccurate. Finally, those systems which do have forward-looking detection are prone to a high rate of false alarms from the environment or to distracting off-the-road clutter.

Systems to date do not provide an adequate solution for the combination tractor-trailer rig. Armatron International of Melrose, Massachusetts has a side and rear obstacle detection system which includes wireless communications between the tractor and trailer, however, the sensors are all hard-wired to the trailer. This does not address the need in which tractors often are required to pull a multitude of trailers, some of which are owned by different companies, which are not likely to be equipped with any sensors.

Finally, systems to date lack the programmability to address the configuration and installation variables that influence the integrity of the sensor data. In addition, current systems are designed such that changes in the transmitted sensor frequency require a redesign of the software algorithms.

What is needed is a collision avoidance system and method which avoids these deficiencies.

SUMMARY OF THE INVENTION

The present invention is a collision avoidance system. The collision avoidance system includes a control module, a first transmitting device connected to the control module, wherein the first transmitting device transmits a signal, a first receiving device connected to the control module, wherein the first receiving device receives a return of the signal transmitted from the first transmitting device and transmits a first return signal representative of the return to the control device, a second transmitting device connected to the control module, wherein the second transmitting device transmits a signal, and a second receiving device connected to the control module device, wherein the second receiving device receives a return of the signal transmitted from the second transmitting device and transmits a second return signal representative of the return to the control device, wherein the control module includes measurement circuitry used to measure the first and second return signals and display means for displaying a transverse location of an object as a function of said first and second return signals.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
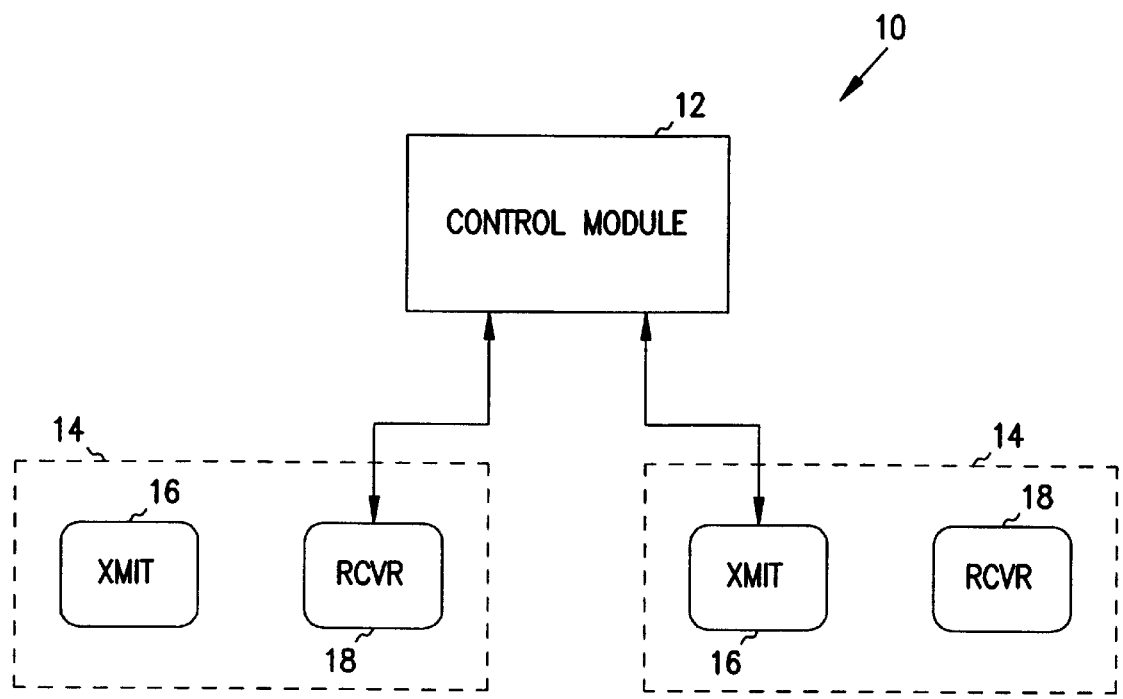
FIG. 1 shows a collision avoidance system.

FIG. 1 shows a collision avoidance system 10 according to the present invention. System 10 includes a Control module 12 and two sensors 14. Each sensor 14 includes a transmitter 16 and a receiver 18. In one embodiment, transmitter 16 and receiver 18 are mounted together in a single sensor housing. In another embodiment, transmitter 16 and receiver 18 are mounted in separate housings.

In one embodiment, sensors 14 include separate acoustic transducers for each of transmitter 16 and receiver 18. In another embodiment, a single acoustic transducer is used for both transmitting a signal and receiving its echo. Some transducers which would operate in such a system 10 are the 9000 Series Piezo Transducers available from Polaroid OEM Components Group and the KSN 6530 45 KHz transducer available from Motorola. In addition, the KSN 6529 45 KHz transducer available from Motorola could be used for receiver 18.

In another embodiment, sensors 14 are micropower impulse radar (MIR) devices. In one embodiment, MIR devices such as those described in the white paper entitled "Microwave Impulse Radar (MIR) Technology Overview", available from Lawrence Livermore National Laboratory, are used. The advantage of such devices are that they are low power and fairly inexpensive. In addition, a single device can be used as both transmitter 16 and receiver 18.

In yet another embodiment, sensors 14 are microwave transceiver devices. In one such embodiment, each transceiver includes a small integrated antenna and electronic interface board. In another embodiment, sensors 14 include both proximity detectors 14.1 and longer range detectors 14.2. The longer range detectors incorporate a larger antenna to operate as a Doppler Radar Forward Looking Detector. An example of one such transducer is the model DRO3000 Microwave Transceiver Module available from Advanced Frequency Products of Andover, Mass.

Figure 2:
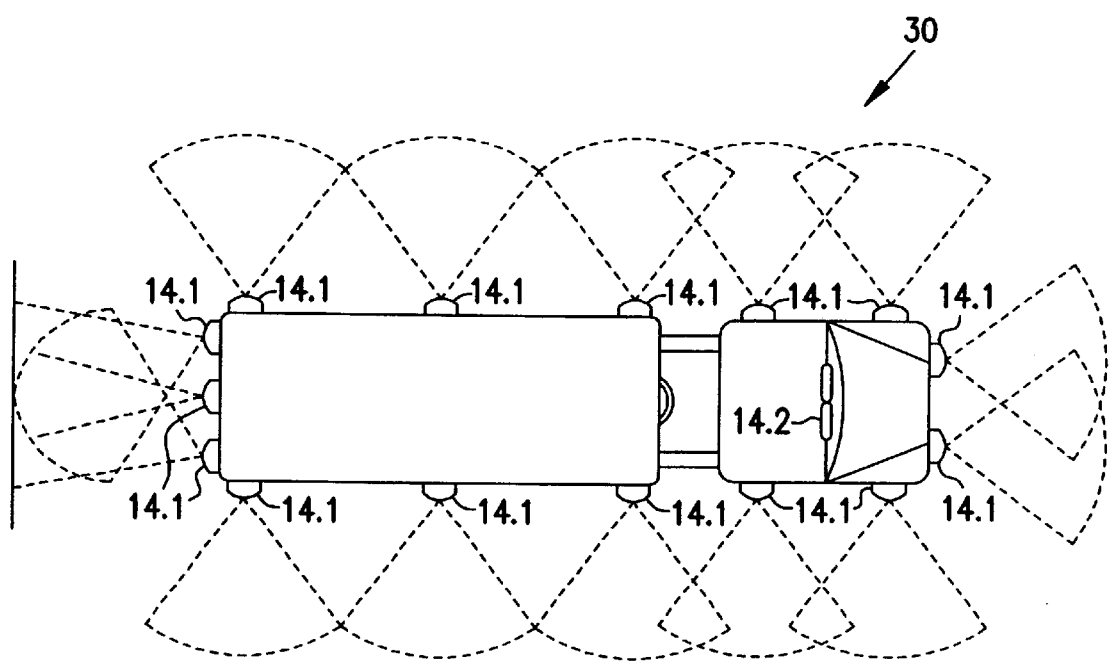
FIG. 2 shows a more complex embodiment of the collision avoidance system shown in FIG. 1.

In one embodiment, such as is shown in FIG. 2, a collision avoidance system 30 includes up to seventeen sensors 14 mounted around the periphery of a vehicle.

Figure 3:
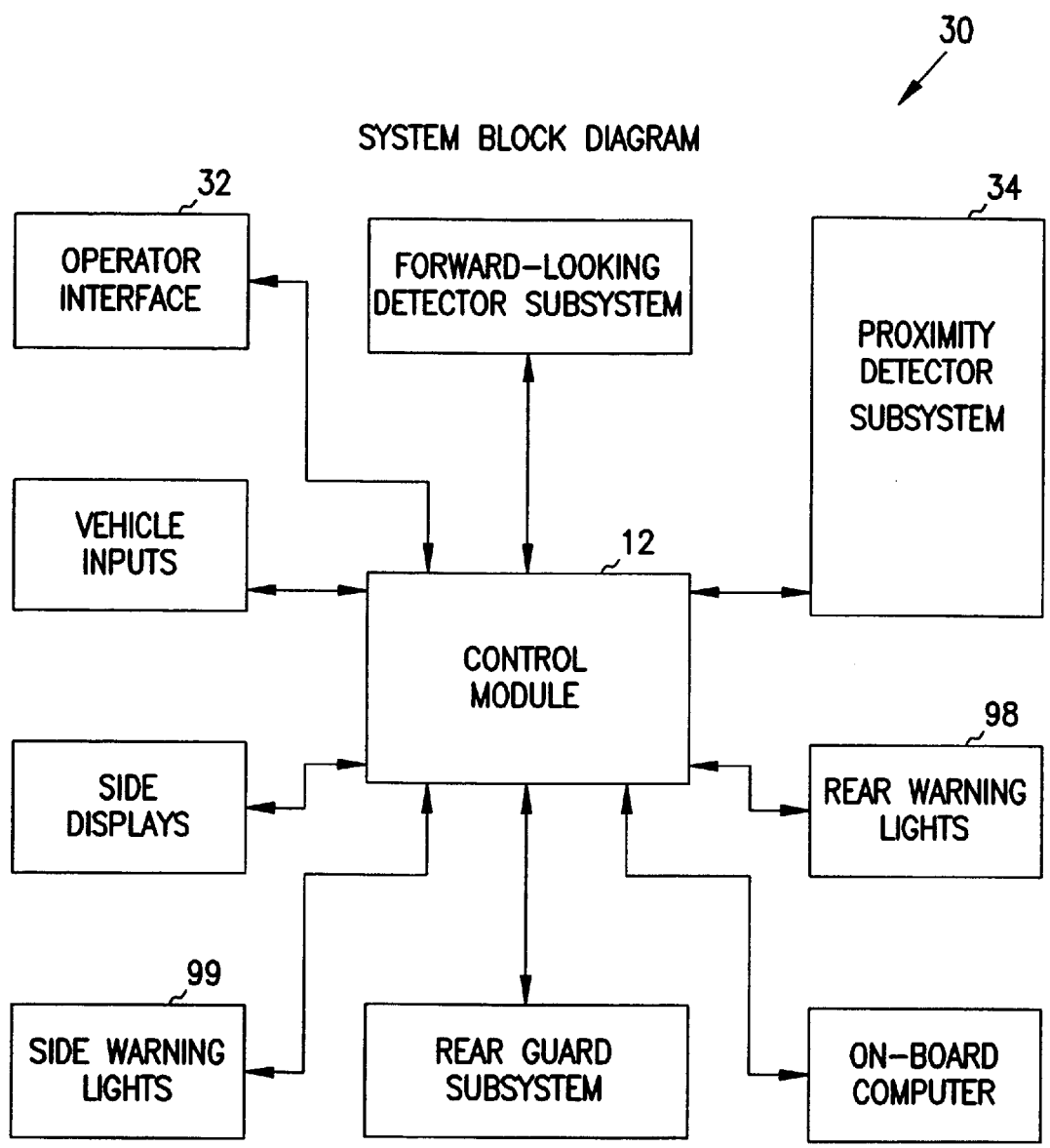
FIG. 3 is a system block diagram of the collision avoidance system according to FIG. 2.

In one embodiment, sensors 14 of system 30 are grouped in proximity detection subsystems 34. The output from each detection subsystem 34 is fed into Control module 12, as is shown in FIG. 3. As shown in FIG. 3, system 30 includes a Control module 12, an operator interface 32, and two sensors 14. Each sensor includes a transmitter 16 and receiver 18.

In one such embodiment, sensors 14 of system 30 are grouped in detection subsystems: namely, forward-looking detector subsystem (with 2 sensors), proximity detector subsystem (with up to 15 sensors), and a rear-guard subsystem (with up to 7 sensors). The output of each sensor in each detection subsystem is fed into control module 12, as shown in FIG. 3. As shown in FIG. 3, system 30 includes a control module 12, an operator interface 32, and other optional system features. In one embodiment optional system features include rear warning lights 98 and side warning lights 99. Each sensor includes a transmitter 16 and receiver 18.

Collision avoidance systems to date typically put transducers on the rear of the vehicle and measure the distance from the sensor to the object. This is not optimal since those sensors are transmitting in an arc. They are looking at the distance from the sensor to the object and back again. That may not, however, be the perpendicular distance from the vehicle to the object. A deficiency, therefore, of systems to date is that they do not communicate to the driver the transverse location of this object.

Figure 4A:
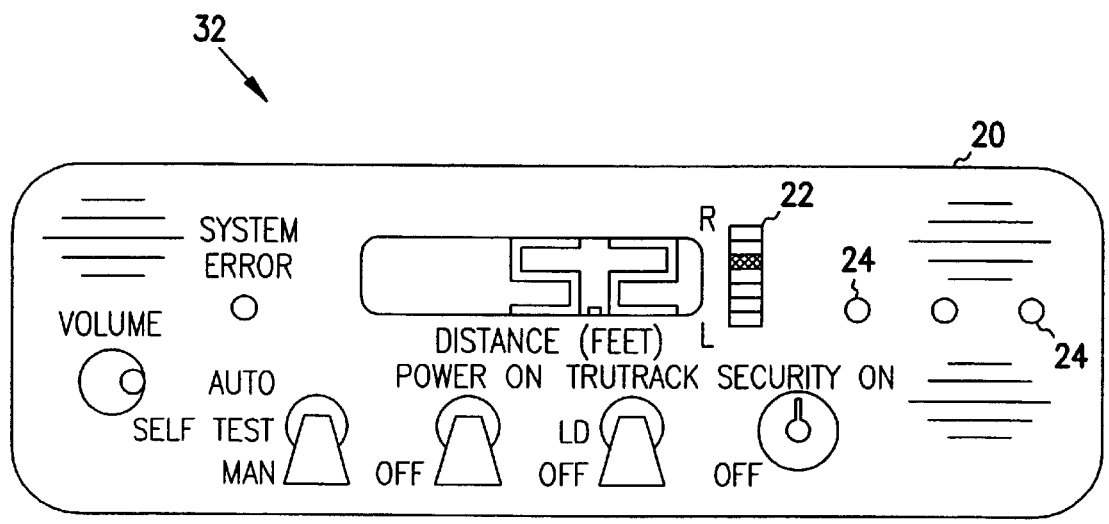
FIGS. 4a–c show operator interface units which can be used with the Control modules of FIGS. 1 and 3.
Figure 4B:
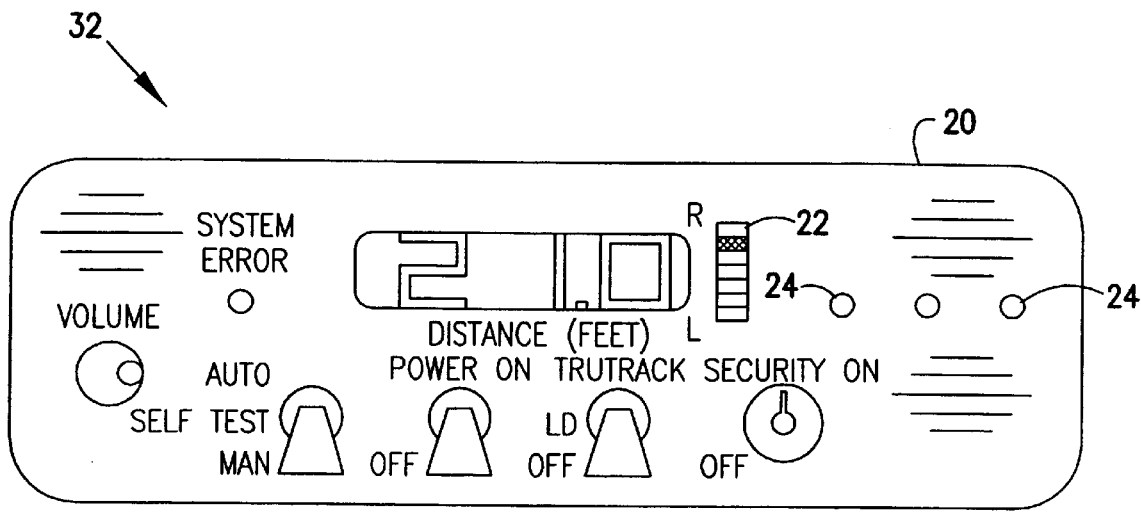
Figure 4C:
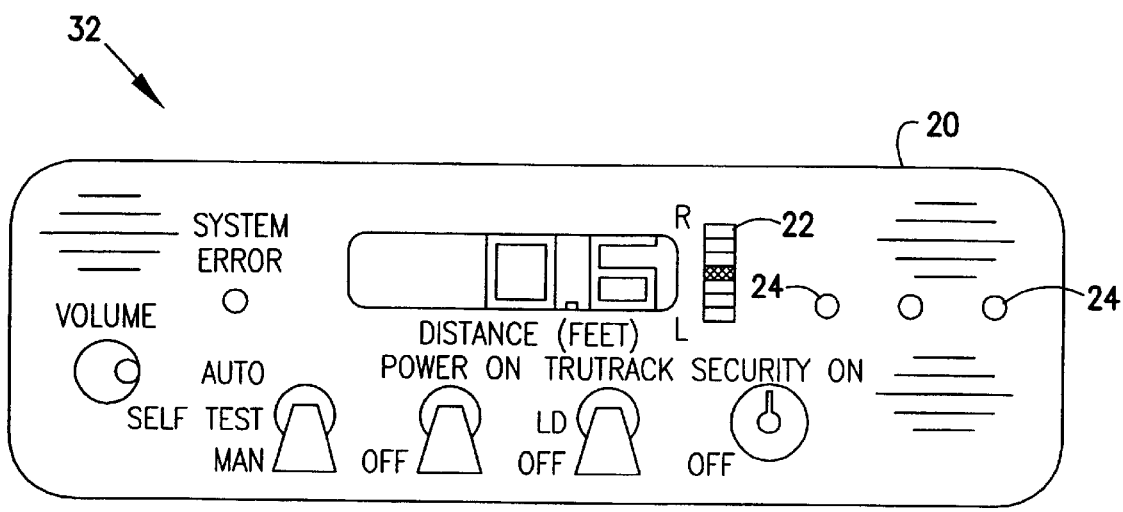

In one embodiment of the system shown in FIGS. 1 and 2, a plurality of sensors 14 are mounted on the back of the vehicle. Control module 12 takes the readings from the rear-mounted sensors 14, determines whether it can triangulate and calculates an actual perpendicular distance from the truck to the object. This is important because the truck driver really wants to know, not that the object is off at this angle over here five feet away, is how far he can back up before he hits the object. Examples of these measurements are shown in FIGS. 4a–c and 5a–c. In contrast to other approaches, this triangulation procedure makes system 10 a precision distance measuring system. Alternate approaches to the operator interfaces shown in FIGS. 4a–c are shown in FIGS. 6a–c.

Figure 5A:
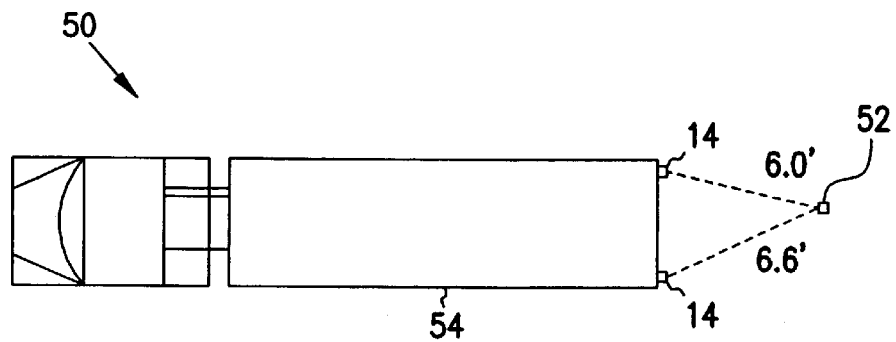
FIGS. 5a–c show the operation of two rear-mounted sensors according to the present invention.
Figure 6A:
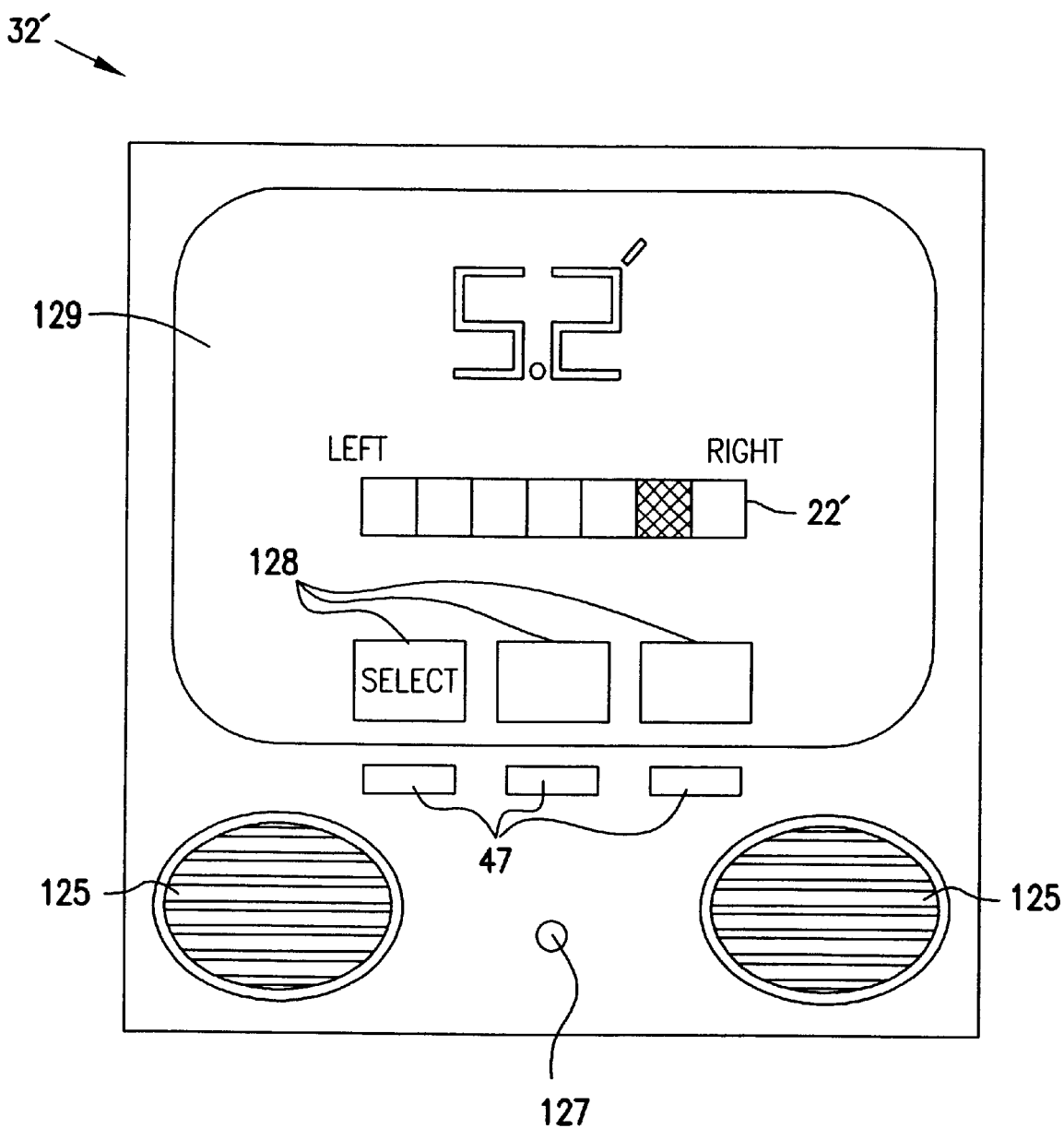
FIGS. 6a–c show an alternate embodiment of the operator interface units of FIGS. 4a–c.
Figure 6B:
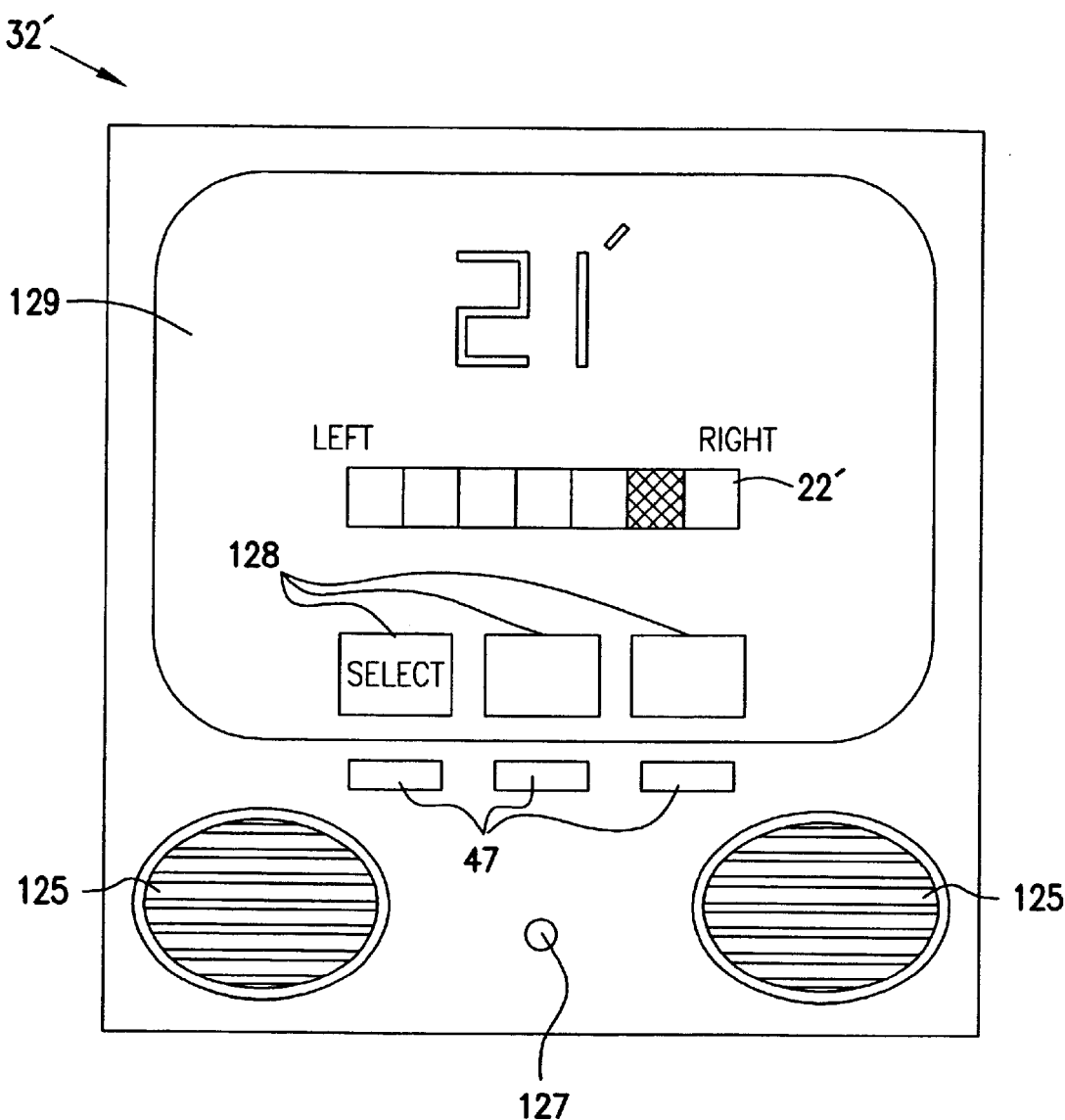
Figure 6C:
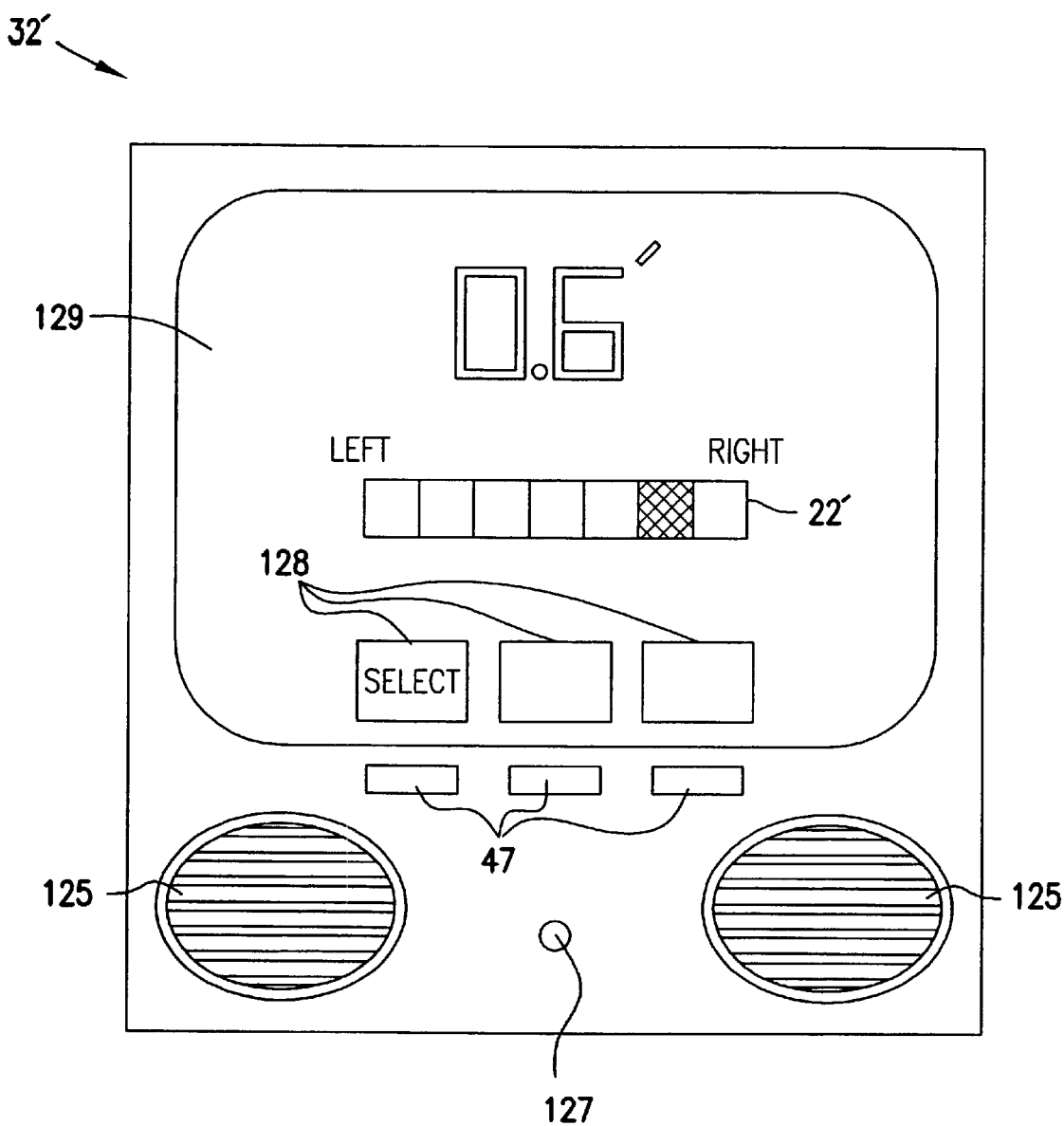

FIG. 5a represents the top view of a tractor trailer rig 50 with a post 52 located behind the trailer 54. The post 50 represents a hazard unless the driver knows the precise distance from the vehicle. Sensor 14 on the right rear of the trailer senses the post 52 at a distance of six (6) feet. Sensor 14 on the left rear of the trailer senses the post at a distance of just over six and one half (6.5) feet. Control System 12 calculates that the actual distance to the post as 5.2 feet and determines it is located just to the right of the center of the trailer. The distance is then displayed digitally on the control module 12. The transverse location is displayed, for instance, on the bar graph located just to the right of the digital display and it indicates the location of the post.

Perpendicular distance between the rear of a vehicle and external objects is increasingly important the closer the vehicle gets to an external object. In the same example as above, when sensor 14 on the right rear of the trailer senses the post at a distance of four (4) feet and the sensor 14 on the left rear senses the post at a distance of 4.8 feet, the actual perpendicular distance is 2.6 feet. The Precision Measurement System correctly uses the sensor 14 distance readings as well as the known distance between the left and right sensors 14 to calculate the exact perpendicular distance to the post. This is very important as an aid to the driver in the prevention of an accident.

In one embodiment, a third sensor 14 is mounted between the right and left sensors 14. With the aid of third sensor 14, the system can determine that the object is a point source (such as a post) as opposed to a wall or large vehicle. The sensor 14 on the right rear of the trailer senses the post at a distance of six (6) feet. The sensor 14 on the left rear of the trailer senses the post at a distance of just over six and one half (6.6) feet. The Control module 12, knowing that the object is a point source, calculates that the actual distance to the post is 5.2 feet and is located just to the right of the center of the trailer. The distance is displayed digitally on the Operator Interface and Side Display Modules. The transverse location is displayed in graphic form (e.g. bar graph) on the Operator Interface.

Figure 5B:
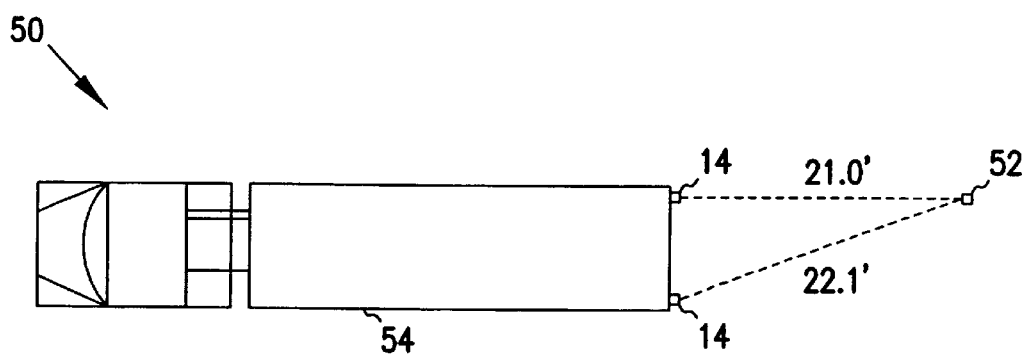

FIG. 5b represents the top view of a tractor trailer rig with a post located far behind the trailer. The post represents a hazard unless the driver has sufficient information to aid in maneuvering around the obstacle. The sensor 14 on the right rear of the trailer senses the post at a distance of 21.0 feet. The sensor 14 on the left rear of the trailer senses the post at a distance of 22.1 feet. The control module 12 calculates that the actual distance to the post is 21.0 feet, and that it is located near the right side of the trailer. The distance is displayed digitally on the operator interface. The transverse location is displayed on the bar graph located just to the right of the digital display and it indicates the location. Precision distance measurement is less of a concern when obstacles are a long distance from the rear of the vehicle. However, productivity is a concern. With the aid of the transverse location information and the ability of the control module 12 to detect objects up to 25 feet behind the vehicle, the driver of the tractor trailer shown in FIG. 5b can readily maneuver the vehicle to avoid the obstacle without having to stop, drive forward, and then proceed in backing the vehicle.

In order to triangulate, the distance between sensors 14 must be known. Therefore, the distance between sensors 14 must be controlled. In one embodiment, the distance between sensors 14 is a system parameter that can be programmed. In one such programmable embodiment, a programming device is provided to a dealer or a fleet owner such that once sensors 14 are installed, they can measure the actual distance between the sensors and the distance from the sensors to the sides of the vehicle and program that into control module 12. Control module 12 can then accurately calculate distance.

For example, if a collision avoidance system 10 or 20 provides a measurement, is that object directly behind the vehicle, or is it off to the left or right? Is it actually far enough off to the left or far enough off to the right that he won't hit it but needs to be aware of it? To provide more accurate information, in one embodiment, control module 12 calculates transverse location and communicates that information via a graphical indicator such as bar graph 22 of FIG. 4a (also shown as 22' in FIG. 6a).

In the embodiment shown in FIGS. 4a–c and 6a–c, the purpose of the bar graph display is to break the transverse set of distances or locations, up into anywhere from 7 to 11 or more segments on the bar graph display. Control module 12 lights the segments that indicate where that object is from extreme left to extreme right. In another embodiment, transverse location is communicated through another graphic display, (e.g., a Liquid Crystal or other Display). In addition, in one embodiment transverse location is displayed through a little video monitor. In one such embodiment, operator interface unit 32 displays an area behind the vehicle and places a dot within that area showing the closest object. A representation such as is shown in FIG. 5a would be sufficient.

Another issue is the vertical position of the rear-mounted transducers, relative to the ground, and relative to the impact point with a loading dock, is an important issue. For example, loading docks have an impact plank that protrudes out from the wall. If sensors 14 are mounted too low, you may actually look underneath the impact plank. If so, the truck could hit the plank under power with the driver thinking he or she had another 4–6 inches to go. In one embodiment, system 10 includes vertical compensation as discussed below.

In one embodiment, vertical compensation is activated automatically when the front panel switch in FIG. 4c or the soft key in FIG. 6c is in the Loading Dock (LD) position. The purpose of this feature is to compensate for the protrusion of loading dock impact pads in cases where the Transducer Assembly is located below the point of impact of the trailer with the loading dock impact bar.

Figure 5C:
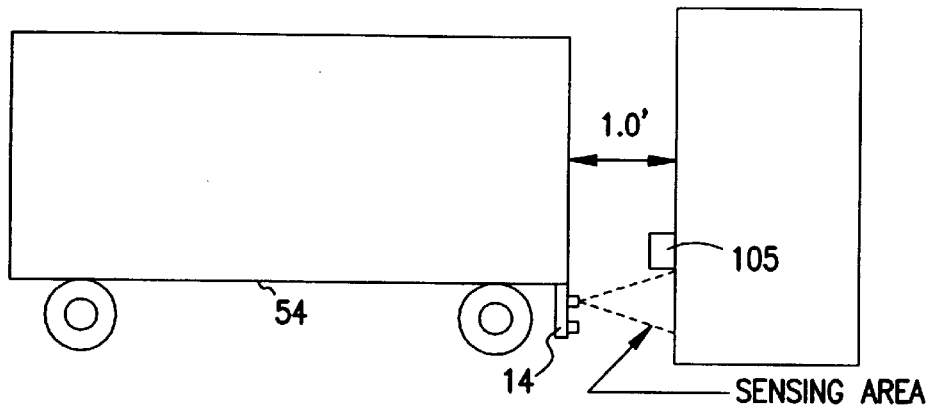

FIG. 5c represents the side view of a tractor-trailer pulling up to a loading dock. The impact bar is the point of contact with the trailer. The depth (i.e., front-to-back) of the impact bar is typically 4.5 inches. The top of the impact bar is typically 48 inches above the ground. When the Transducer Assembly is located below the point of impact of the trailer with the impact pad, the Precision Measurement System will adjust the distance measurement by 4.5 inches if the Transducer Assembly is mounted so low that it cannot detect the impact pad when the trailer is within 12 inches of the impact pad. For example, if the perpendicular distance from the rear of the trailer to the loading dock is 1 foot and the Transducer is 2 feet below the impact bar, the measured distance of 1.0 feet will be corrected to 0.6 feet.

In one radar embodiment, software running in systems 10 and 30 uses Multi-Hypothesis Ranging to provide an accurate estimate of range to an object. A range estimate will be calculated from the signal strength versus time and closing rate of each tracked object. As an object changes its relative position to the host vehicle, the signal strength will vary, due to the properties of radar, by range to the fourth power and by a scattering property called scintillation. Combining this property with the distance traveled by the object will yield the starting range and thus the current range to the object. The distance traveled by the object is computed in the system by combining time since the data collection and tracking started, with the individual measured closing rates versus time. Using multiple hypotheses, the signal strengths versus time will be inserted into an algorithm which matches the hypothetical signal strength curve to a "range and distance traveled one over range to the fourth curve". One hypothesis, a set of points drawn through the returned signal levels over time, will correspond to the correct starting range for the object given the measured distance traveled. This hypothesis will provide the best statistical match to a one over range to the fourth curve and will be the range estimate provided.

One sonar embodiment of system 10 incorporates temperature compensation. Temperature compensation is needed because of the fact that sonar travels at different speeds through air depending on temperature. And so systems 10 and 30 measure the temperature of the air, and compensate in the distance calculation for the effects of temperature. In such an embodiment, transverse location detection, triangulation, perpendicular position compensation and temperature compensation cooperate to form a precision measurement system.

In another sonar embodiment of systems 10 and 30, the systems include automatic sensitivity control. When systems 10 and 30 are trying to sense an object at a far location, it is advantageous to pulse your maximum energy, to transmit a high burst of energy. When systems 10 and 30 transmit such a high burst of energy, if there is an object at a far distance, systems 10 and 30 are more likely to get an echo they can sense. And the sensitivity should be set to be very sensitive for that application. But once you sense that far off object and you start backing toward it, systems 10 and 30 should back off the transmitted energy. In addition, it is advantageous to adjust receiver sensitivity. In one embodiment, the output of transmitter 16 can be reduced and the sensitivity of receiver 18 increased automatically by systems 10 and 30.

Figure 7:
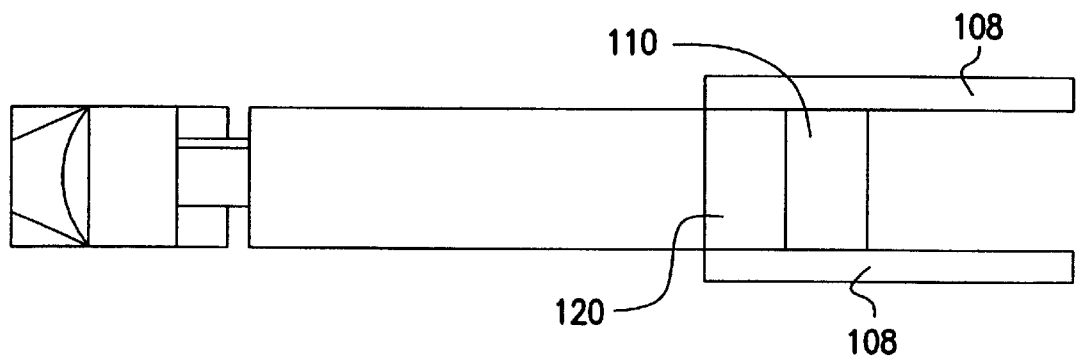
FIG. 7 illustrates a backup warning system.

In yet another embodiment of systems 10 and 30, a backup warning system is provided as shown in FIG. 7.

The intent is to provide immediate feedback to the driver shortly after the vehicle transmission is shifted into reverse. This information includes information on objects in the vicinity of the rear of the vehicle as well as information on objects in the path of the rear of the vehicle. In the case where objects are in close proximity to the rear of the vehicle, but not in the path of the vehicle, an auditory prompt representing an "alert" is sounded for the driver. If an object is detected in the path of the vehicle, in the range of 5 to 10 feet, the system will categorize that as a hazard situation and an auditory prompt representing a "warning" is sounded for the driver. If an object is detected in the path of the vehicle, within a range of 5 feet, the system will categorize that as an emergency situation and an auditory prompt representing an "emergency" is sounded for the driver. After the vehicle has been backing up for two or more seconds, the alert, warning, and emergency will have cleared and the system will begin providing range feedback to the driver in the form of distance information, as displayed on the Operator Interface and Side Display Modules, and auditory feedback in the form of pulsed tones. The closer the vehicle gets to an object, the faster the repetition rate of the pulses until the rear of the vehicle is within one foot at which time the pulses have turned into a continuous tone. In the process of backing up, if a person or vehicle suddenly appeared behind the vehicle, the system will automatically detect a sudden change in range to the object and the "emergency" auditory prompt will be issued to the driver so he/she can take action.

In one such embodiment, when the driver is going to back up, if there is an object within range, one of three scenarios will happen. First, if the system senses a truck or other object real close to it on either side, systems 10 and 30 will give him an alert. The system knows that there is no collision potential here, but just alerts him that there is something there. In one embodiment systems 10 and 30 provide one set of tones to the driver for an alert. Second, if there is an object in the range of 5–10 feet as soon as the driver throws it into reverse, systems 10 and 30 sense the object and provide the driver with a different alarm (e.g., a different set of tones or a different flashing light). This alarm is called a hazard alarm. And again, that's to alert the driver so he can take action on the hazard alarm. Third, if there is an object within 5 feet, the driver receives an emergency alarm (i.e., a third set of tones, or a third flashing light). Systems 10 and 30 therefore provide feedback indicative of the distance to an object behind the driver. In one such embodiment, audible or visual feedback tells the driver he's getting closer; the pulses go faster and faster to the point where, when he's within a foot, the pulses are continuous. But, if in the process of backing up, the system automatically detects that the distance suddenly became shorter, it will provide the emergency alarm right away so the driver can take action. For example, if somebody drove in behind the driver, or some kid ran in back of the vehicle, systems 10 and 30 sense that and automatically provide the emergency alarm so the driver can take action. As noted above, some of the systems that are out there actually detect zones of distance and provide feedback for that. Systems 10 and 30 go beyond that in that they detect and differentiate objects outside the area of potential collision from those inside and secondly, they can detect sudden changes in distance for an emergency alarm.

In one embodiment, control module 12 is highly programmable and dealers and fleet owners are given an ability to program key parameters that the system can use to more adequately address the needs of that application and that customer. In one such embodiment, an external programmer is plugged into a connector in the back of control module 12; the dealer can then respond to basically the number of fields and change a number (e.g., the distance between the rear-mounted transducers as discussed above), and key that in. When all the information is in, the programmer downloads the data, and feeds it back to the control module 12. Control module 12 then is configured for that vehicle.

In yet another embodiment, system 10 includes a security monitor/alarm system coupled to control module 12. In one such embodiment, an ultrasonic transmitter and an ultrasonic receiver is placed in the cab of the vehicle. When the driver leaves the vehicle, he turns the alarm system on with a key switch and it automatically scans the cab to see what the distances are to the closest object up in the cab. If somebody climbs up into the seat, one of the distances changes and an alarm is set off. In one such embodiment, the driver has approximately 15 seconds to get in and disable the alarm with his key switch. But if it was somebody other than the driver, the alarm will go off. In one embodiment, the alarm also activates an auto alarm underneath the hood of his vehicle to draw attention to and possibly scare off the intruder.

In yet another embodiment, an on-board computer interface is provided. The reason for this is some of the larger tractor-trailer rigs, in particular, have on-board information systems that monitor factors relating to use of the vehicle. They may monitor, for instance, the location of the vehicle, the delivery route, the delivery schedule, things that the driver does along the way, engine performance or things that might be an indication to the fleet owner that there's some service needed. In one embodiment of systems 10 and 30, information relating to driver performance that is detected with systems 10 and 30 is captured and downloaded into the on-board computer so that when the fleet owner gets a download from the on-board computer, it contains additional information provided by systems 10 and 30. So, with an interface through a single cable, systems 10 and 30 can tie into the on-board computer and provide real time information.

In another embodiment, if there is no on-board computer there, data storage is provided in control module 12 so that it can store the data internally. Data can then be downloaded to a fleet computer at a future date. In one such embodiment, systems 10 and 30 include an accident reconstruction memory installed in the control module. This memory maintains a record, in non-volatile memory, of data pertinent to system operation, vehicle operation, and obstacle detection. Some of these parameters are stored over longer periods of time and some relate to the last 2 or more minutes leading up to an accident. A G-force switch detects the presence of a crash and discontinues the data recording process thus saving data stored prior to the crash.

In one embodiment a self test capability is provided. Self test addresses several issues. One is when systems 10 and 30 are first turned on (i.e., the driver throws the power switch into an "on" position) the systems will turn all the indicators on so that the driver right away can see that all the indicators are lit. In addition, control module 12 tests its internal circuitry to ensure that the system comes up running. The second thing the system does is while it's running, if the micro controller or microprocessor in control module 12 were to fail, systems 10 and 30 then provide a "watch-dog timer" that will detect the failure. Thirdly, the driver can activate self test mode. On doing so, control module 12 flashes all of the indicators of front panel 20. In one such embodiment, control panel 20 includes an indicator 24 for each transducer mounted around the vehicle and, on entering self test, transducer indicators 24 begin to flash. The driver then walks around the vehicle and gets back in the cab. Every one of those transducers should detect him; each time they detect him, the transducer indicator 24 associated with the transducer goes off (i.e., quits flashing). If the driver gets back to the cab and there's a transducer still flashing, he knows that something didn't work and he can investigate the problem.

In another embodiment, systems 10 and 30 automatically and sequentially activate a Built-In Test (BIT) function for each sensor. The Built-In-Test (BIT) function is conducted in two ways: initial power-up and an integrated BIT performed during vehicle motion.

During initial power-up, when power is first turned ON, control module 12 performs a BIT of control module 12 functions. The BIT function verifies that sensor transmitter 16, receiver 18, and the electronics of control module 12 and the rest of systems 10 and 30 are working properly. In one embodiment, indicators associated with every element tested will turn off for all sensors that pass the Built-In Test. If a sensor 14 repeatedly fails the BIT, it will automatically be taken out of the service and the driver will be alerted of the failure and the need to service that particular sensor 14.

When the vehicle is in motion, the system will perform BIT on all detector modules and integrate the results into the data acquisition process to insure the integrity of the data being processed. This is accomplished by looking for road clutter signatures from each of the radar modules (i.e. forward-looking, side-looking, and rear-looking detectors). When the vehicle is in motion, the system will integrate the BIT of all sensor modules into the data acquisition process to insure the integrity of the data being processed. This is accomplished by looking for road clutter signatures from each of the radar modules (i.e. forward-looking, side-looking, and rear-looking detectors). If the radar modules are working properly, they will always detect low level return signals from the road surface while the vehicle is moving and will transmit information pertaining to these signals back to the control module. If the sensor is defective, the system will continue to function, bypassing the defective sensor. If the BIT detects a catastrophic failure, an error message will be displayed on the operator interface and the system will halt. The date, time, and results of the most recent BIT will be stored in Accident Reconstruction System memory if that option is installed. This integrated approach to BIT does not slow up the data acquisition process and it insures the integrity of all sampled data and the data communications from all sensors.

Wireless Portable Transducer System

Figure 8A:
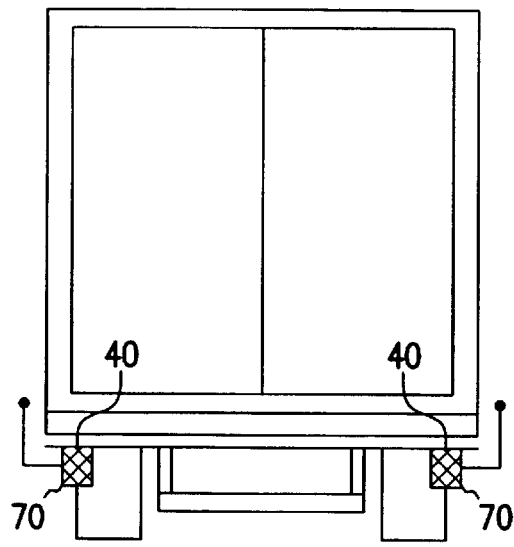
FIGS. 8a and 8b show wireless portable transducer systems.
Figure 8B:
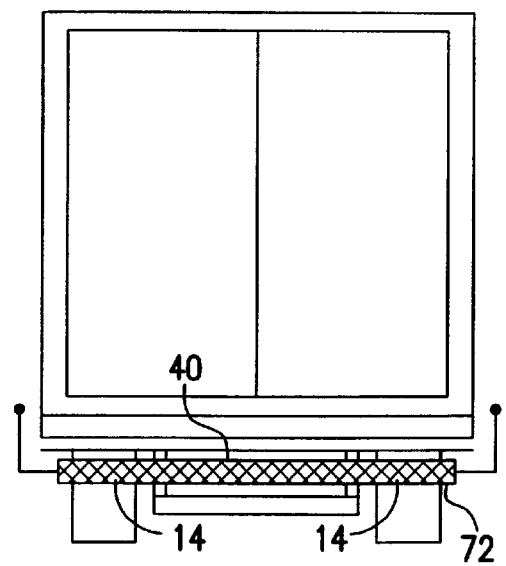

In one embodiment sensors 14 are provided within a wireless portable transducer system 40. The problem with that is if you look at the number of trailers out there, they far exceed the number of truck-tractors out there. And so truck-tractors are basically moving from trailer to trailer. It could easily reach the point where establishing a complete collision avoidance system 10 or 30 on each combination of tractors and trail would be prohibitively expensive. To better address the needs of fleet owners, a system 10 is constructed having a wireless portable system 40. FIGS. 8*a* and 8*b* show two embodiments of such portable systems.

In FIG. 8*a*, two boxes 70 provide the portable transducer function. Each box 70 includes an antenna sticking out the side. Each box 70 mounts under the trailer and clamps to the frame of the trailer. Inside each box 70 is an ultrasonic transmitter and receiver, electronic circuitry, and a radio transmitter and receiver. A two wire cable connects battery from the trailer to the electronic circuitry to provide power. A cable between each box provides common control signals from the radio transmitter/receiver such that signals from either rear mounted antenna control both Transducer Assemblies.

In FIG. 8*b*, there is one long extrusion with an antenna sticking out each side. The extrusion clamps to the frame on the rear of the trailer. The extrusion may be made of one piece, or two pieces (one within another) with a mechanism to adjust the width of the extrusion to the width of the trailer. A Transducer Assembly (transmitter and receiver) is mounted on each end of the extrusion. The electronic circuitry, including radio transmitter and receiver are mounted inside the extrusion. In one embodiment, a two wire cable connects battery from the trailer to provide power to the electronic circuitry.

Signals to and from the boxes 70 are communicated to the control module of the collision avoidance system via the Wireless Communicator to detect, measure, and display distance to objects behind the trailer.

System 40 is designed so that it can quickly be disconnected from one trailer and moved to another trailer.

In one such embodiment, a Wireless Portable Transducer System provides for wireless communication between the electronics mounted in the cab of the vehicle and the Portable Transducer Array mounted on the rear of the trailer. Power to operate the Portable Transducer Array is provided by connecting in to existing power wiring provided to the trailer from the truck's electrical system.

Dependent on the transducer technology used, the Portable Transducer Array could be made to be totally battery operated. For example, if the Portable Transducer Array were designed using Micropower Impulse Radar, Doppler Radar or other alternative low-power technologies, the transmitting and receiving functions to measure distance to objects behind the vehicle would be low power and could operate on batteries built into the Portable Transducer Array. The communications between the electronics in the cab of the vehicle and the Portable Transducer Array could also use Micropower Impulse Radar, Doppler Radar, or other alternative low-power technologies, thus enabling portability with built-in battery power. This solution will eliminate the need to tap into the truck's electrical system to power the Portable Transducer Array.

The bulk of the electronics stays with the tractor. In addition, the rear transducer array stays with the tractor (i.e., as the driver goes from trailer to trailer he simply pulls off system 40 and clamps it on the next trailer. In one such embodiment, a connector arrangement is provided so the driver can connect system 30 to the power that's already on the trailer and quickly get the system up and running.

In another embodiment, multiple sensors are designed into the wireless subsystem 40 to detect obstacles to the rear of the vehicle and on either side of the vehicle. Communication with control module 12 is via wireless digital signals. Control module 12 is designed to sense when the wireless portable sensor subsystem is not installed or is not functioning properly.

Different quick-connect mounting arrangements might be needed for different style trucks. In one embodiment, as is shown in FIG. 8b, portable wireless sensor subsystem 40 is a tubular structure with integral electronics, battery pack, and sensors mounted internal or external to the structure. The unit would clamp on the trailer chassis or the underride bumper provided on the rear of many trailers. Antennas would be mounted on one or both sides of the wireless portable sensor subsystem protruding just outside the left and right edges of the trailer. In another embodiment, as is shown in FIG. 8a, portable wireless sensor subsystem 40 is enclosed in two separate housings mounted at the left rear or right rear of the trailer. Again, quick connect mounting arrangements will be made to secure each unit to the trailer. A cable will interconnect each unit to allow the sharing of one battery pack, one controller, and one wireless transceiver.

In another embodiment of system 40, the sensors on the trailer are hardwired together, however, communication between the sensors and the control module 12 is wireless. In this case, a Transceiver Module will be mounted on the tractor and a second unit on the trailer. The Transceiver Module on the trailer will receive its power from the tractor-trailer umbilical electrical cable. Electrical signals will be passed between tractor and trailer just like any non-wireless system with the exception that the signals will be converted to wireless communication and then reconverted back to their electrical form at the other end. This approach provides additional flexibility for the customer's needs.

Adding Additional Sensors

In certain situations, drivers need to be able to detect objects directly in front of, or to the side of, the front of the vehicle. For example, in the case of a school bus, one of the problems that busses have is the number of small children in front of and on the sides of the bus. There are deaths in school bus accidents in the United States every year; they are generally related to accidents at the front of the bus. To date, the only options provided to these drivers are mirrors angled to see the front of the bus. Even the use of angled mirrors, however, has only limited effectiveness.

To address this need, in one embodiment, forward-looking proximity detectors are provided in order to detect objects immediately in front of the vehicle (an area that is a blind spot for the driver).

Buses also have a problem with children that crawl under the bus to retrieve a dropped toy or ball. Bus drivers cannot always see these areas. To help prevent problems, in one embodiment, side-looking proximity detectors are positioned on the bus to monitor these areas.

Sensor Protection

Some forward-looking proximity detectors, however, have a problem with clogging due to debris, dirt, ice, etc. accumulated while the vehicle travels down the road. As noted above, forward-looking transducers are typically needed only when the vehicle is stationary and about to move forward. It would, therefore, be advantageous to expose the forward-looking transducer to the elements in only those situations where they are needed.

A forward-looking Transducer with an Environmental Shield solves this problem in situations where the Transducer need not be active while the vehicle is in motion. While the vehicle is in motion, the shield covers the front of the Transducer Assembly, protecting it from contamination. When the vehicle stops, the system using this device will open the front door, thus enabling the Transducer Assembly to detect and measure the distance to all objects in front of the vehicle. Shortly after the vehicle starts to move, the system closes the Environmental Shield to protect the Transducers.

FIGS. 9a–d demonstrate one way of solving this problem. The solution is independent of the type of Transducer technology being used. However, the intended use is with ultrasonic Transducer Assemblies.

Figure 9A:
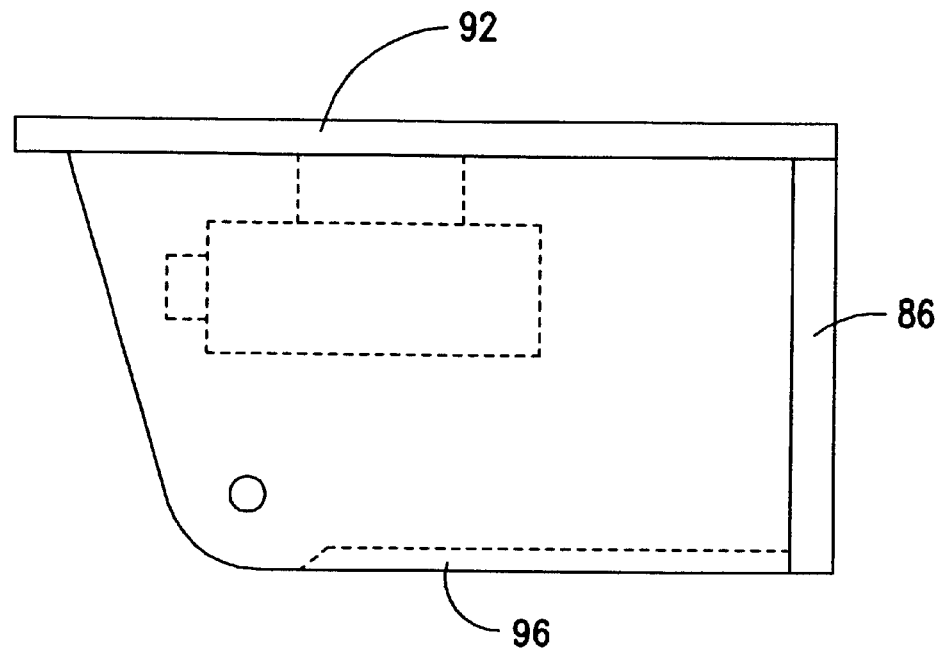
FIGS. 9a–d show a forward looking proximity sensor.
Figure 9B:
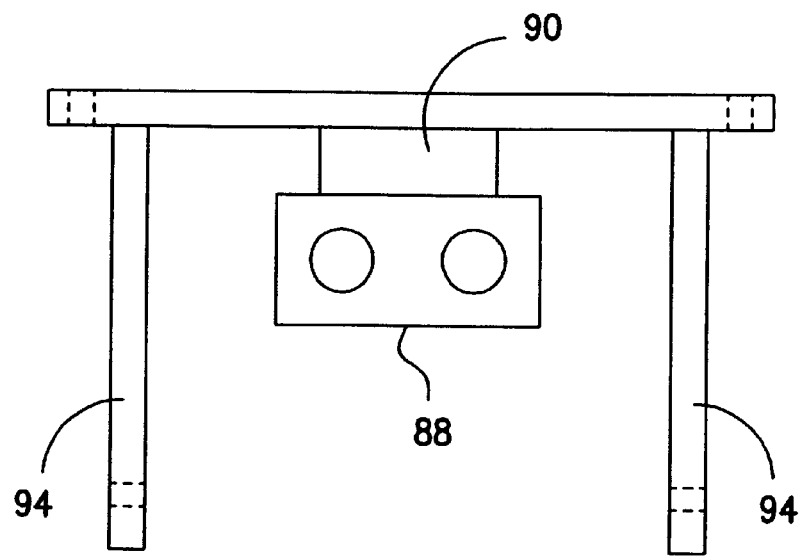

FIGS. 9a and 9b represent a side view and a front view of a mounting bracket with the Transducer Assembly mounted via a Transducer Mounting Bracket to Mounting Bracket Top Plate. Mounting Side Brackets are shown in place. Note the mounting holes in the flanges that protrude beyond the width of the mounting Bracket Side Plates. These mounting holes are used to mount the completed assembly to the underside of the vehicle front bumper or chassis just behind the front bumper. In one embodiment, spacers are used to adjust the actual height of the overall assembly so as to provide an unobstructed opening for the Transducers to work properly.

Figure 9C:
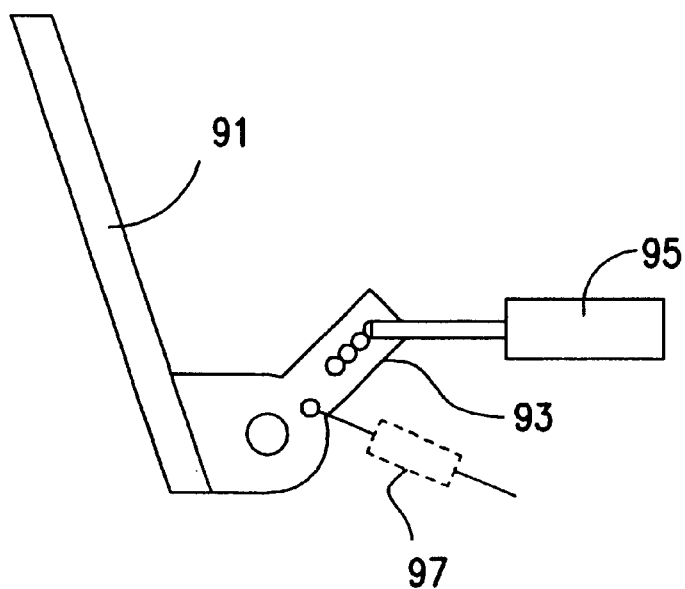

FIG. 9c represents a side view of the Face Plate used to protect the front of the Transducer Assembly. The Face Plate is positioned at an angle to deflect air and contaminates down under the overall assembly. A pivot arm is an integral part of the Face Plate. Attached to a slot in the pivot arm is an electrically activated solenoid and a return spring. The return spring holds the Face Plate closed over the front of the overall assembly when no power is applied to the solenoid. This pivot arm has a hole around which the Face Plate will pivot when the solenoid is activated.

Figure 9D:
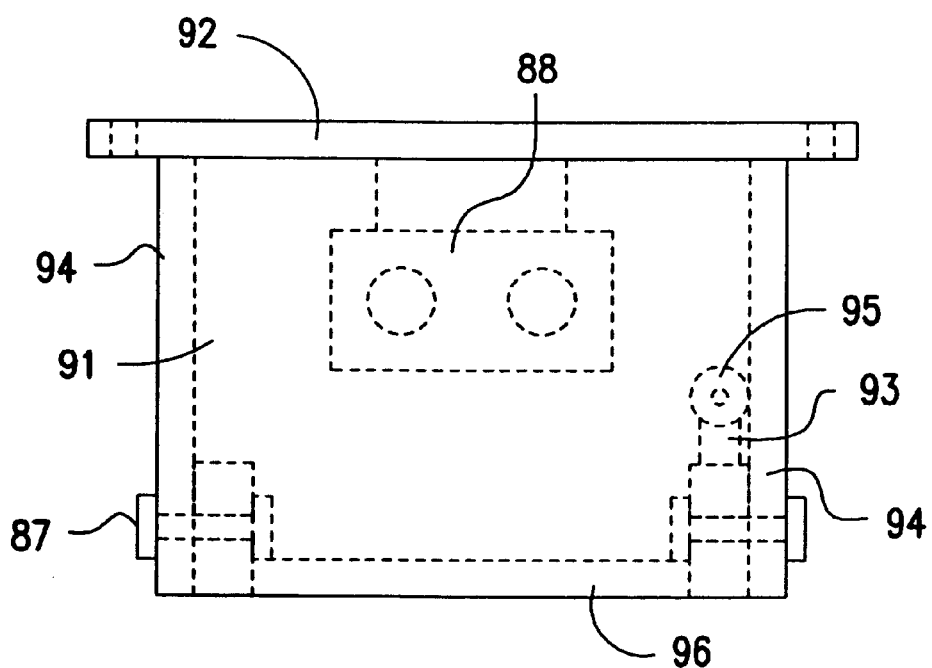

FIG. 9d represents a front view of the overall assembly. Note that the face plate fits just under the Mounting Bracket Top Plate and over the front of the Mounting Bracket Side Plates. This is to minimize moisture from seeping in behind the Face Plate. However, there is a gap between the lower edge of the Face Plate and the front edge of the Bottom Plate to allow any moisture that might enter the assembly to drain out.

Features not shown in the drawing include:

A bracket mounting the solenoid to the inside of the Mounting Bracket Side Plate;

An access hole provided in the Back Plate for the Transducer Cable Assembly which connects with the Transducer Assembly; and The other end of the return spring, that mounts to the Mounting Bracket Side Plate with a screw and washer.

One embodiment of such a forward-facing transducer is shown in FIGS. 9a–d. Forward-looking systems only need to be activated when the bus comes to a stop and it first goes into gear to move forward.

In one embodiment, such as is shown in FIGS. 9a–d, a forward-looking transducer includes an environmental shield. When the vehicle comes to a stop and is in neutral, or in park, that shield drops out of the way. When the driver goes into gear, the forward-looking proximity detectors begin looking and alert the driver with an alarm if there is an object in front of the vehicle. Shortly thereafter, the shield goes back into place and protects the detector from the environment.

In one embodiment shield 60 replaces the solenoid with a motor. The motor is to rotate the shield cover out of position when the transducer is operating.

As noted above, it can be advantageous to provide truckers and other long-range drivers with early warning of slow or stopped vehicles in their line of path. Collisions with such objects may result from poor visibility, driver inattention, or driver distraction. To counter this problem, in one embodiment one or more forward-looking transducers 14.2 are attached to the front of the vehicle as long range detectors that can see objects well ahead of the vehicle. As noted above, forward-looking devices 14.2 have been used in the past to detect slow or stopped objects in the path of the vehicle. Such attempts have largely failed due to the inability to control the false alarm and off-the-road clutter problems. Therefore, it is important to control and monitor a broad range of objects and clutter. Such objects and clutter must be properly analyzed to detect potential accidents with minimal false alarms.

In the software embodied in systems 10 and 30, there are several advanced features built-into the software to minimize false alarms, including (a) the combination of multiple sensors comparing signals for same objects and using sensor antenna patterns to derive angular position, (b) the use of a N out of M tracking algorithm, and c) the fusion of data from multiple sensors.

In one embodiment of the Forward-Looking Detector (FLD), the returns of both sensors at the same frequencies can be used to do False Alarm Rate (FAR) Reduction. Depending on the angle to an object, the frequency and amplitude will change. Stationary objects on the side of the road at close ranges will appear stronger in one sensor and at frequencies lower than the speed of the vehicle. Road clutter from a specific object such as a sign or bridge will appear at one frequency. As the vehicle approaches, if the object is on the side of the road the frequency will decrease and the signal strength in one sensor will decrease while the signal in the other sensor will increase faster than expected. This will denote that the object being detected is not in front of the host vehicle.

The difference in signal strength can be used to remove the majority of the False Alarms resulting from side of the road clutter. However, objects moving virtually in front of the host vehicle may present themselves in a manner consistent with objects directly in front of the host vehicle. An N out of M tracking scheme is used to track these objects, such a tracking scheme uses the statistical properties of scintillation and the FLD antenna patterns to average the signal return and differentiate between the lane in front and off to the side of the host vehicle.

The Proximity Detectors and Rear Guard Detectors, being wide beam sensors, require both N out of M tracking and Data Fusion to remove False Alarms. The Data Fusion system receives tracks from each sensor surrounding the host vehicle. This data is fused into one track for each object surrounding the truck with all data from all contributing sensors used to differentiate between an alarming condition and a False Alarm.

Another factor in FAR reduction is object identification. With a range estimate from the Multiple Hypothesis Ranging software, the signal strength versus time (scintillation characteristics) and average signal strength at an estimated range, an identification (ID) can be computed for a tracked object. The signal strength at an estimated range provides an estimate of radar cross section. From this radar cross section an initial categorization as a truck/large vehicle, a car or other can be determined. From scintillation combined with a small radar cross section the categorization as a human/large animal or a sign can be determined.

Another extremely important software feature for reliable system performance is Data Fusion. The Data Fusion algorithm will be designed to take inputs from a N our of M tracker. This Data Fusion algorithm is specifically designed to not require any specific set of sensors and adapts as sensors are added using a lookup table of the new sensor parameters and an indication of the number of and type of sensors added. The Data Fusion Algorithm can also take into account any data from the host vehicle supplied by various sensors. The absence of data will not cause a problem with the algorithm, however, the more data the better the performance. The purpose of the Data Fusion Algorithm is to reduce all of the tracks and detections down to a small set of object tracks representing the objects surrounding the host vehicle. Each radar module and sensor set may detect the same object. It is the task of the Data Fusion Algorithm to sort this out. The algorithm uses a technique called Deepest Hole to combine the data from multiple sensor and Kinematics Combination to fuse this data together.

The Deepest Hole function "associates" tracks from the sensor sets with existing Fused Tracks. It is assumed that multiple sensor sets may find the same object and that multiple radar modules within a sensor set will often see and report on the same object. The Deepest Hole function resolves these redundant tracks into a set of fused tracks, one per object. The output of this function is a list of track links linking the tracks from multiple radar modules together for one object.

The track data from the tracks which are linked are merged in this function. The speeds of each track are averaged together. The Signal to Noise Ratios will be averaged using a weighted average considering radar module antenna gain. The range estimate for the new merged track is created using the time and sensor averaged signal strength. The track ID is merged using the Probability of Correct ID and the ID Confidence.

In one embodiment, sensors 14 include transducers placed on the rear of the vehicle. Those transducers are activated when the driver shifts his transmission into reverse. As soon as the driver shifts into reverse, the transducers on the back begin to send out sound energy from the transducers, which bounces off an object, comes back to a receive transducer. Distance is then calculated as a function of time of return (e.g., acoustic applications) or intensity of the return signal (e.g., radar applications). In one embodiment, a Multiple Hypothesis Ranging algorithm is used to calculate distance. In addition, sensors 14 detect that there's something back there. And if there is something back there, systems 10 and 30 can alert the driver immediately, so that he can take action and not back into whatever that object happens to be.

In another embodiment, additional sensors 14 are mounted on the side of the vehicle. Sensors on the right side of the vehicle are activated when the right turn signal is active. Sensors on the left side of the vehicle are activated when the left turn signal is active. When the transmission is shifted into Reverse, the sensors on both sides of the vehicle are activated to monitor for potential accidents at the sides of the vehicle when backing up. When a sensor is activated, it begins to send out signals which bounce of any nearby object and come back to a receive transducer. Distance is then calculated as a function of time of return (e.g. acoustic sensors) or intensity of the return signal (e.g. radar applications). In the case of radar, a Multiple Hypothesis Ranging algorithm is then used to calculate distance. Based on the distance to the object, the Control module software can determine whether a valid alarm condition exists and the driver needs to be notified.

Figure 13:
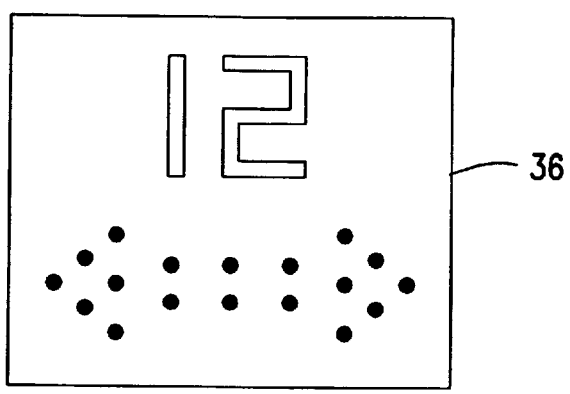
FIG. 13 illustrates a side display module.

In another embodiment of system 30, systems may be equipped with a Side Display Module, such as is shown in FIG. 13. Side Display Module 36 is mounted internal or adjacent to each Side View Mirror. If one or more sensors 14 on the side of the cab detect an object, Side Display Module 36 will flash a forward-directed arrow on that side of the vehicle. In one embodiment, if one or more sensors on the side of the trailer detect an object, Side Display Module 36 flashes a rear-directed arrow on that side of the vehicle. If objects are detected on both the side of the cab and the side of the trailer, Side Display Module 36 flashes an arrow pointed both forward and to the rear. In one such embodiment, Side Display Module 36 also displays the distance between the rear of the vehicle and any object behind the vehicle when the transmission is in reverse.

In one such embodiment, Control module 12 includes a driver performance log. This is similar to the system used for the on-board computer interface, where Control module 12 actually collects and stores data that pertains to driver performance. For example, if a driver turned on his right turn signal and there was something over on his right hand side, Control module 12 extracts information from the scenario. If the driver turns off the signal, the result is stored. On the other hand, if there is an accident those results are also stored in the computer. The fleet owner can go in and retrieve the stored information and found out really what happened.

Figure 10:
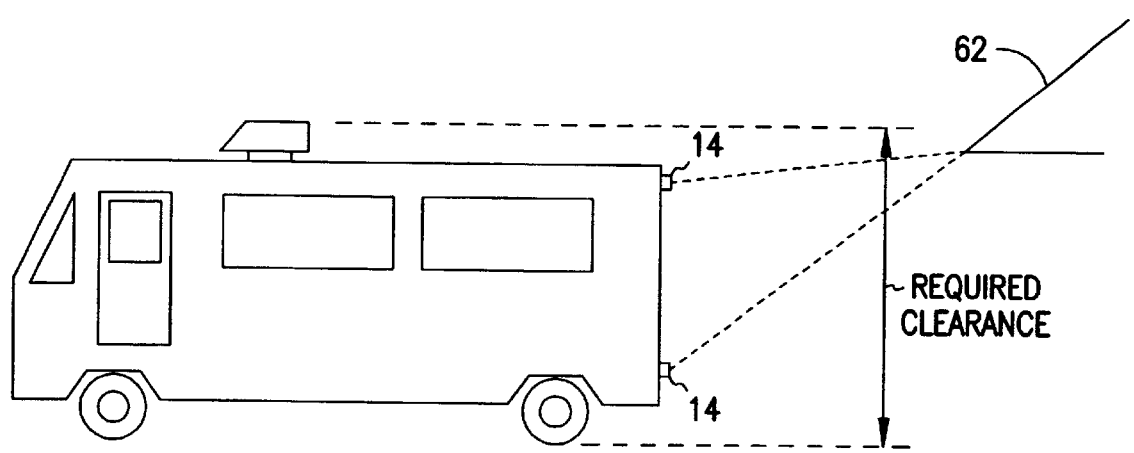
FIG. 10 shows a high/low detection system.

In yet another embodiment, as is shown in FIG. 10, sensors 14 are mounted toward the top and bottom of the back end of the vehicle. Vehicles such as RVs can have a problem when pulling into low overhang areas, low clearance areas, like with trees, large tree branches, etc. This embodiment places additional sensors up top, and can actually detect high up that there's a problem.

A system such as is shown in FIG. 10 may be used on a variety of vehicles. Sensors 14 at the top of the vehicle alert the driver of obstacles that may cause damage near the top of the vehicle. These obstacles may be trees, storage shed doors, or other similar objects. Sensors 14 at the bottom of the vehicle are re-oriented to provide a wider dispersion angle from high to low as opposed to their normal wide dispersion from left to right. With this change in orientation, this system is also able to triangulate on objects above the vehicle such that the system can calculate available clearance and compare it with required clearance (which, in one embodiment, is programmed into memory) for the vehicle.

Additional indicators on the operator interface 32 communicate to the driver whether an obstacle to the rear of the vehicle was detected by the High Transducer Assemblies or the Low Transducer Assemblies.

If the available clearance is less than the required clearance, in one embodiment, an Emergency Alarm is sounded to alert the driver to take action before damaging the vehicle. In this special case, an additional indicator on the operator interface 32 flashes to inform the driver that the alarm was caused due to lack of clearance.

In the example shown in FIG. 10, the motor home is backing under an overhanging roof. Based on the known position of the Low Transducer above the ground and the position of the High Transducer above the ground, the MicroController in the control module 12 can calculate the distance of the roof overhang above the ground. Based on the required clearance, which is programmed into the Memory of control module 12, the system can detect whether there is sufficient clearance for the vehicle. If there is not sufficient clearance, the Emergency Alarm will sound.

Figure 11:
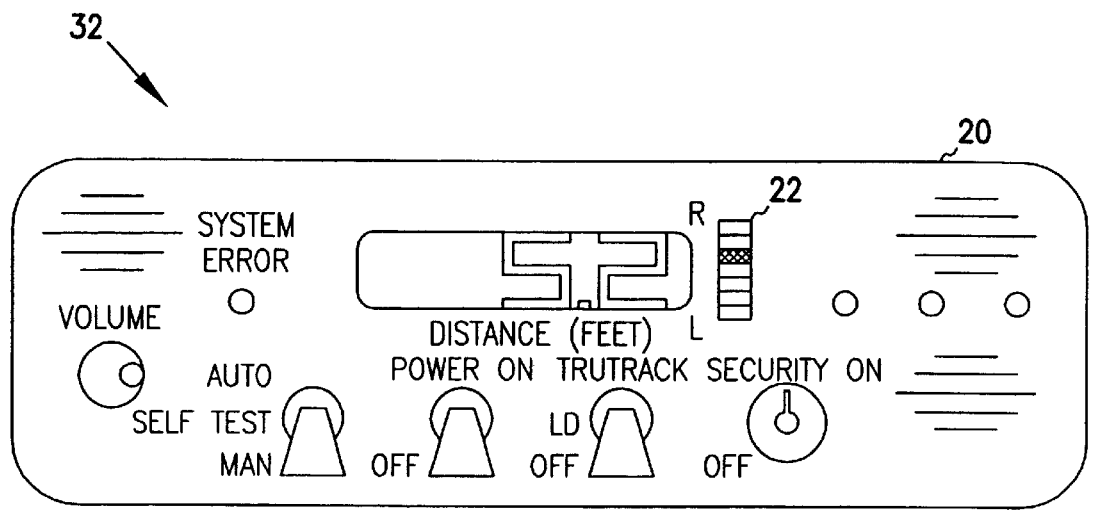
FIG. 11 shows an operator interface unit which can be used with the Control modules of FIGS. 1 and 3.

In another embodiment, systems 10 or 30 can be mounted on farm trucks. Farm trucks are often pulling up into close spaces with loading and unloading equipment, grain augers and whatever, and in some cases even have to straddle a grain auger in order to dump a load so that the grain auger can take the load away. And that's a tough maneuvering situation. In one embodiment, software is provided which not only prevents accidents but also helps guide them into some of those tight maneuvering situations. In the software, systems 10 and 30 sense the equipment the vehicle is trying to mate with and guides the driver such that they stay centered on that equipment. Such a system is shown in FIGS. 11 and 12.

Figure 12:
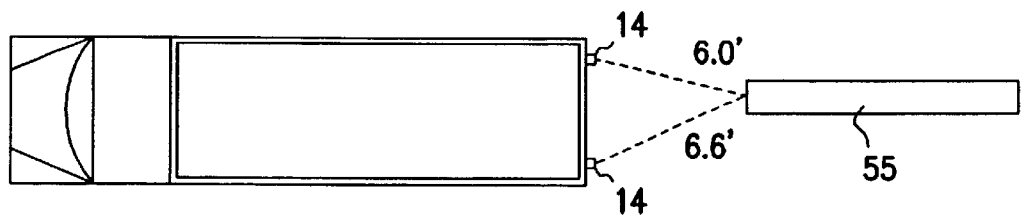
FIG. 12 shows the guided operation of two rear-mounted sensors according to the present invention.

A grain auger example is given in FIG. 12. The example shown is that of a farm truck preparing to dump grain into a grain auger. To assist in guiding the truck up to the grain auger, the driver will activate a TruTrack switch on operator interface 34. As the vehicle approaches the grain auger, the system will automatically measure the distance to the auger, will calculate the transverse location of the auger, will display this location on the bar graph, and will display the distance on the digital readout on the operator interface 23.

In this example, the right rear Transducer has detected the auger at a distance of 6.0 feet. The left rear Transducer has detected the auger at a distance of 6.6 feet. The system will automatically calculate a perpendicular distance of 5.2 feet. The system will also calculate the transverse location and display it on the bar graph as slightly right of center. With this information, the driver can make minor maneuvering corrections to keep the auger centered.

In one embodiment, as is shown in FIG. 13, Side Display Module 36 provides visual feedback to the driver when looking in the direction of either side view mirror. These modules may be mounted on the edge of the side view mirrors, or they may be mounted inside the cab in the approximate line-of-sight as the side view mirrors.

The Side Display Modules 36 (FIG. 13) consist of a plastic housing, a small PCB Assembly with five LED indicators, two half-inch high seven segment displays, a cable which runs into the cab and connects to the rear of the Control module, and a clear plastic cover on the front of the module. The Display Module mounted on the left side of the cab is identical to the module mounted on the right side of the cab.

The seven-segment display drivers and LED driver will be located in the Control module. The above diagrams show a distance reading of twelve feet (12'). Distance readings associated with the Forward-Looking Detector Subsystem will not be displayed on the Side Display Modules. Only Backup Mode rear distance readings will be displayed. If an alarm condition exists anywhere around the vehicle, all five LED's will flash. The LEDs are not meant to provide any detector-specific information. Similarly, in one embodiment, the graphics displays shown in FIGS. 6a–c will flash a visual warning on detection of an alarm condition.

One embodiment of a system 30 for use on vehicles such as commercial trucks in shown in Appendix A. Such an embodiment addresses many of the safety and operation issues raised above.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A collision avoidance system, comprising:

a control module;

a plurality of transmitting devices connected to the control module, wherein the plurality of transmitting devices includes a first and a second transmitting device, wherein the first and second transmitting devices transmit a first signal and a second signal, respectively;

a plurality of receiving devices connected to the control module, wherein the plurality of receiving devices includes a first and a second receiving device, wherein the first receiving device receives a return representative of the signal transmitted from the first transmitting device and transmits to the control module a first return signal representative of the first return and wherein the second receiving device receives a return of the signal transmitted from the second transmitting device and transmits to the control device a second return signal representative of the return; and wherein the control module includes measurement circuitry used to measure the first and second return signals and calculate a transverse location of an object as a function of said first and second return signals and further wherein the control module includes a display means for displaying the transverse location.

2. The collision avoidance system of claim 1, wherein the first transmitting device and the first receiving device are cooperatively integrated into a single transceiver.

3. The collision avoidance system of claim 1, wherein the second transmitting device and the second receiving device are cooperatively integrated into a single transceiver.

4. The collision avoidance system of claim 1, wherein the control module logs the transverse location of the object.

5. In a collision avoidance system having a plurality of sensors, including a first and a second sensor, a method of displaying a transverse location, comprising the steps of:

placing the system proximate an object;

transmitting a signal from the first sensor to said object;

sensing a return from the object of the signal transmitted from the first sensor and generating a first return signal as a function of the sensed return of the signal transmitted from the first sensor;

transmitting a signal from the second sensor to said object;

sensing a return from the object of the signal transmitted from the second sensor and generating a second return signal as a function of the sensed return of the signal transmitted from the second sensor;

calculating a transverse location as a function of the first and second return signals; and displaying an indication of the calculated transverse location.

6. The system according to claim 5, wherein the step of displaying an indication includes the steps of creating a display showing an area behind the vehicle and showing the object at a location within the display corresponding to the transverse location.

7. The system according to claim 5, wherein the step of displaying an indication includes the steps of:

dividing a line into a plurality of zones; and selecting a zone from the plurality of zones; and placing an indication within the selected zone.

8. The method according to claim 7, wherein the step of placing an indication includes the step of lighting a light-emitting diode representative of the selected zone.

9. For a vehicle having a collision avoidance system with a plurality of sensors, including a first and a second sensor, a method of calculating the distance from a rear-most portion of the vehicle to an object, comprising the steps of:

transmitting a signal from the first sensor to the object;

sensing a return from the object of the signal transmitted from the first sensor and generating a first return signal as a function of the sensed return of the signal transmitted by the first sensor;

transmitting a signal from the second sensor to said object;

sensing a return from the object of the signal transmitted from the second sensor and generating a second return signal as a function of the sensed return of the signal transmitted by the second sensor;

determining spacing between the first and second sensors;

determining a perpendicular distance from the sensors to the rear-most portion of the vehicle; and calculating the distance from the rear-most portion of the vehicle to the object as a function of the spacing, the perpendicular distance, and the first and second return signals.

10. A collision avoidance system, comprising:

a control module;

a first transmitting device connected to the control module, wherein the first transmitting device transmits a signal;

a first receiving device connected to the control module, wherein the first receiving device receives a return of the signal transmitted from the first transmitting device and transmits a first return signal representative of the return to the control device;

a second transmitting device connected to the control module, wherein the second transmitting device transmits a signal; and a second receiving device connected to the control module, wherein the second receiving device receives a return of the signal transmitted from the second transmitting device and transmits a second return signal representative of the return to the control device, wherein the control module includes measurement circuitry used to measure the first and second return signals and to calculate a transverse location as a function of the first and second return signals and further wherein the control module includes an interface between the control module and an on-board computer information system.

11. A collision avoidance system for a vehicle comprising:

a control module;

a first transceiver connected to the control module, wherein the first transceiver produces a sensor antenna pattern; and a second transceiver connected to the control module, wherein the second transceiver produces a sensor antenna pattern;

wherein the control module determines an angle to an object as a function of the amplitude of signals received by the first and second transceivers and the sensor antenna pattern of each transceiver.

12. The system according to claim 11, wherein the control module reduces false alarms as a function of the amplitude of the signals received by the first and second transceivers and the sensor antenna patterns of each transceiver.

13. The system according to claim 11, wherein the control module fuses data from the first and second transceivers.

14. The system of claim 11, wherein the control module includes a means for detecting a slow moving object.

15. The system of claim 11, wherein the control module includes a means for detecting a stationary object proximate to the vehicle.

16. The system according to claim 11, wherein the control module uses the amplitude of the received signals and the sensor antenna patterns to detect an object in an adjacent lane of traffic.

17. A collision avoidance system for a vehicle comprising:

a control module;

a plurality of transmitting devices coupled to the control module;

a plurality of receiving devices coupled to the control module, wherein the control module includes a built-in-test function which sequentially commands each transmitting device to transmit a signal, detects a return of the signal and sends a signal representative of said return signal to the control module for system verification.

18. The collision avoidance system of claim 17, wherein the control module includes a display module, and further wherein the display module indicates a status as a function of the returns received by the plurality of receiving devices.

19. The collision avoidance system of claim 18, wherein the returns are received from objects within a vicinity of the vehicle.

20. The collision avoidance system of claim 19, wherein the returns are received from reflections from a road surface.

21. A collision avoidance system, which provides object detection around the exterior of a vehicle, comprising:

a control module;

a plurality of transmitting devices connected to the control module, wherein each of the plurality of transmitting devices transmits a signal;

a plurality of receiving devices connected to the control module, wherein each of the plurality of receiving devices receives a return representative of one of the plurality of transmitted signals and wherein each of the plurality of receiving devices transmits to the control module a return signal representative of the return received by that receiving device; and wherein the control module measures the return signals, detects an object as a function of the return signals, calculates a distance to and location of the object and displays the distance to and the location of the object.

22. The system of claim 21, wherein the control module fuses data received from the plurality of sensors to detect objects within a 360° view surrounding the vehicle.

23. The system of claim 21, wherein each of the plurality of transmitters produces a sensor antenna pattern and the control module determines an angle to the object as a function of the amplitude of the return signals and the sensor antenna pattern of each transmitter.

24. The system of claim 21, wherein the control module includes a built-in-test function which sequentially commands each transmitting device to transmit a signal, detects a return of the signal and sends a signal representative of said return to the control module for system verification.

25. The system of claim 21, wherein the control module determines whether it can triangulate and calculates an actual perpendicular distance to the object and location of the object with respect to the vehicle.

26. The system of claim 21, wherein the control module includes a means for detecting a slow moving object.

27. The system of claim 21, wherein the control module includes a means for detecting a stationary object proximate to the vehicle.

28. The system of claim 21, wherein the control module fuses data received from the plurality of sensors and provides a single picture of all objects within a 360° view surrounding the vehicle.

* * * * *

UNITED STATES PATENT AND TRADEMARK OFFICE
CERTIFICATE OF CORRECTION

Figure 14:
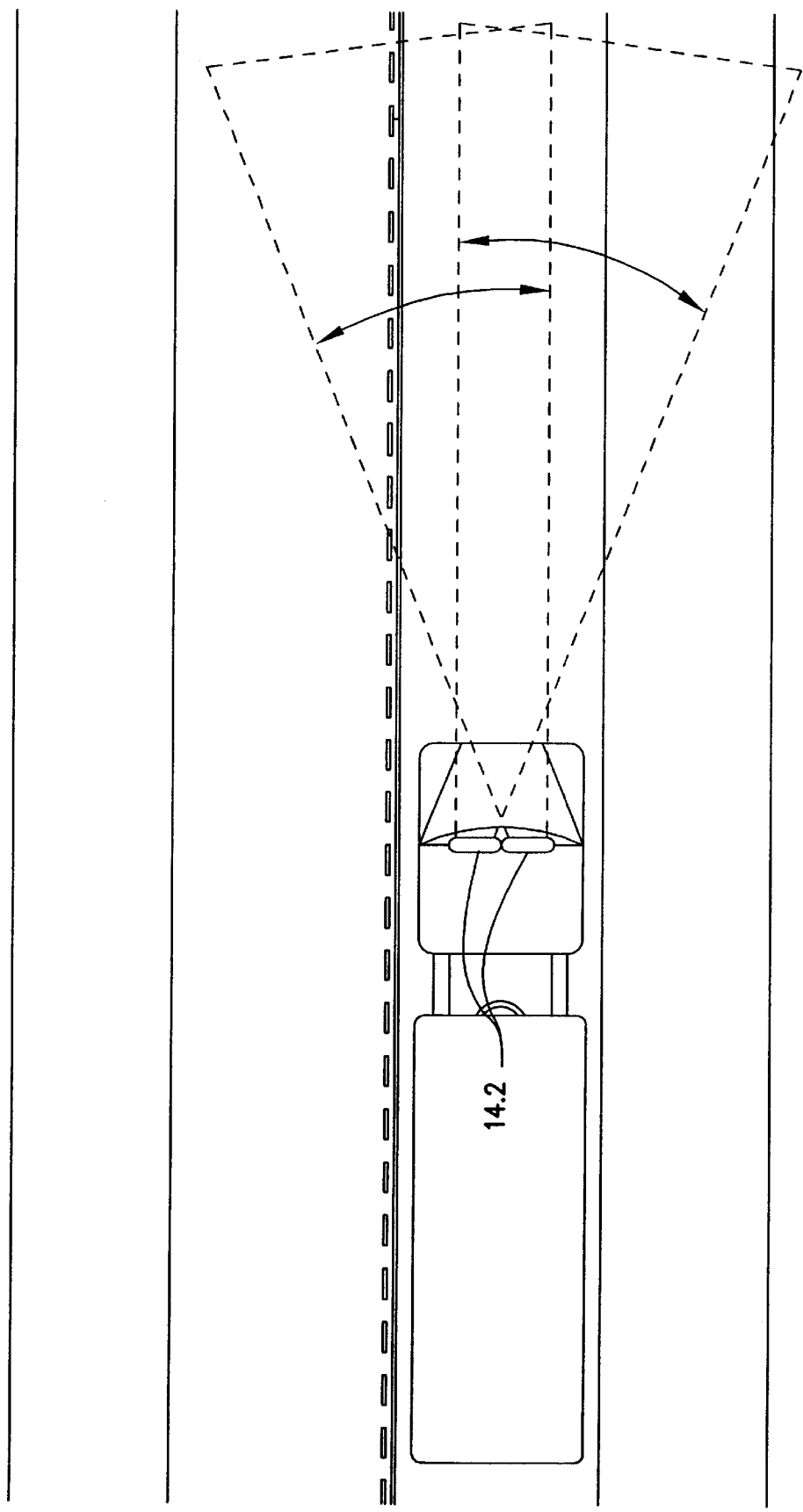
Figure 15:
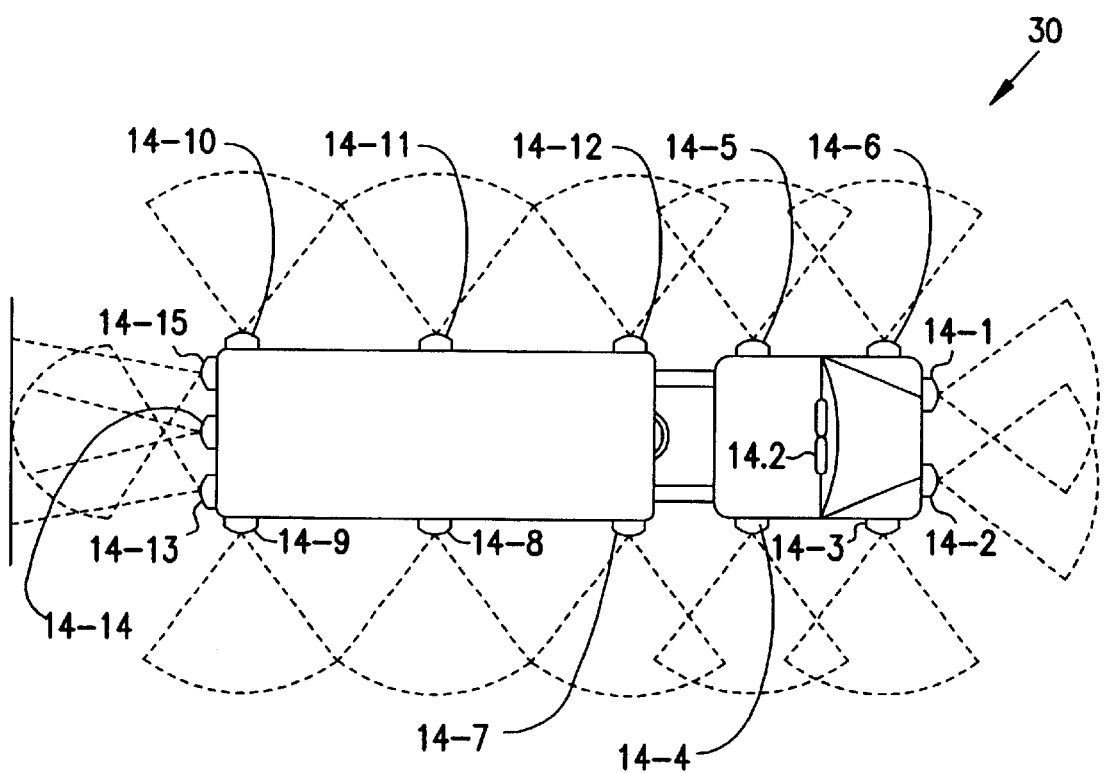
Figure 16:
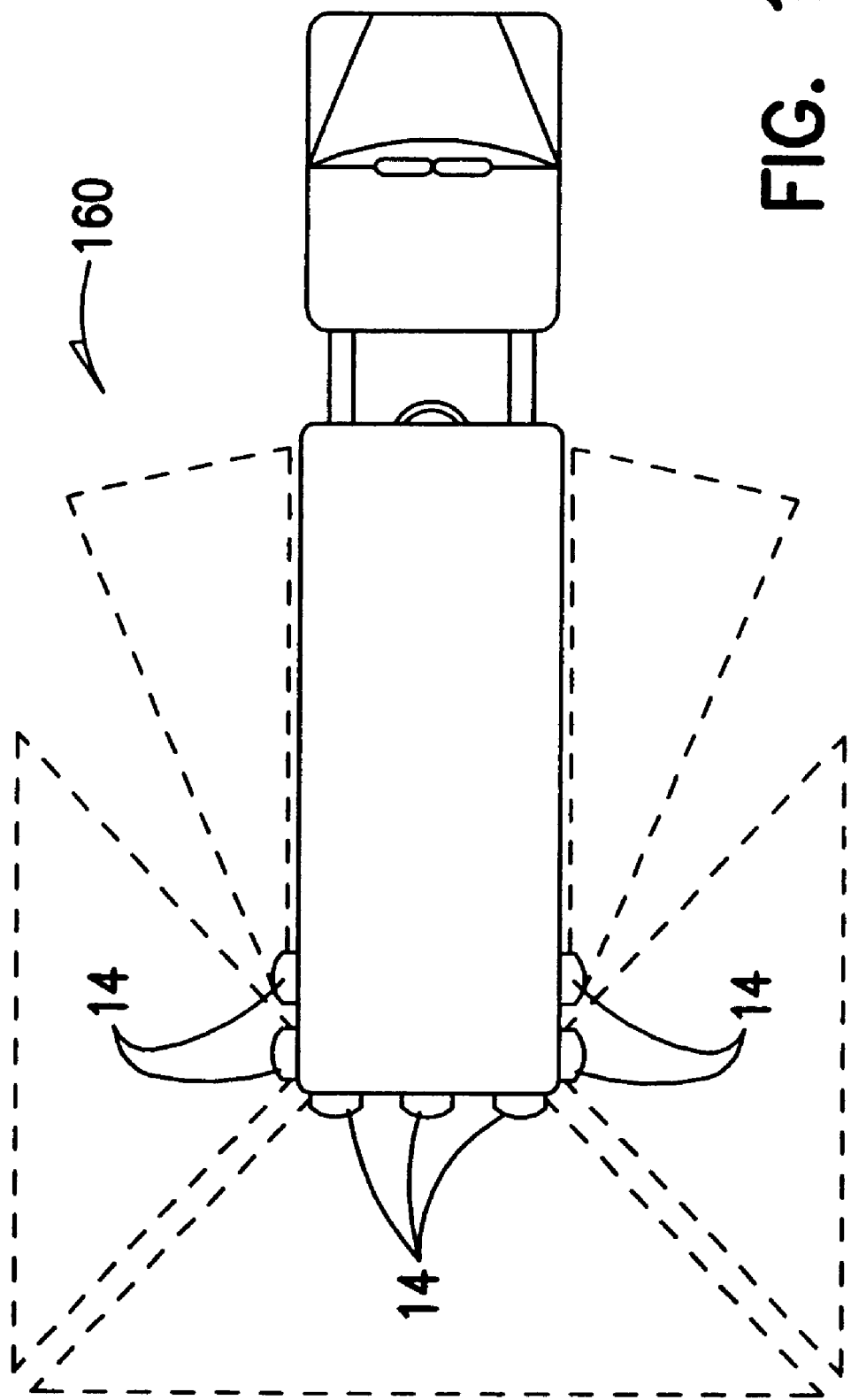
Figure 17:
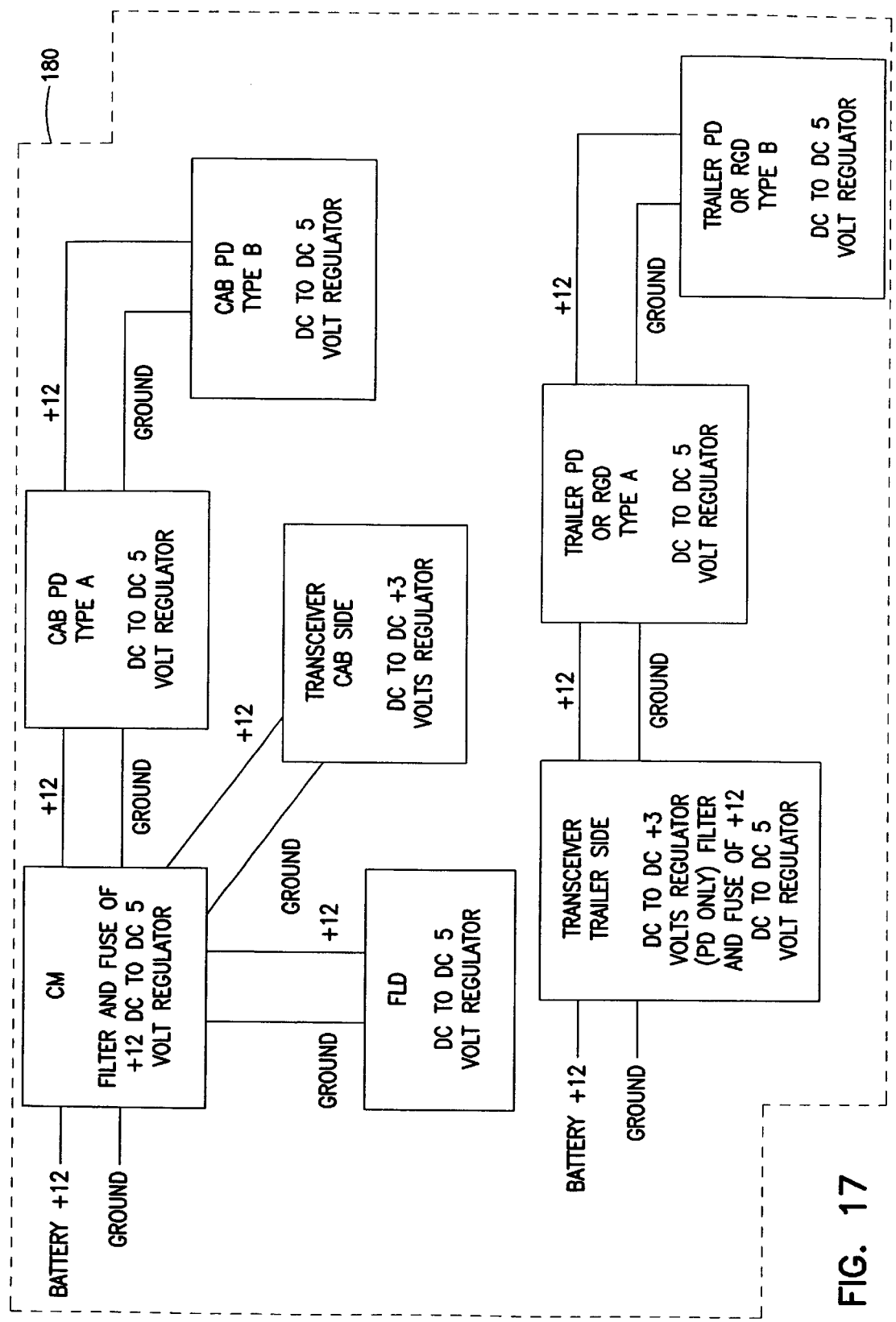
Figure 18:
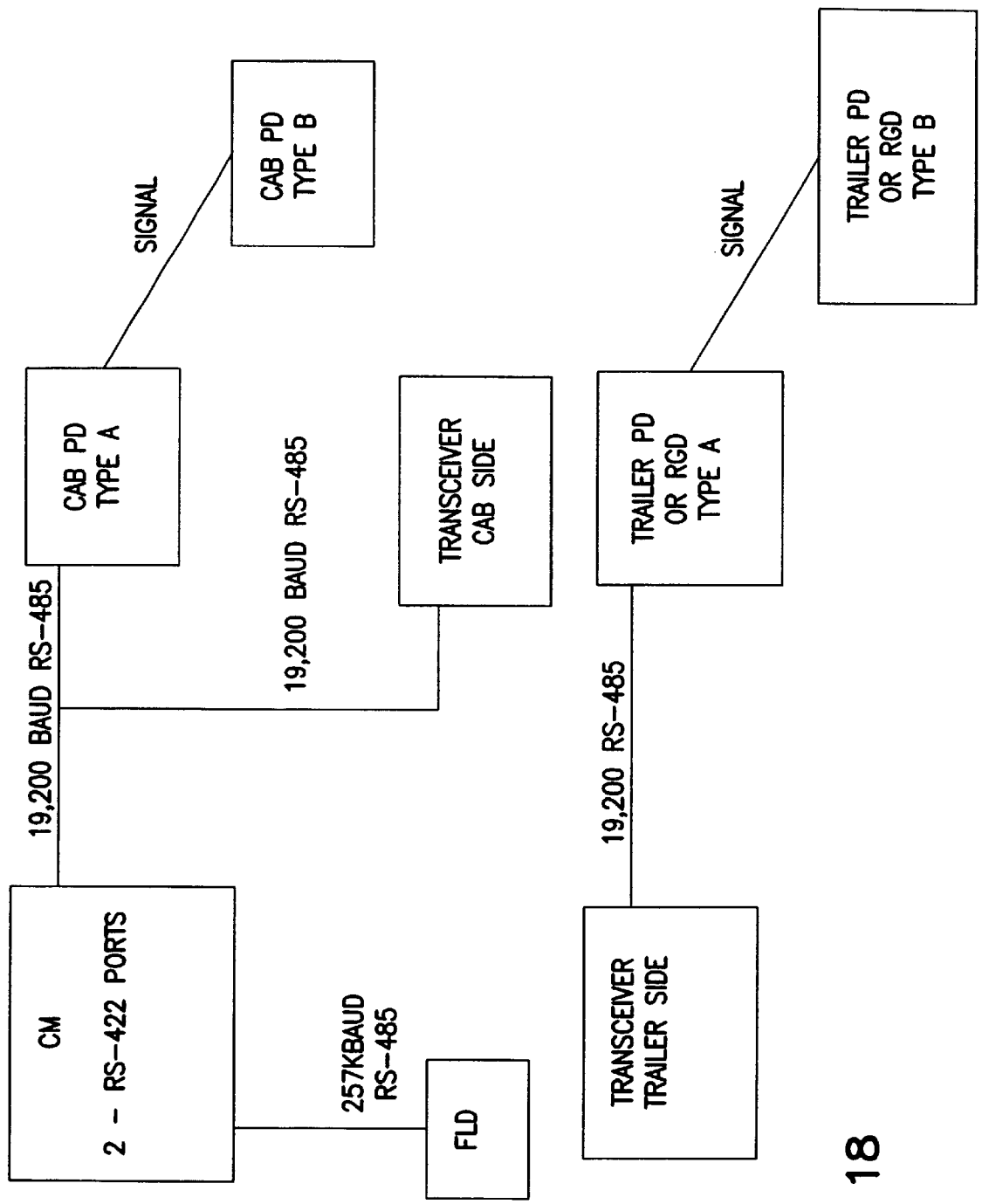
Figure 19:
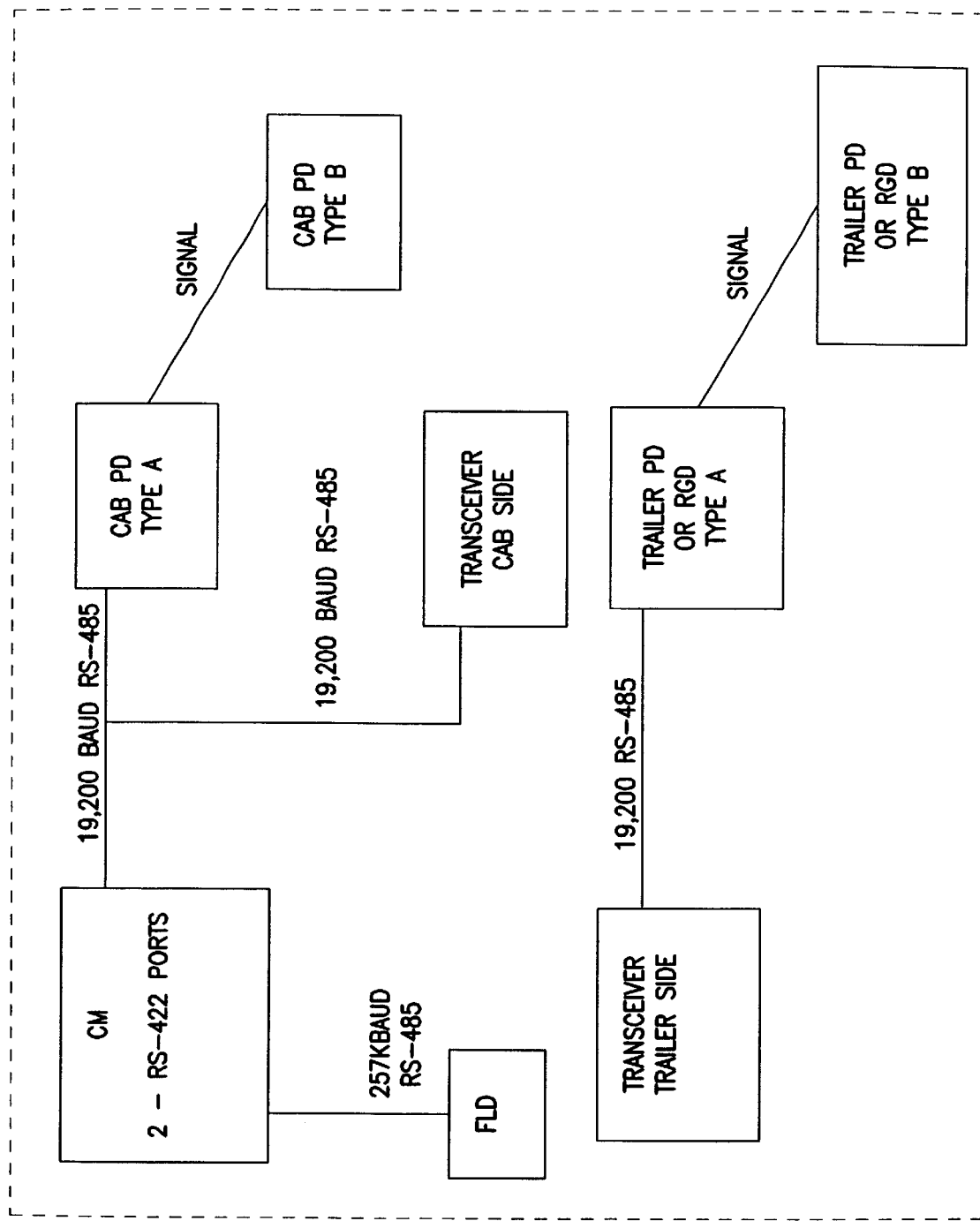
Figure 20A:
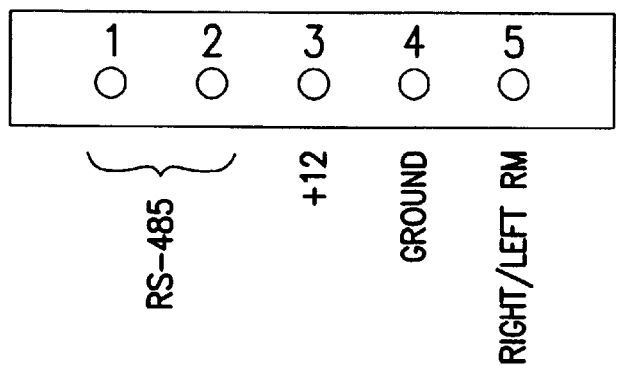
Figure 20B:
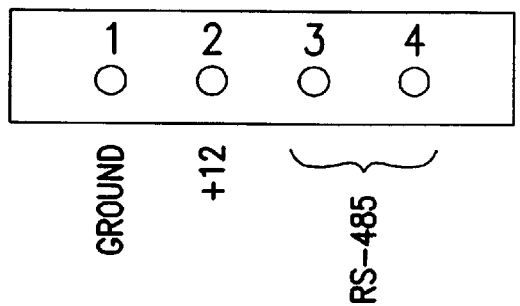
Figure 20C:
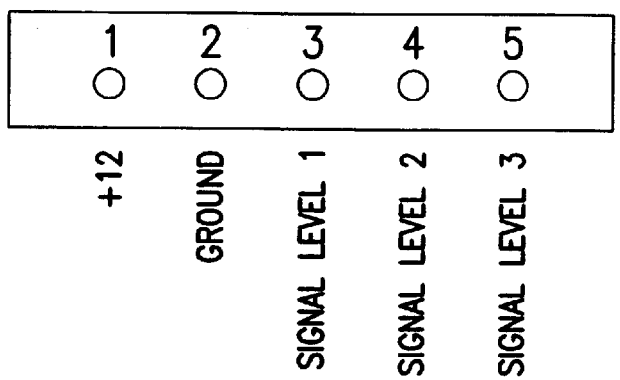
Figure 21:
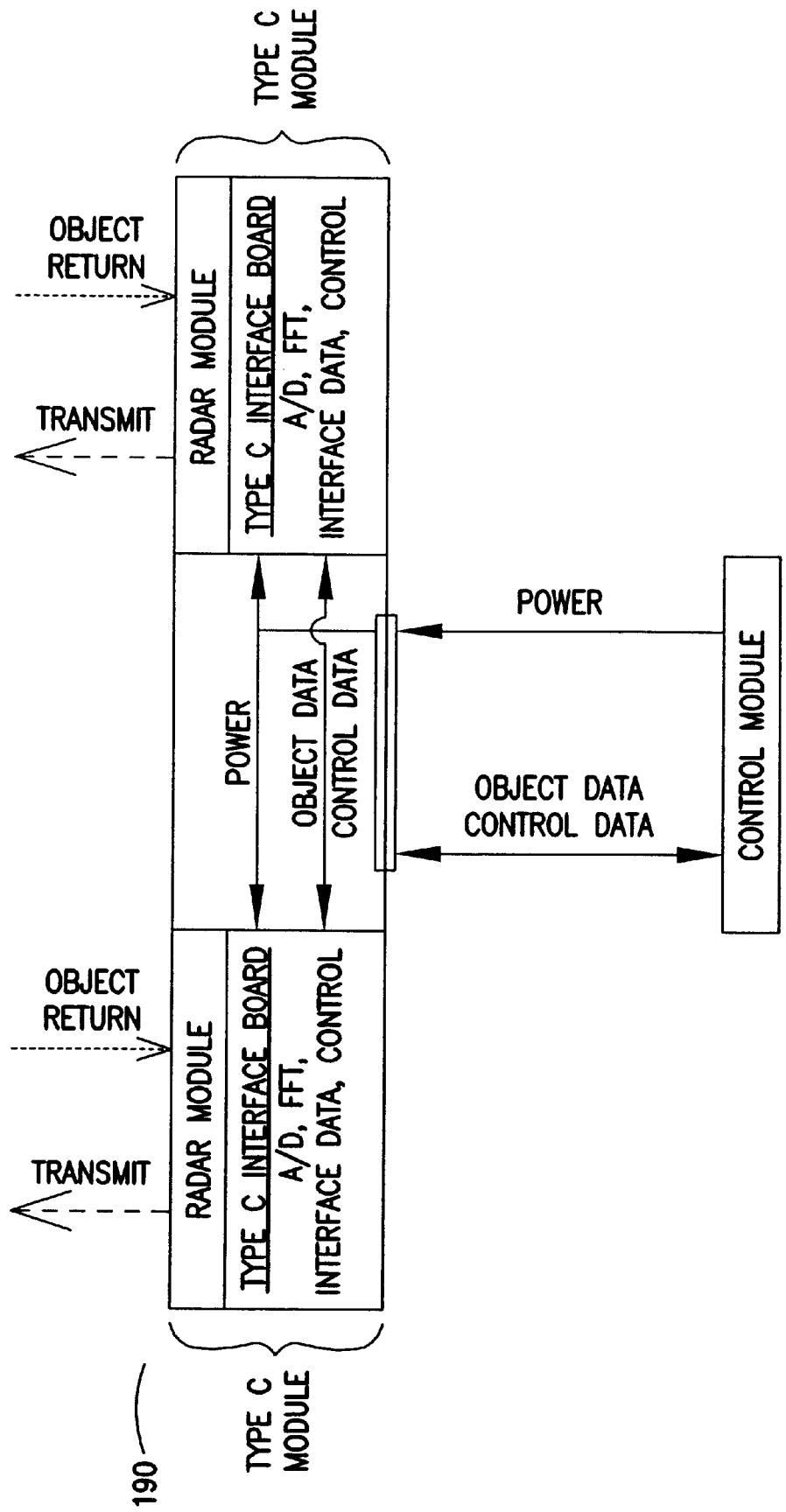
Figure 22:
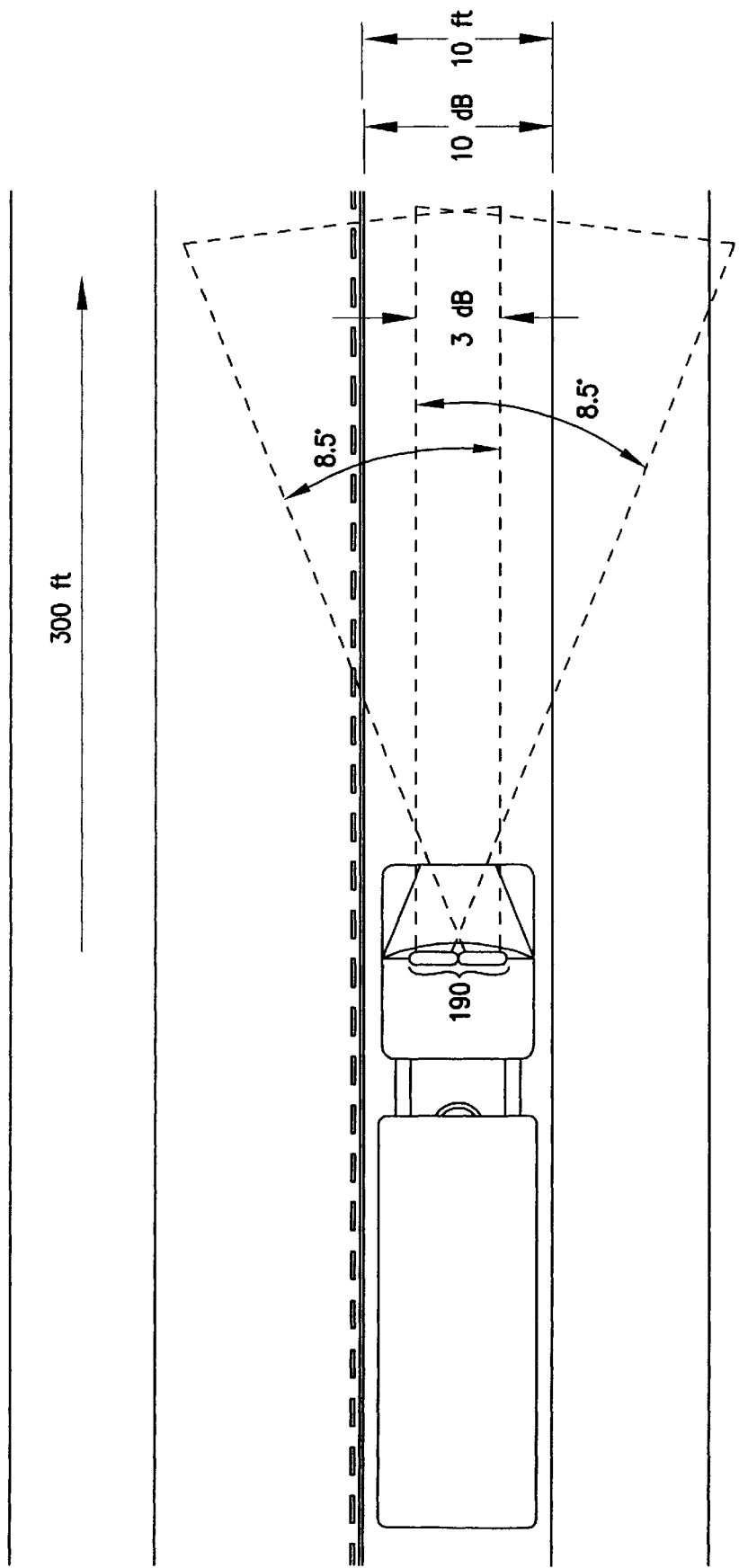
Figure 23:
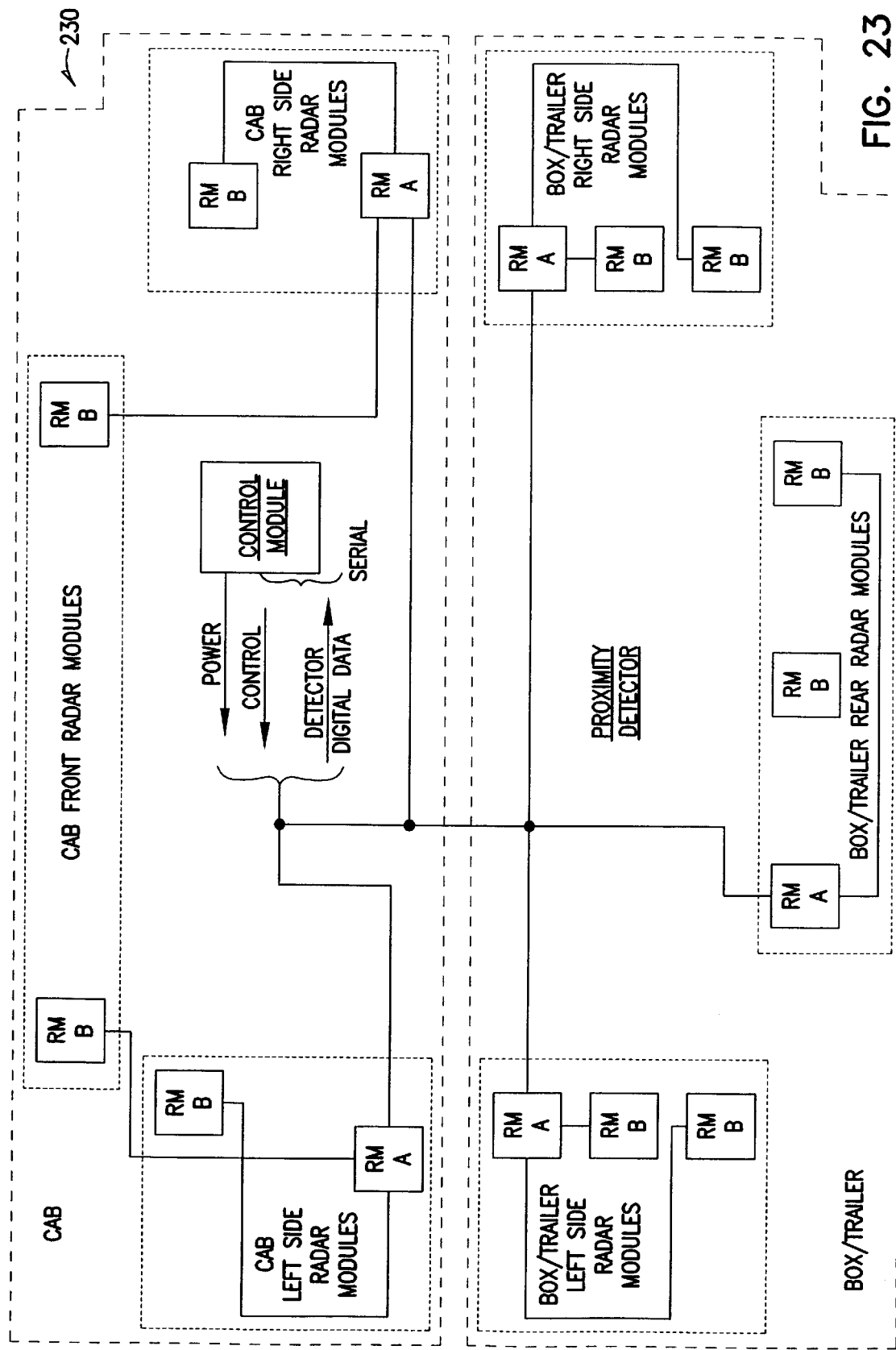
Figure 24:
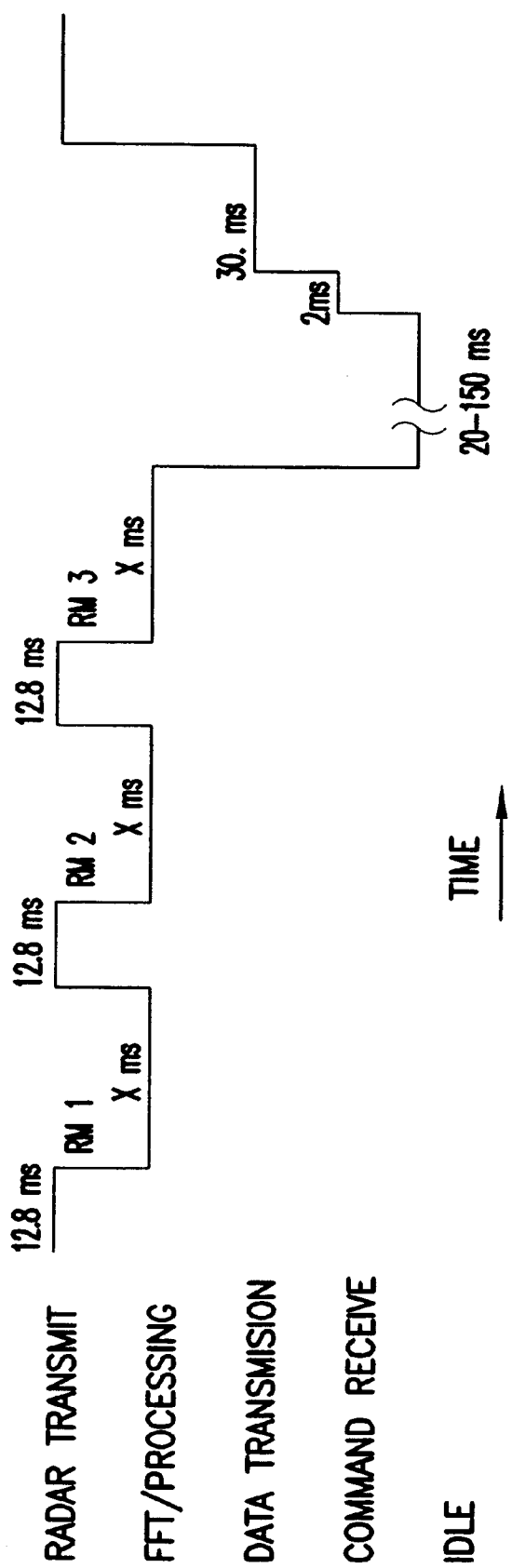
Figure 25A:
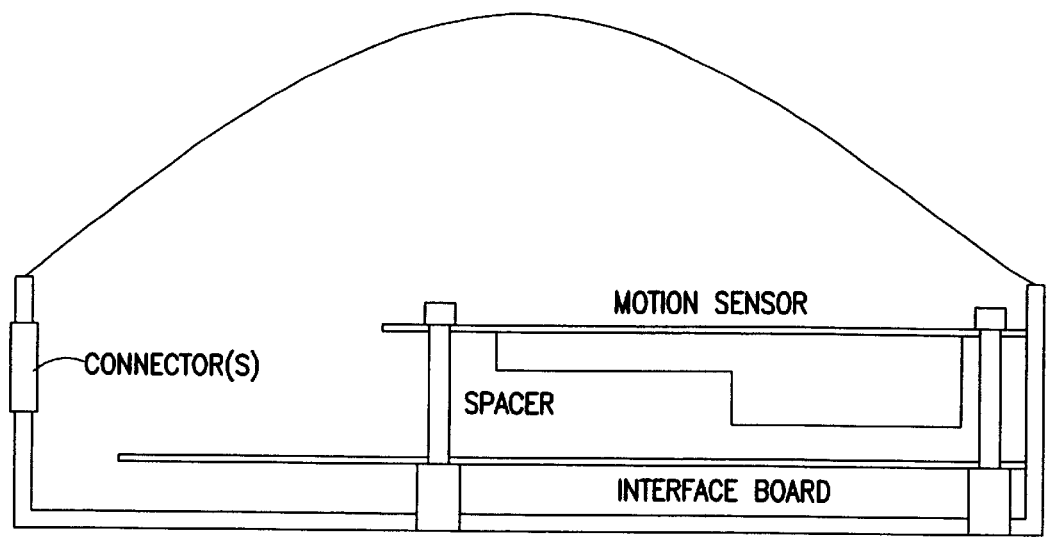
Figure 25B:
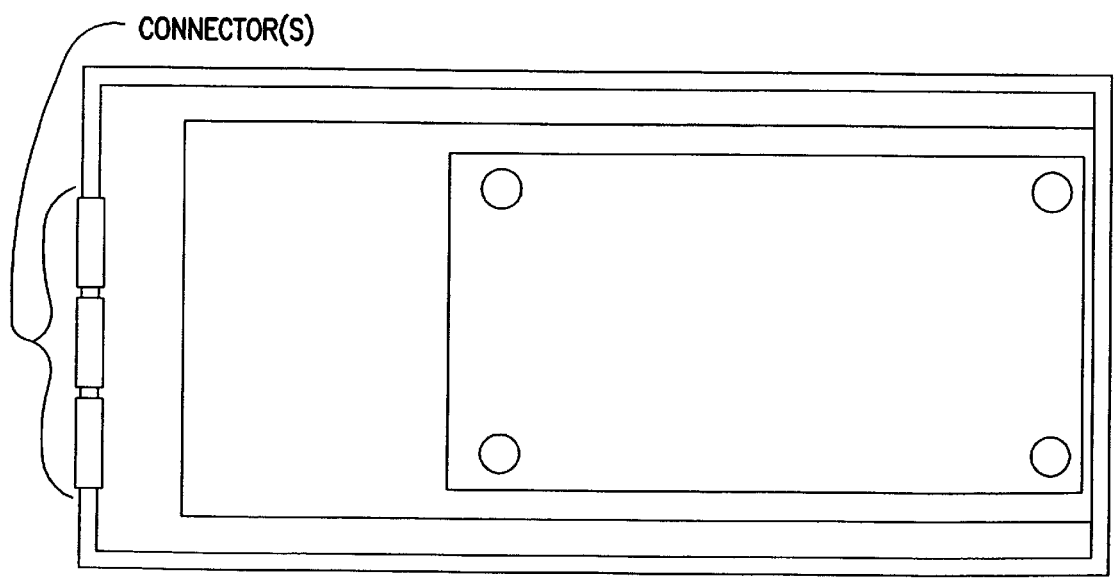
Figure 26:
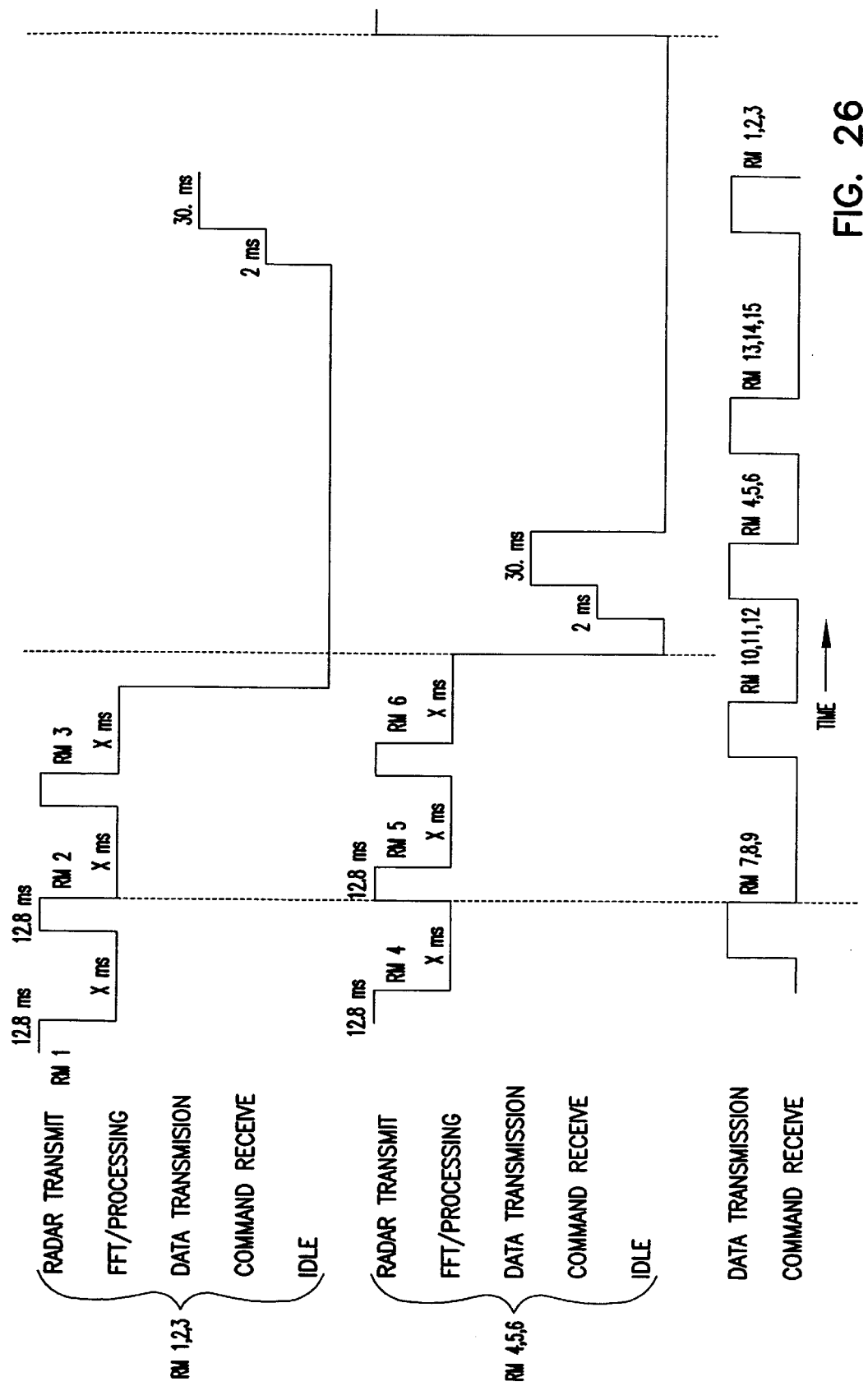
Figure 27:
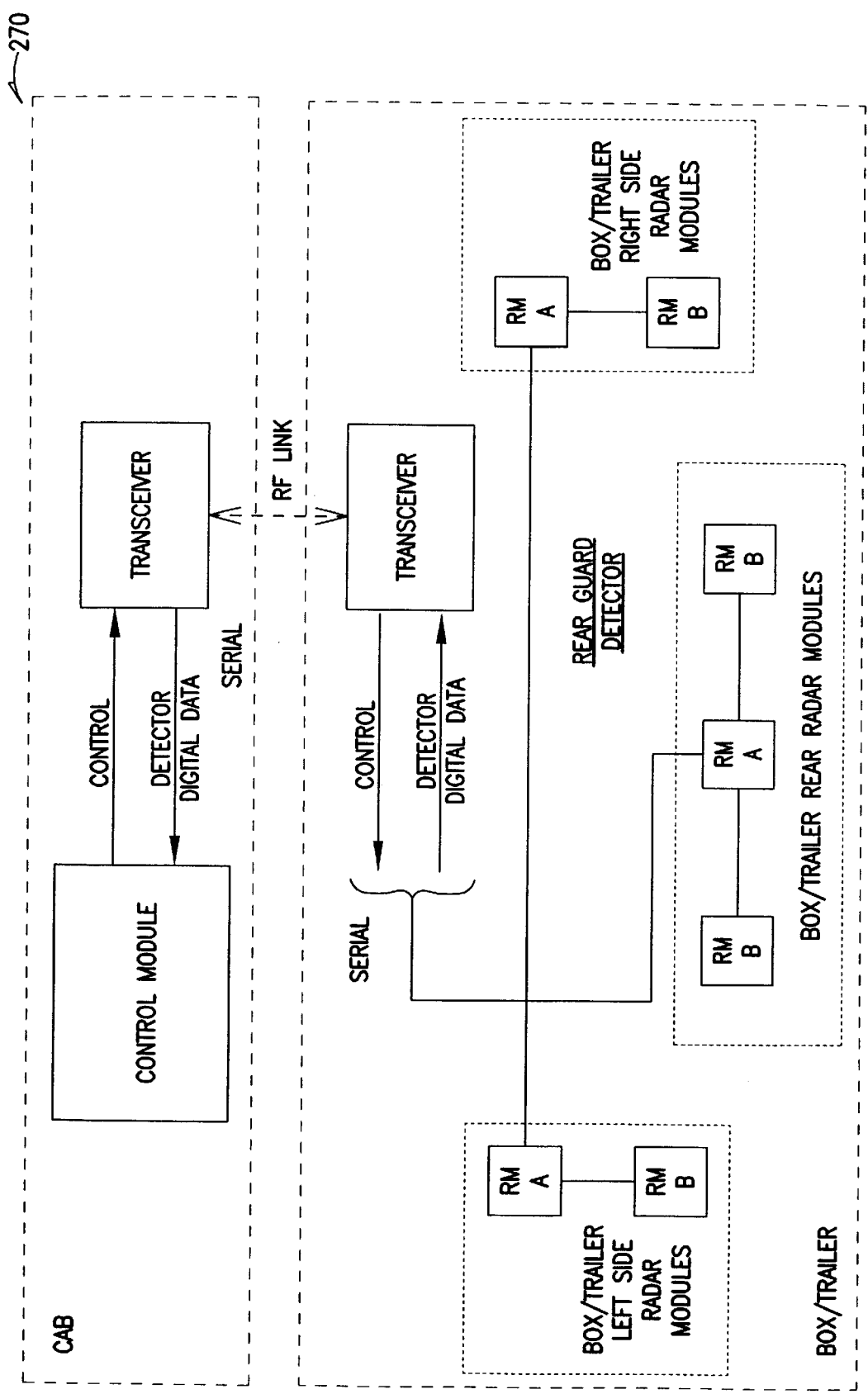
Figure 28:
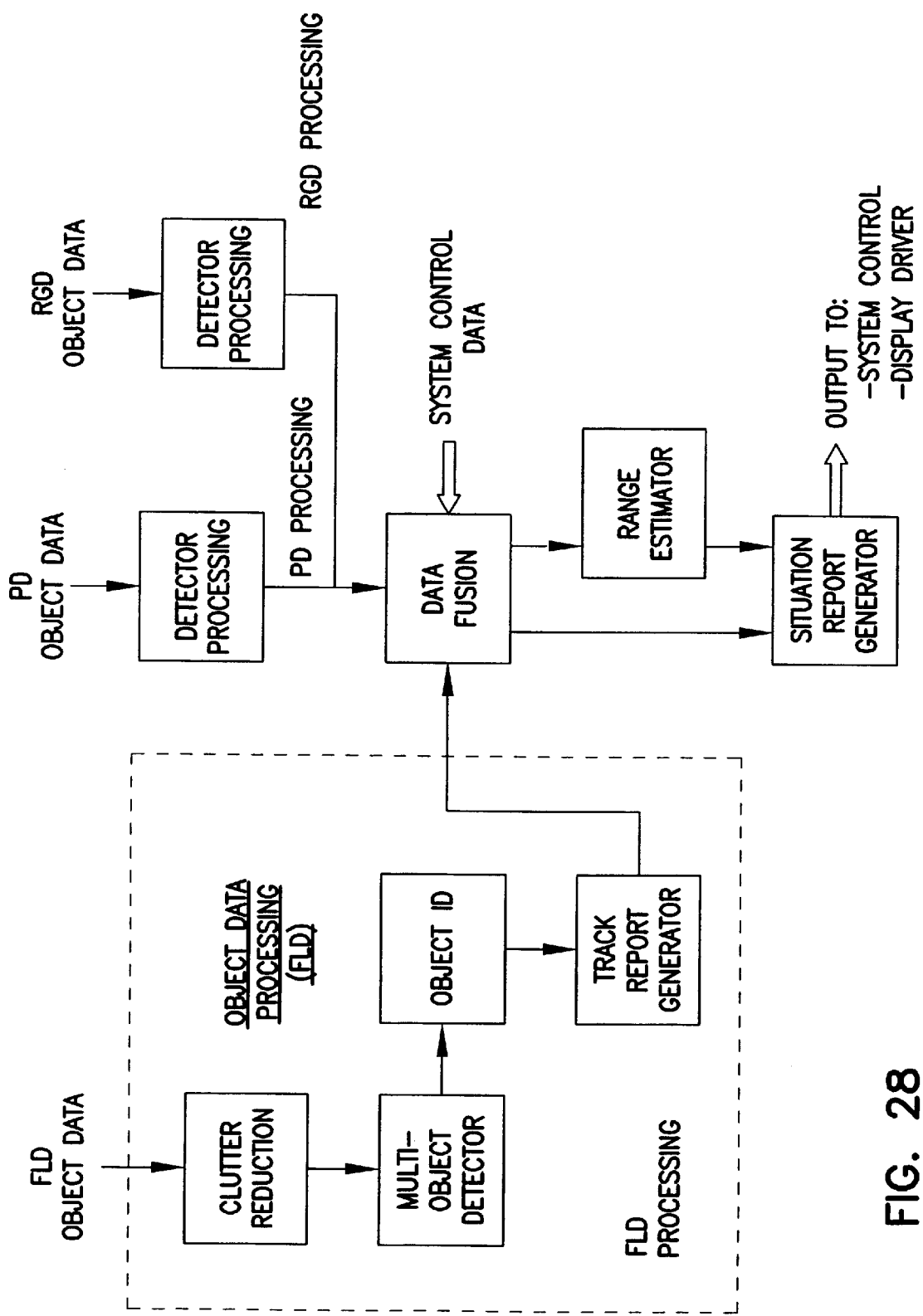
Figure 29:
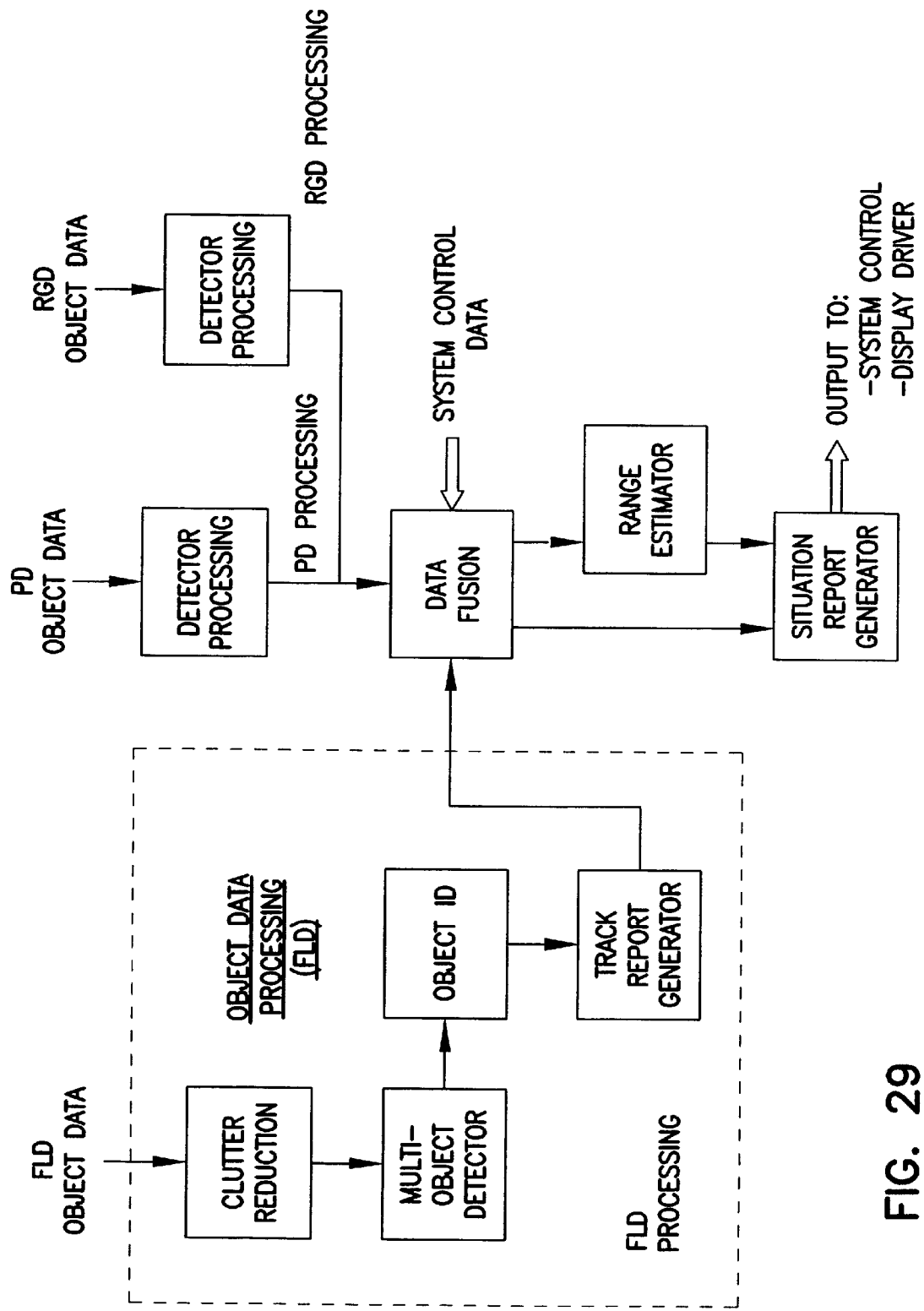
Figure 30:
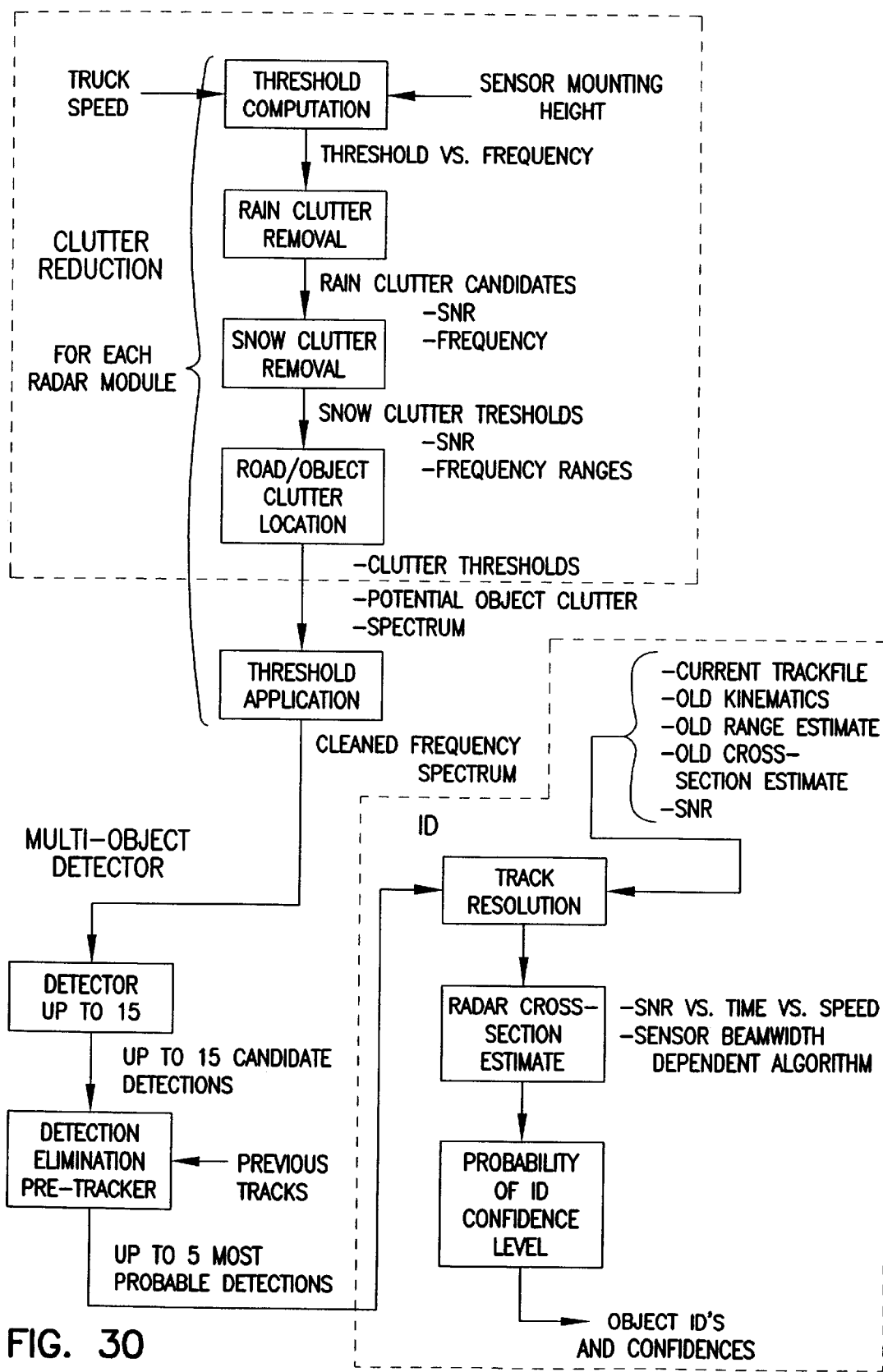
Figure 31:
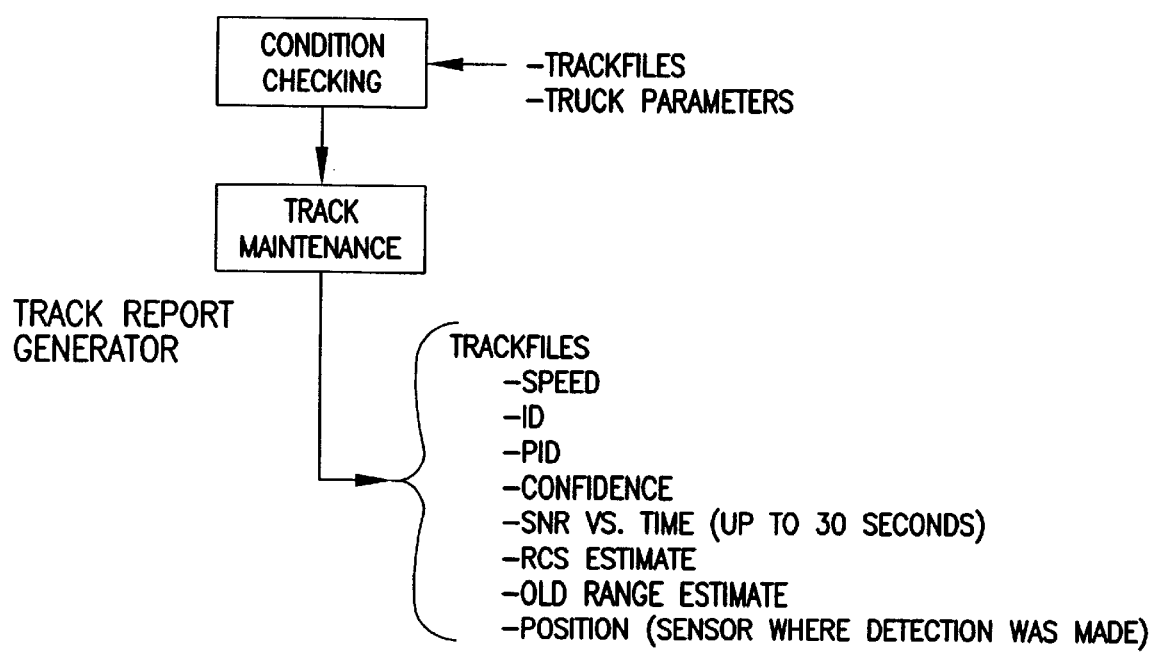
Figure 32:
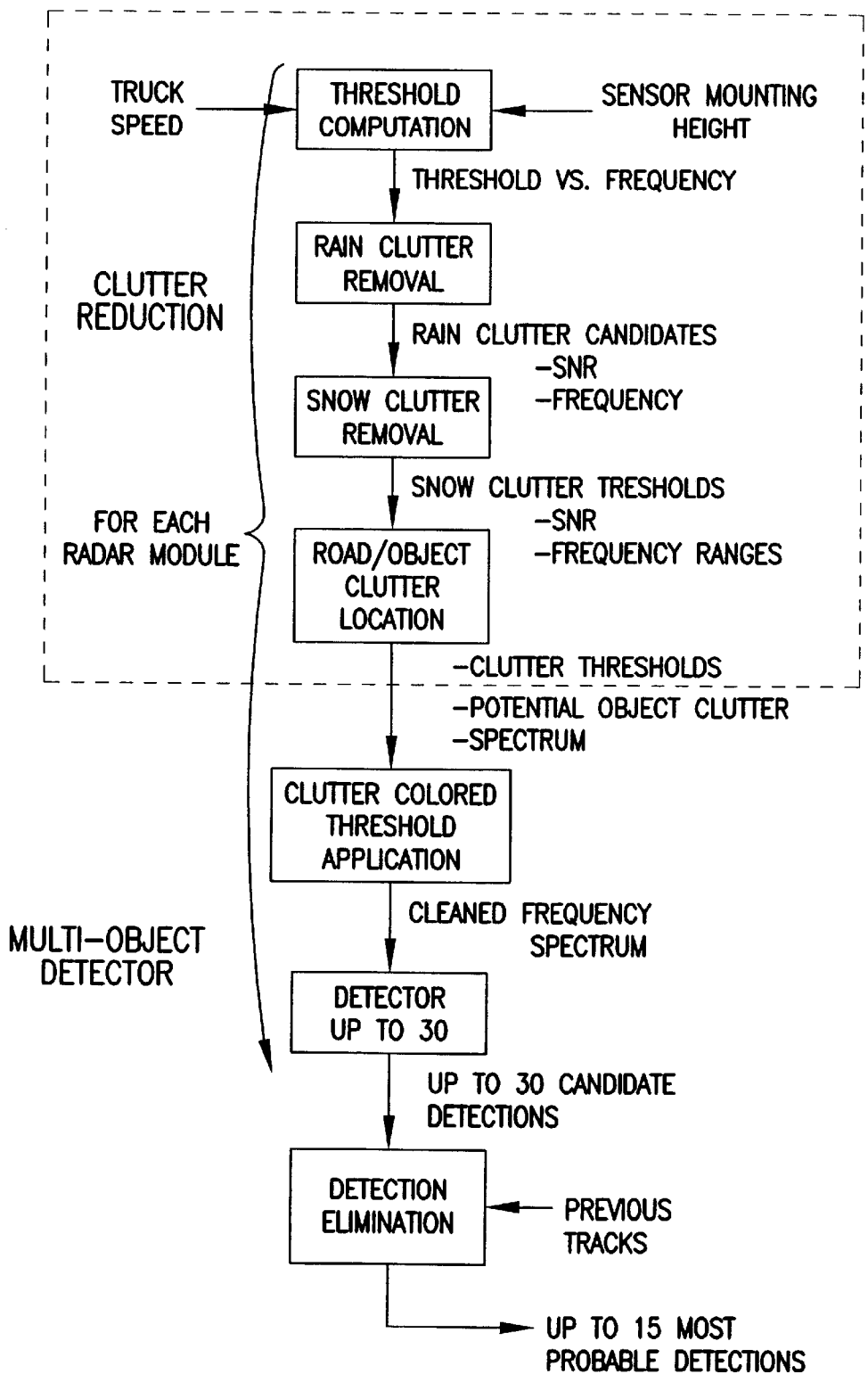
Figure 33:
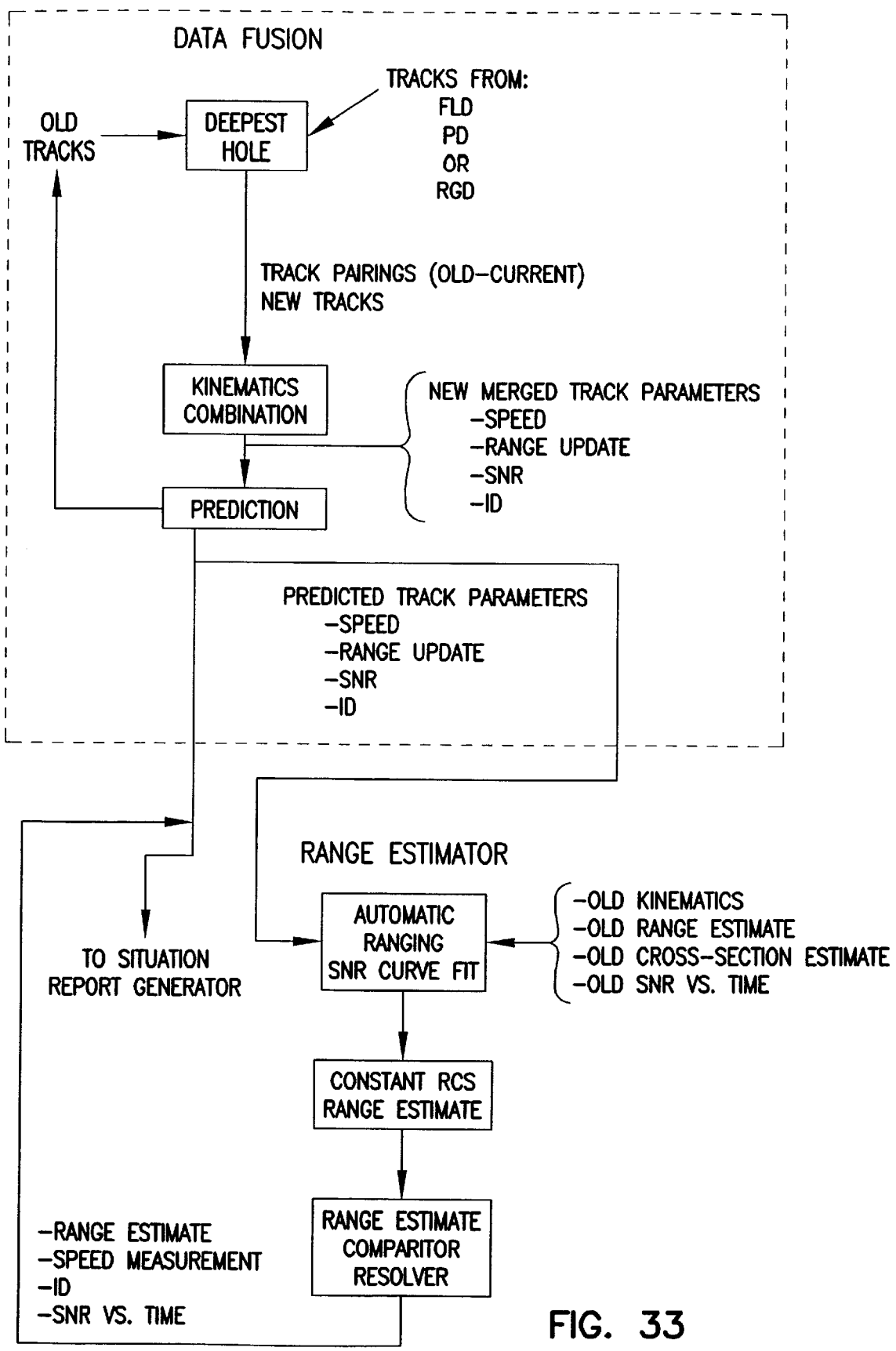
Figure 34:
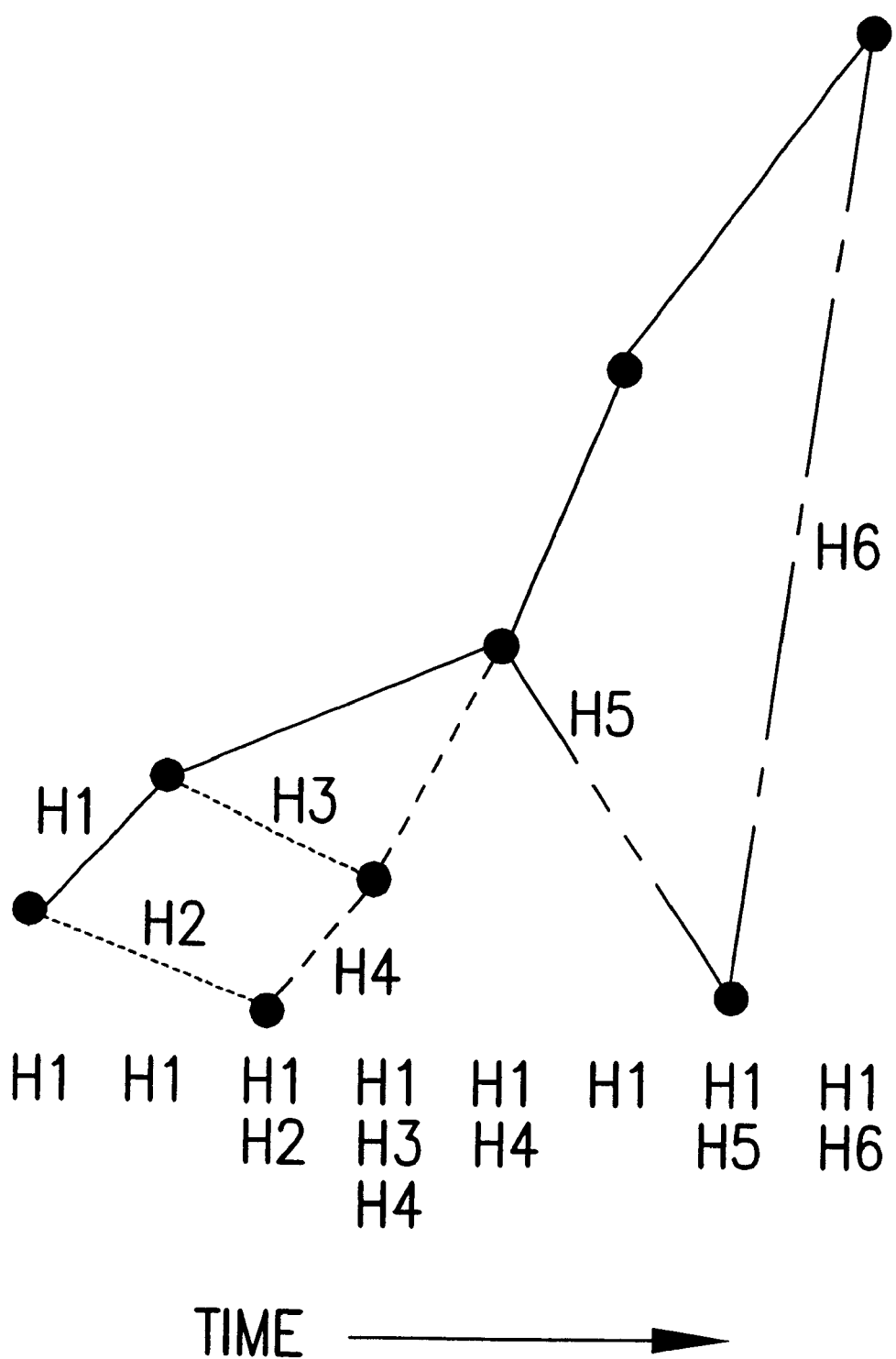

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Column 3,
Line 25, after "FIG. 13 illustrates a side display module." insert
-- Figure 14 shows one embodiment of a forward looking detector radar module system.
Figure 15 illustrates one embodiment of a proximity detector radar module system.
Figure 16 illustrates one embodiment of rear guard detector radar module system.
Figure 17 is an illustration of one embodiment of a type C radar module interface board.
Figure 18 is a block diagram of one embodiment of the power distribution plan.
Figure 19 is a block diagram of one embodiment of the data communications between radar modules.
Figures 20a-c show one embodiment of the pin configurations for the connectors.
Figure 21 is a block diagram of one embodiment of a forward looking detector.
Figure 22 is an illustration of the radar module alignment for a forward looking detector.
Figure 23 illustrates one embodiment of a functional design for a proximity detector.
Figure 24 is a proximity detector interface and operation timing diagram.
Figure 25a is a side view of one embodiment of a type A radar module layout.
Figure 25b is a top view of one embodiment of a type A radar module layout.
Figure 26 is a proximity detector system timing diagram.
Figure 27 illustrates one embodiment of a functional design for a rear guard detector.
Figure 28 illustrates one embodiment of a functional design for a control module.
Figure 29 illustrates the signal/data processing functions of one embodiment of a control module.
Figure 30 illustrates one embodiment of forward looking detector object data processing.
Figure 31 illustrates one embodiment of track report generator functions.
Figure 32 illustrates one embodiment of proximity detector and rear guard detector detection processing.
Figure 33 illustrates one embodiment of data fusion and range estimation.
Figure 34 shows an example of multiple hypotheses through amplitude versus time data for automatic ranging. --

Column 4,
Line 9, delete "in proximity detection" and insert -- in detection --, therefor.
Line 10, delete "detection subsystems" and insert -- detector subsystem --, therefor.
Line 10, before "detection subsystem 34" insert -- proximity --.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Column 6,
Line 7, after "unit 32" insert -- also shown as 32' in Figure 6a --.
Line 10, after "sufficient." insert -- The operator interface unit 32 includes a display 129, speakers 125, push-button switches 47, system status indicator 127 and switch legends 128. --.
Line 25, delete "pads" and insert -- bars --, therefor.
Lines 35 and 38, delete "pad" and insert -- bar --, therefor.

Column 10,
Line 6, delete "Wireless Portable Transducer System" and insert -- <u>Wireless Portable Transducer System</u> --, therefor.
Line 29, after "long extrusion" insert -- 72 --.
Line 33, after "extrusion" insert -- 72 --.
Line 40, after "boxes 70" insert -- and 72 --.

Column 11,
Line 6, delete "30" and insert -- 40 --, therefor.
Line 45, delete "Adding Additional Sensors" and insert -- <u>Adding Additional Sensors</u> --, therefor.
Line 65, delete "Sensor Protection" and insert -- <u>Sensor Protection</u> --, therefor.

Column 12,
Line 23, after "Transducer Assembly" insert -- 88 --.
Line 24, after "Transducer Mounting Bracket" insert -- 90 --.
Lines 25 and 46, after "Top Plate" insert -- 92 --.
Line 27, after "Bracket Side Plates" insert -- 94 --.
Lines 34, 35, 38, 40, 42, 48 and 49, after "Face Plate" insert -- 91 --.
Lines 37, 38 and 42, after "pivot arm" insert -- 93 --.
Lines 39, 41, 43 and 53, after "solenoid" insert -- 95 --.
Line 39, after "spring" insert -- 97 --.
Line 45, after "face plate" insert -- 91 --.
Line 47, after "Plates" insert -- 94 --.
Line 49, after "Bottom Plate" insert -- 96 --.
Line 51, after "out." insert -- The assembly includes a nut, bolt and bushing 87. --.
Line 54, after "Side Plate" insert -- 94 --.
Line 55, after "Back Plate" insert -- 98 --.
Line 57, after "Assembly" insert -- 88 --.
Line 58, after "return spring" insert -- 97 --.
Line 59, after "Side Plate" insert -- 94 --.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

<u>Column 14,</u>
Line 10, delete "our" and insert -- out --, therefor.

<u>Column 15,</u>
Line 33, delete "found" and insert -- find --, therefor.
Line 64, after "roof" insert -- 62 --.

<u>Column 16,</u>
Lines 21, 22, 23, 24, 25, 30 and 35, after "auger" insert -- 55 --.
Line 23, delete "34" and insert -- 32 --, therefor.
Line 47, after "Display Module" insert -- 36 --.
Line 62, delete "in shown in Appendix A." and insert -- is discussed below. --, therefor.
Line 64, after "issues raised above." insert --
    SYSTEM DESCRIPTION
    The loss of life, personal injury, and property damage are prime motivators when it comes to driver/vehicle safety improvements. This is particularly true in the trucking industry where continuing efforts are under way to improve driving safety through implementation of new technology. Factors which contribute to vehicle accidents are:

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

- Speed  -Visibility: night, fog, rain, and snow
- Driver Fatigue  - Highway congestion Recent technology advances are available which could provide a positive influence on these factors by providing warnings to the operator and reduce the probability of and/or the intensity of a collision. Collision avoidance is the primary goal in the application of advanced technology. Collision Avoidance as applied to truck vehicles can be defined in three categories:
- Head-on and Rear-End collision warning
- Backing collision warning
- Lateral collision warning The purpose of the Collision Warning System is to monitor the area around a large vehicle and provide warning to the operator of the presence or approach of an object in the roadway, such as, a vehicle or pedestrian, and the potential for a collision with that object if action is not taken. The Collision Warning System must also provide the operator with the distance to the object, its speed of approach and classification. The Collision Warning Systems consist of a display, a control module (CM) and a combination of a Forward Looking Detector (FLD), a Proximity Detector (PD) and/or a Rear Guard Detector (RGD). Figure 1 presents the system concept for the Collision Warning System.

Forward Looking Detector
The purpose of the forward looking detector is to monitor the area in front of the vehicle, to detect objects in the path of the vehicle that represent potential accidents, and to provide distance and speed information to the CM.

Two radar modules 14.2 are mounted on the cab roof or lower (bumper being the lowest mounting position), and aimed in the direction of the truck's forward motion to detect objects in the path of the vehicle. Figure 14 shows the location of the detectors 14.2 on the cab and the area of coverage. Detector data is provided to the control module where it is processed and the pertinent information is displayed to the operator for his action. Computations are performed on detected objects to determine their position, size, speed and direction of travel. Time to impact will be determined for those objects that are determined to be on a collision course with the vehicle.

The FLD 14.2 must operate reliably in a complex environment consisting of:
- Varying rates of speed
- Rural, urban, and freeway conditions

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

- Straight stretches of road as well as curves in the road
- 2 lane, 4 lane, 6 lane and off-road conditions
- Divided highways with a median or barricade
- Level roads, uphill roads, and downhill roads
- Extreme variations in environmental conditions.

There are two modes of operation required. The Primary Mode which is concerned with the potential for accidents directly in the path of the vehicle, described above, and the Secondary Mode which includes the Primary Mode plus detection of objects to the right of a snow plow that could impact a wing plow.

Proximity Detector

The PD is designed to detect objects in the immediate perimeter of a tractor-trailer. Radar modules are mounted in an array around the periphery of the cab and trailer. Figure 15 shows the location of each radar module and the area of coverage. The proximity detector modules detect objects in the perimeter field and provide the data to the control module for processing. After pertinent data is derived, it is sent to a display where the driver is alerted to take appropriate action to avoid a collision. The front modules will look for small children or objects immediately in front of the vehicle. The right and left side mounted modules will detect vehicles, pedestrians, and objects that may not be clearly visible to the driver. The rear mounted modules will monitor the area directly behind the vehicle.

A special case on snow plows requires that the center rear mounted RM be used to measure time-to-impact for vehicles approaching from the rear. The CM will activate a pulsed high intensity light to warn the driver of the on-coming vehicle of the presence of the snowplow.

The PD Modules are selectively activated by control signals sent by the CM. The conditions under which they are activated include:
-Activate front PD Module group when speed is under five mph.
-Activate rear, left and right PD Module groups when the transmission is in reverse.
-Activate left or right PD Module group when left or right turn signal is turned on.
-Activate right, left, and front PD Module groups when the three way mode is selected.
-BIT initiation.
-Master Clear: initializes all electronics in the proximity detector.

UNITED STATES PATENT AND TRADEMARK OFFICE
CERTIFICATE OF CORRECTION

| | |
|---|---|
| PATENT NO. | : 6,268,803 B1 |
| DATED | : July 31, 2001 |
| INVENTOR(S) | : Richard A. Gunderson, Michael A. Parisi, Richard P. Gorman and Kurtis W. Melin |

It is certified that error appears in the above-identified patent and that said Letters Patent is hereby corrected as shown below:

Rear Guard Detector

The Rear Guard Detector 160 is functionally the same as the Proximity Detector. The main difference is that the RGD 160 covers the peripheral area around the trailer only. It is a portable system which can be moved from trailer to trailer and works in conjunction with the CM in the cab. Being portable, the RGD is self powered and a RF link has been added to communicated with the CM in the cab. Configuration, location, and area of coverage are shown in Figure 16.

The functional interface for the RGD is identical to the PD except that the interface uses a RF link to transmit data to the CM rather than a hard-wired connection. The CM sends activation signals as follows:
- Activate rear, left and right RGD Module groups when the transmission is in reverse.
- Activate left or right RGD Module group when left or right turn signal is turned on.
- Activate right, left, and front RGD Module when the three way mode is selected.
- BIT initiation.
- Master Clear: initializes all electronics in the RGD.

*Detailed functional descriptions for each of detector subsystems are provided below.*

RADAR MODULE

The Radar Modules are a combination of motion sensors available off-the-shelf, an amplifier and a signal processing chip. They come in three configurations: Type A with a motion sensor, an amplifier and a microcontroller; Type B with a motion sensor and an amplifier; Type C with a motion sensor with a big antenna, an amplifier and a microcontroller. A notional diagram of the Type C RM Interface Board 170 is shown in Figure 17. The motion sensors are microwave motion sensors that operate in X-Band frequency range. These modules utilize a dielectric resonator oscillator and a microstrip patch antenna to achieve low current consumption, high temperature stability, high reliability, and flat profile.

The radar modules for the PD and RGD systems will come in two generic types. Type A will include the radar, an op-amp circuit, and the RM interface board. Type B will include the radar and an op-amp. Up to two type B RMs can be connected to a Type A. The connection between a Type A and Type B will be a 4-wire cable. The 4-wire cable will be for +12 volts, two for signal, and ground.

The housing for the Type A and Type B RMs should be similar or the same. The Type A will have two connectors for the Type B inputs and one connector for connection to a serial port and for power. The Type B will have one connector for output and power.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

A Type A RM will distribute power to a maximum of three radar motion sensors, the onboard motion sensor and two Type B RMs. The Type A will use up to 10 A/D ports on a microcontroller and sequentially sample data from each attached motion sensor. The Type A will also perform a 64 point FFT on each set of 5 kHz sampled motion sensor data. The first 20 samples from the FFT results will be output via a serial channel. The location of all sensors is important to the operation of the data fusion system. A typical installation will only use five Type A's but there is really no reason why all the sensors could not be Type A's. They can be put in any PD or RGD position.

At installation the installer will set the CM into installation mode and select on the menu, through the programmer, the position of the first RM, Type A or B. The installer will then approach the selected sensor location and wave his/her hand within one inch in front of the antenna housing, until a tone is heard from the CM and stop for five seconds and repeat the waving. A tone will sound and the installer will repeat this step. The installer will repeat the intermittent waving until the system gives a three beep OK response. This will typically take only waving at the sensor twice. The installer will then proceed to the next RM. All RM's will be programmed in this fashion. This will allow the CM and Type A modules to coordinate the location of each sensor.

At installation, the software in the CM will send an initialization serial message to all Type A modules. The software on the microcontroller will look for this message if it has not been assigned an address. Upon receiving this message the software will perform a 64 point FFT every 300 milliseconds. The first 20 samples out of the FFT will be sent back to the control module if one of these samples crosses a threshold. The CM will use this data to identify the RM which responded to the installer. Once the installer has gotten the three beep OK, the CM will send out an address number (1 to 15) to identify the RM's position (see Figure 15). The CM will also send out the Type A's position along the truck, height, transverse distance from the left front corner of the truck, and distance from the front of the truck. The Type A, will accept this data and store it in EPROM. The Type A which is being positioned will then store the port number (connector) on which the signal was being received. This will allow the Type A to respond to this port number's address when polled by the CM.

The position of the sensors with respect to the tractor will be communicated to the CM, by the Type A's, upon startup. When the CM initializes the system the RM's will be polled (1 through 15). Each Type A module will respond when its number or the number of an attached Type B, is polled. The Type A module will send out location and other information about the RM.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

The Type C RM is similar to a Type A. It contains the radar motion sensor, with a 16x2 pad antenna. The software samples 256 points of data from the onboard sensor. The data is fed to a 256 Point FFT. The first 128 samples from the FFT results will be output via a serial channel. To distinguish between left and right Type C, the last pin on the left connector will be shorted to ground. This pin will not be used for anything else (power or signal). The wiring in the FLD enclosure will be fixed such that it cannot be confused and reversed. The FLD uses two Type C RMs.

One rear guard RM (#14-14) (the center one) will be configured to search a shorter range to assist in increasing back-up range accuracy. This RM must be a Type A RM. The CM will command this RM to sample either a unity gain op-amp channel or to sample the normal gain op-amp channel (every Type A will be able to do this). This will allow the RM to be used for long-range detection when the vehicle is not in reverse and short-range measurements when the vehicle is in reverse. This same command from the CM will change the sampling rate on the A/D unity gain channel to 2 kHz when in reverse (provides a 2.5 times finer measurement of vehicle speed).

Power Distribution
The power distribution plan 180 is shown in Figure 18. The vehicle battery powers the CM. The +12 volts is filtered and fused in the CM. The +12 volts is then supplied to the FLD and any Type A RM on the cab or truck without a trailer. Trucks with a trailer will have power to all cab Type A RMs and to a transceiver. The trailer will use either a set of PD's or an RGD. The PD's will use the trailer's +12 power to supply the Transceiver/power convert module. This module will filter and fuse the +12 volts and convert the power to +3 volts for the transceiver and send the +12 volts out. The +12 volt power will then be sent to all trailer Type A modules. The Type A and B modules will DC to DC regulate the +12 down to +5 volts. The RGD is powered by its own battery and will distribute power from this 12 volt battery the same as the PD.

Cabling
The communications signals between the modules are shown in Figure 19. Type B's send audio frequency signals to the Type A's. Type A's send RS-485 at 19,200 Baud to either a transceiver or the CM directly. The RS-485 cabling is T'ed between the Type A modules. Type C's send data over a 400 Kbaud RS-485 interface. All RS-485 interfaces are two way.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

The cabling between the Type A and Type B consists of four wires: +12 volts, ground, and two for Signal. The cabling between a Type A and the CM or a transceiver is four wires: two for RS-485, +12 volts, and ground. The cabling between a Type C and the CM is four wires: two for RS--485, +12 volts, and ground. The cabling between a transceiver and the CM is four wires: two for RS-485, +12 volts, and ground. The pin configuration for the connectors is shown in Figure 20.

Calibration
    At the time of manufacturing testing the Radar Modules may need to be calibrated. A calibration fixture consisting of a fan permanently mounted to one end of a rectangular tube assembly will be used to program a gain characteristic number into the sensor microcontroller memory. This will be done for Type A and C modules. The coding in the microcontroller will be put in manufacturing mode and will expect a specific return from the test assembly. A number denoting the difference between the expected and the measured value, to the nearest dB, will be stored. This will be sent via the header message to the CM for use in signal processing.

Microcontroller Firmware
    The microcontroller will perform the following functions in firmware:
1. Manufacturing test Calibration data storage
2. Installation Initialization
3. 2-way Serial Communications
4. Multi-channel A/D
5. 256 or 64 point FFT
6. Command Logic Processing FORWARD LOOKING DETECTOR FUNCTIONAL DESCRIPTION
    The FLD consists of two Type C Radar Modules. The Block diagram of the FLD 190 is shown in Figure 21.
    These two sensors are narrow beam motion sensors. The beamwidth is 8.5 degrees at the 3 dB point of the antenna pattern. The two sensors are pointed across each other as shown in Figure 10. This results in a 0 to 10 dB antenna pattern change for both of the sensors focused in a 10 foot column 300 feet in front of the track. The difference in antenna pattern gain will be used to differentiate between objects directly in front of the truck and objects not directly in front of the truck.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

The RM alignment for the FLD 190 is shown in Figure 22. This alignment is such that the antenna gain is 10 dB lower than the peak at the edge of a 10-foot by 300-foot rectangle.

Interface Board
The Interface Board is built into the FLD Type C RM and is the primary interface between the RM and the CM. The Interface Board uses chips from MicroChip Development Systems. These MicroChip chips will be used to perform the A/D, FFT/ signal processing, and communications formatting for the messages. The messages will either be parallel or serial depending on the most cost-effective method that meets the FLD to CM data rate requirements. These chips are powered by a +5 volt DC source and are programmable in C and assembly language. The Interface Board performs four primary functions:

Timing: generate on/off power pulses to the radar modules for either minimization of power consumption or to meet FCC regulations. Timing between the two MicroChip A/D chips is handled by handshaking with the CM. This timing controls the sampling, FFT, and data transfer to the control module. Sample time for each FLD sensor is 25.6 ms for 256 samples of data at 10 kHz. Using two FLD sensors collecting data simultaneously and combining the data in the control module, the overall sensor report data rate would be approximately 50 milliseconds.

A/D: Digitizes the FLD radar data. The A/D function performs a ten-bit quantization of the incoming analog data. Individual MicroChip A/D processors are used for each FLD sensor. This allows minimal latency and a faster overall sampling rate. Two channels will be used on the A/D. The first channel will sample a high gain op-amp output. The second channel will sample a low gain op-amp output, with the third channel sampling the lowest gain op-amp. The fourth and fifth channels will be used to set the reference voltage on the A/D. This will provide for 90 dB dynamic range when using a 10-bit A/D.

FFT: Performs a standard 256 point FFT using the 256 samples collected. Only lower 128 points are returned to the control module (this corresponds to a 1.25 mph per Doppler bin closing rate resolution). (This is subject to change based on the speed of the MicroChip processing. If processing is too slow in the MicroChip, the FFT will be preformed in the CM and 256 samples of data will be transferred).

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Communications with the Control module: Provides a serial data interface.

The MicroChip PIC17C756 series chip will be used for the Type C radar Module. This chip requires one oscillator at 33 MHZ.

Data Communications
The first 128 samples from the FFT results, from each Type C in the FLD, will be output via a serial channel. This channel will be a two way communications link with the CM. When the data is ready, finished the FFT, the chip will wait for the command to send the data. The data (256 bytes) will be transferred in less than 10 milliseconds. This equates to a data rate of 257,000 Baud of unpacked data. Each pair of bytes will contain one 16-bit point of the FFT output. A header message will accompany the data, identifying the RM being sampled. The Interface Design Specification will define this message.

Circuit Design
The Type C RM consists of two major parts, the off-the-shelf motion sensor and the interface board. The interface board will be manufactured by ATI (Altra Technologies, Inc., 18220 South Shore Lane W., Eden Prairie, MN). It is a 4-layer board approximately 4" by 3". It contains one MicroChip PIC17C756 chip, an op-amp and various discrete components. It is wired to a five-pin connector on the RM housing.

PROXIMITY DETECTOR FUNCTIONAL DESCRIPTION
The purpose of the PD is to monitor the area around the periphery of the vehicle by detecting objects that could potentially be struck by the vehicle if it moved left, right or back and to provide distance information to the CM. Figure 23 presents the Block diagram for the PD 230.
The PD uses Type A and B Radar Modules. This array of radars will be interconnected in groups of up to three radars to a RM Interface Board which is used to sample all three RMs simultaneously and send the processed data to the CM upon request. The multi-port interface card in the CM will cycle through each device sampling the information. As in the FLD, the object signal data from the RMs is digitized and sent by wire link to the CM for processing. The CM will control the sampling. Figure 24 is a diagram of the timing for a single RM interface board and the associated RM's. The only unknown time is the time for performing the FFT and associated formatting of the data. It is not believed that this time approaches the idle time for the interface board.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

The individual sensors are switched on for 12.8 milliseconds every 333 milliseconds (more than one sensor group will collect data at the same time). They are sampled at 5 kHz, giving 64 samples of data. The CM multi-port Interface Card sequences through the PD RM interface boards until all fifteen RMs have been sampled. This function is repeated every 333 milliseconds.
      An installation of the PD on a Cab and Trailer rig will require an RF link between the trailer and the cab. The transceiver at the trailer will contain a power supply to derive +3 volts from the trailer power of +12 volts.
      Hardwired installations will use a 4-wire cable between the CM and the Type A RMs. The 4-wire cable will carry: +12 volts; power ground; two wires for the two-way serial communication.

Type A Radar Module
      Interface Boards are built into the Type A Radar Module and they are the primary interface between groups of RMs and the CM. The Interface Board uses a MicroChip chip in the same family as described in Section 3.2 and performs similar functions. The physical layout of the Type A module is shown in Figures 25A and 25B. Figure 25A is a side view of the Type A module layout and Figure 25B is a top view of the Type A module layout. The Interface Board performs the following functions:

MicroChip
      The MicroChip PIC17C756 series microcontroller chip will be used for the Type A radar Module. This chip requires one oscillator at 4 MHZ. Using a serial EEPROM, the microcontroller will have identification encoded in it to provide RM ID back to the CM and know when to respond to CM commands.

A/D
      The A/D function of the MicroChip will use up to 10 channels, sampling at a rate of 5 kHz for 64 samples. The A/D will be switched on and off via the software in the MicroChip. The collection will be synchronized with the other Type B RMs connected to the Type A (see 24). The 10 channels used on the A/D, are three for each Type B motion sensor and four for the on-board Type A motion sensor. The first channel of the three for a motion sensor will sample a high gain op-amp output. The second channel will sample a low gain op-amp output, with the third channel sampling the lowest gain op-amp. This will provide at least 90 dB of dynamic range necessary for close approach of objects. The channels will be examined and when the high gain channel is at its maximum value, the second channel will be used in the signal processing.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

When in the reverse gear, the center rear facing RM will be set to use the unity gain op-amp only. This sensor will be sampled at a 2 kHz rate to get more precise measurement of vehicle speed.

FFT
The software samples 64 points of data. This data is fed to a 64 Point FFT. At this time it is believed that the PIC17C756 series of chip is capable of performing a 64 point FFT in the required time.

Data Communications
The first 20 samples from the FFT results, for each attached RM, will be output via a serial channel. This channel will be a two-way communications link with the CM. When the data is ready, finished the FFT, the chip will wait for the command to send the data. The data (60 bytes) will be transferred in about 30 milliseconds. This equates to a data rate of 19,200 Baud. A header message will accompany the data, identifying the RM being sampled. The Interface Design Specification will define this message.

System Operation
Multiple Radar Modules
The PD consists of multiple Type A and Type B radar modules. Possible PD RM combinations include at least one Type A and up to two Type B modules. Upon initialization in the CM, the CM will poll for each Type A RM. The Type A RM when first powered up will check the two ports for Type B RMs and detect the existence of a RM. This data will be reported back during the CM's initial poll. The CM will build a table in RAM of each RM and its position, for use when performing other detection and tracking functions.
The Type A RM's will have a code that will indicate to the CM the location of each RM in its suite. The Type A RM will respond to the CM commands when it receives a message with its address in the header. These messages will be defined in the Interface Design Document.
The Radar Modules will be positioned around the truck according to the diagram in the System Specification. The RMs on the side of the truck should not be more than 25 feet apart and not closer than 10 feet. The RMs on the rear should be spaced such that one is at the center and the others are as far on the edge as possible.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

System Timing
    The System Timing is shown in Figure 26 (for 2-Type A's connected to 2-Type B's each). The data collection takes 12.8 milliseconds for each RM. The signal processing takes X milliseconds per RM. The total data collection time and processing time for 15 RMs is X milliseconds. The data transmission time is 160 milliseconds. To conserve time the transmission of data will be going on from one set of RM's while another is collecting and processing data.
    The timing of the PD RM's will be integrated into the timing of the FLD when the FLD is in operation. The CM will poll the FLD and receive an 8-millisecond burst of serial data. The CM will then poll one Type A PD RM and get up to 30 milliseconds of data. The CM then does signal and data processing for 12 or more milliseconds, processing the downloaded data. 50 milliseconds after the system polled the FLD, it repeats this sequence.

System Interface
PD to Control Module
    The following data will be transferred at 19,200-Baud or faster.

Digital Object Data - Provides digitized object data from each detector for signal processing analysis in the control module. 64 samples are collected over 12.8 milliseconds per RM. 20 samples per RM are sent to the CM every 333 milliseconds. The 333 milliseconds will also be used for control transfer and other data. When used with a trailer, the signals will be transferred via an RF link for the trailer RM interface boards. The three RM interface boards on the trailer will be wired to a transceiver and a transceiver will be installed on the cab that is connected to the CM. The cab RM interface boards will be hardwired to the CM.

BIT - Sends PD operational status data to the Control Module.

RF Link
    The RF Link to the trailer installation will use an RF transceiver modem. The design of the PD will be set for a 19,200 Baud link (5 kHz sampling and 20 samples transferred). 20 samples at 5 kHz represent 40-mph coverage with a 2-mph resolution.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

The RF Link consists of a modem and a transceiver function. The system currently under consideration contains an internal battery which will last for years (advertised time with system mostly in receive). It is anticipated that in the PD application this battery will be replaced by a DC to DC 3 volt regulator deriving power for the transceiver from the truck battery.

The modem provides two way serial communications. RS-485 is the electrical interface for the serial link. The RF Link will require a 6-inch antenna at both the tractor and the trailer. The typical range for the link is 150 feet. If two antennas are mounted on either side of the trailer at the rear or one antenna on the front of the trailer and the top of the cab, the link will be able to handle any size truck.

The manufacturer of the Transceiver is Axonn. Their address is:
Axonn
Suite 202
101 W. Robert E. Lee Blvd.
New Orleans, LA 70124
Phone (504) 282-8119

They have a product, the AX-550, which exceeds the requirements for range. A new product is due out soon, which will be less power. Two units per system are needed for either the PD or the RGD.

The trailer mounted transceiver module in the PD application will also provide the power filtering, fusing and regulation for the trailer mounted PD radar modules.

REAR GUARD DETECTOR FUNCTIONAL DESCRIPTION

The Rear Guard Detector (RGD) is the functional equivalent of the PD system for the trailer only. It's designed to be portable and can be moved from trailer to trailer. Communications with the CM in the cab will be made over a wireless RF data link. The RGD purpose is to monitor the area around the periphery of the trailer and to detect objects that could potentially be struck by the vehicle as it moves left, right or backward and to provide object distance information to the CM. The functional design for the RGD 270 is shown in Figure 27.

The RGD has Type A RM located in the center of the three rear facing sensors, and one for the pair of radar modules on the right and one for the pair of radar modules on the left. The Type A RMs output data into a RGD interface/transceiver, which sends the signal to the front cab. In the tractor a transceiver picks up the signal and converts it to a digital serial input to the CM.

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

A battery will be provided to power the RGD. This battery will be rechargeable and have a 5 Amp Hour capacity for a 25-day interval between recharging.

The RGD subsystem will be configured with three, five, or seven sensors. All of the RMs are mounted on one multi-detector array and will be mounted at the rear of the trailer. No electrical connection to the trailer will be required since it has a self-contained battery pack.

Interface Board
MicroChip
The MicroChip PIC17C756 series chip will be used for the Type A Radar Module. This chip requires one oscillator at 4 MHZ. The MicroChip will have identification encoded in it to provide RM ID back to the CM and know when to respond to CM commands.

A/D
The A/D function of the MicroChip will use up to 10 channels, sampling at a rate of 5 kHz for 64 samples. The A/D will be switched on and off via the software in the MicroChip. The collection will be synchronized with the other Type B RMs connected to the Type A (see Figure 27). The 10 channels used on the A/D, are three for each Type B motion sensor and four for the on-board Type A motion sensor. The first channel of the three for a motion sensor will sample a high gain op-amp output. The second channel will sample a low gain op-amp output, with the third channel sampling the lowest gain op-amp. This will provide at least 90 dB of dynamic range necessary for close approach of objects. The channels will be examined and when the high gain channel is at its maximum value the second channel will be used in the signal processing.

When in the reverse gear, the center rear facing RM will be set to use the unity gain op-amp only. This sensor will be sampled at a 2 kHz rate to get more precise measurement of vehicle speed.

FFT
The software samples 64 points of data. This data is fed to a 64 Point FFT. At this time it is believed that the PIC17C756 series of chip is capable of performing a 64 point FFT in the required time.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Data Communications
    The first 20 samples from the FFT results, for each attached RM, will be output via a serial channel. This channel will be a two-way communications link with the CM. When the data is ready, finished the FFT, the chip will wait for the command to send the data. The data (60 bytes) will be transferred in about 30 milliseconds. This equates to a data rate of 19,200 Baud. This chip performs a 10-bit A/D and 16-bit FFT. A header message will accompany the data, identifying the RM being sampled. The Interface Design Specification will define this message.

System Operation
Multiple Radar Modules
    The radar modules used in the Rear Guard will be the same as the PD. The RGD has a special condition where one Type A module can be installed in the middle of the rear facing mounting bracket and the signal processing in the CM will be set to give longer range performance for a snow plow application.

System Timing
    The functional interface for the RGD is identical to the PD, including the use of the MicroChip chip set.

System Interface
RGD to Control Module
- Digital Object Data - Provides digitized object data from each detector for signal processing analysis in the control module. 64 samples are collected over 12.8 milliseconds per RM. 20 samples per RM are sent to the CM every 333 milliseconds.
The 333 milliseconds will also be used for control transfer and other data. The RGD will use the same RF link as the PD.

- BIT - Sends RGD operational status data to the CM.

UNITED STATES PATENT AND TRADEMARK OFFICE
CERTIFICATE OF CORRECTION

PATENT NO.     : 6,268,803 B1
DATED          : July 31, 2001
INVENTOR(S)    : Richard A. Gunderson, Michael A. Parisi, Richard P. Gorman and Kurtis W. Melin It is certified that error appears in the above-identified patent and that said Letters Patent is hereby corrected as shown below:

RF Link
      The RGD is equipped with the same RF link as is available on the PD. A rechargeable 12-volt battery powers the RGD RF Link. The power distribution from the trailer transceiver is the same as the PD's. The RGD has a sleep mode to conserve battery power. If an activation signal is not received by the RGD for 20 seconds the system will go into standby or sleep mode. The CM will send out an activation command every five seconds when the RGD should be operational. The RF transceiver module on the trailer and the microcontroller in each Type A RM controls the sleep mode. The RF transceiver and microcontroller will have a sleep mode watch dog timer set to two seconds. When in sleep mode the transceiver will activate and search for a receive signal. The CM will command a repeated transmit signal until the sleep mode stop data word is received. This signal will be used if it has been over 20 seconds since the RGD sent data to the CM. The receiver in the trailer transceiver will come on for two milliseconds and search for the transmit signal. If one is received the transceiver will activate a serial message (controlled by the CM) to wake up the microcontrollers. When all microcontrollers have reported back the RGD operation will start. The entire wake up procedure will not take more than four seconds and will usually take less than two seconds. The duty cycle is 1% while in sleep mode for power conservation.

CONTROL MODULE FUNCTIONAL DESCRIPTION
      The CM is a customized PC. Processor speed, memory, and interface drivers will determine the CM configuration based on a nominal set of performance requirements and hardware/cost tradeoffs. A functional diagram of the CM 280 is shown in Figure 28. The CM 280 consists of two primary elements: an Interface Card 282 and the Processor Board 284.

CM Multi-port Interface
      The CM multi-port Interface 282 buffers the incoming data from the FLD 281, PD 283 and RGD 285, routes it to the Processor Board 284, and routes control signals from the Processor Board 284 to the FLD 281, PD 283 and RGD 285. The CM Multi-port Interface 282 routes the FLD Doppler spectrum to the Object Data Processing module 288 on the Processor Board 284. It also routes the PD and RGD Doppler spectrums to the Detection Processing module 286 on the Processor Board 284.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Signal/Data Processing Functions
The CM performs the following signal/data processing functions: Object Data Processing (FLD only), Track Report Generator (FLD only), Detection Processing (PD and RGD only), Data Fusion, Situation Report Generator, Display Driver, and System Control. The Display Driver and the System Control function are the responsibility of ATI and will not be discussed in this document except where an interface exists with one of the other functions. The remaining functions are shown in Figure 29 and discussed below.

Object Data Processing
The Object Data Processing module receives the 128 samples of FFT'd data (frequency domain signal) from each radar module. It processes these samples (256 per cycle) and determines the existence of objects for reporting (see Figure 30). A cycle for the FLD is 50 milliseconds. The two forward looking radar modules are treated separately for clutter removal. They are combined in the Multi-Object Detector. The Object Data Processing module will output detections/velocities, associated signal strengths, pulse timing data, clutter estimates and clutter distribution.

Clutter reduction
The frequency domain signal will be analyzed and the clutter removed individually for each sensor. The clutter is removed in four steps. These four steps are discussed in detail below. It should be noted that to perform accurate calculations in this process the height of each RM antenna is required along with the dimensions of the truck and the location of each sensor. This information will be programmed in the CM at the time of the system installation.

Threshold Computation
The first step is to compute a threshold versus frequency (speed) for the received spectrum. This set of numbers (128, one for each sample) is computed from the speed of the truck and the height of the sensor above the road. The road will reflect a certain amount of energy back to the sensor. Each road surface type will reflect a different amount but an average amount of reflection will be used since height above the road is dominant. The frequency spectrum of the clutter is related to the speed of the truck and the distance to the road. The height of the sensor will be the strongest return and it will be at 0 Hz in the spectrum. The 38.75 Hz return (1.25 mph) will be from a distance where the velocity component of the road is 1.25 mph.

UNITED STATES PATENT AND TRADEMARK OFFICE
CERTIFICATE OF CORRECTION

PATENT NO.   : 6,268,803 B1
DATED        : July 31, 2001
INVENTOR(S)  : Richard A. Gunderson, Michael A. Parisi, Richard P. Gorman and Kurtis W. Melin It is certified that error appears in the above-identified patent and that said Letters Patent is hereby corrected as shown below:

The bin spacing is 38.75 Hz, thus the first 1.25 mph will appear in the first bin. The next spectral bin will be from 1.25 mph to 2.5 mph and so on. The distance to the road for each frequency will be pre-computed and an equation for clutter will use the resulting values. The values in this equation are sensor height and truck speed.

The Average Spectral Power is given by:

$$P_i = \frac{\sum_{j=i-N/2}^{i+N/2} S_j}{N} \qquad (1)$$

Where
$P_i$ is the $i^{th}$ Doppler bin's average power
$S_j$ is the $j^{th}$ Doppler bin's power
N is the size of the sliding window (Note: at either end of the spectrum, i = 0 to N/2 or 255 - N/2 to 255, N/2 points will be used)

The threshold for each bin (sample) is $$T_i - T_m * P_i. \qquad (2)$$

Where $T_m$ is the threshold multiplier.

This value ($T_m$) will start as 3 dB but it will be determined through lab and initial field-testing. The result of this multiplication is then multiplied by the truck speed based road surface clutter. This is given by:

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

$$M_i = \left( \frac{\cos(\sin^{-1}[(i*38.75)/(v_t*31)\}}{h} \right)^4 \qquad (3)$$

Where
  $M_i$ is the $i^{th}$ Doppler Bin's road clutter multiplier
  $V_t$ is the truck speed
  h is the mounting height of the RM Thus the threshold is modified to:

$$Ti = Ti * M_i$$

Rain Clutter Removal
  Removal of weather related clutter will be done in steps two and three. Rain clutter produces a distinct pattern in the frequency spectrum. The 128-sample frequency spectrum will be examined for this pattern. If found, the threshold values at the frequencies where rain is present will be adjusted for the presence of rain.

The pattern is recognizable over time. Distinct lines at a constant velocity and no real discernable change in signal strength over several seconds will denote rain. This condition will be flagged and the most prevalent frequencies will be marked.

Snow Clutter Removal
  Snow will appear as colored noise. Several frequencies may have more noise than others, but in general the average noise will go up throughout the spectrum. The thresholds will be adjusted accordingly.

Object Clutter Removal

Step four is the search for specific clutter from stationary objects. This will be done by comparing the returns of both sensors at the same frequencies.

UNITED STATES PATENT AND TRADEMARK OFFICE
CERTIFICATE OF CORRECTION

PATENT NO.   : 6,268,803 B1
DATED        : July 31, 2001
INVENTOR(S)  : Richard A. Gunderson, Michael A. Parisi, Richard P. Gorman and Kurtis W. Melin It is certified that error appears in the above-identified patent and that said Letters Patent is hereby corrected as shown below:

Course Clutter Removal for all frequency bins $$\begin{cases} \text{if } S_{1i} > S_{2i} + 30 \text{ dB} \\ \quad \text{then } Fr_i = \text{TRUE} \end{cases} \quad (4)$$

Where: $Fr_i$ is the $i^{th}$ flag for probable road clutter
$S_1$ is the left sensor's $i^{th}$ Doppler bin's power
$S_2$ is the right sensor's $i^{th}$ Doppler bin's power Depending on the angle to an object the frequency and amplitude will change. Stationary objects on the side of the road at close ranges will appear stronger in one sensor and at frequencies lower than the speed of the truck. These objects and their frequencies will be noted for processing later in the data fusion function.
Road clutter from a specific object such as a sign or bridge will appear at one frequency. As the truck approaches if the object is on the side of the road the frequency will decrease and the signal strength in one sensor will decrease (with respect to the $R^4$ curve) while the signal in the other sensor will increase faster than expected.

Multi-Object Detection
After clutter reduction, the frequency spectrum, object clutter candidates, and clutter thresholds will be fed into a Multi-Object Detection algorithm. This algorithm will be used to differentiate between multiple returns in the spectrum from objects that are and are not clutter. This algorithm will be designed to offer up candidate detections, which when combined with other sensor and truck data can be used to determine the actual presence of an object. The pair of FLD radar modules will be used in this algorithm to differentiate between clutter and objects not in front of the truck. Three steps are performed to find the candidate detections.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Threshold Application
    The first step is the application of the clutter thresholds (equation 2) to the entire spectrum and the elimination of the colored clutter.

For all Frequency Bins $$C_i = 1 \text{ if } S_i > T_i \tag{5}$$

Where $C_i$ is one if a threshold crossing was detected at the $i^{th}$ Doppler bin If a particular frequency bin exceeds the threshold it will be stored for later processing as a detection candidate ($C_i$). If a certain segment of frequency bins produces an excessive number of detections the thresholds will be raised (see equation 1) in that region and the strongest detections will be reported.

Detection
    The second step is to detect the threshold crossings. These crossings will be compared to each other and to the estimated road/object clutter data. The two sensors will be combined in this step. After the initial clutter removal the frequency spectrums of the two sensors will be compared for all threshold crossings. For a candidate detection to be declared, a threshold crossing must have occurred for each radar module at a frequency not more than ± FFT bin apart, with no more than 30 dB SNR difference (Fr flag).

For all Frequency Bins

IF <NOT> $Fr_i$
            IF ($C_{Li}$ <AND> $C_{Ri-1}$) <OR> ($C_{Li}$ <AND> $C_{Ri}$) <OR> ($C_{Li}$ <AND> $C_{Ri+1}$)
            $D_i = 1$

Where $D_i$ is the $i^{th}$ Frequency bin detection flag.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

If either condition is violated a detection will not be declared for that threshold crossing. This step will output no more than 15 candidate detections. The 15 candidates with the highest frequency (fastest closing rate) will be given priority.

In the future the CM will tell the FLD when a turn is underway and the direction of the turn. When a turn is detected the sensor pointing in the direction of the turn will be allowed to have stronger detections. If the sensor in the opposite direction of the turn has a signal over 20 dB stronger that crossing will not be accepted for detection.

If the Secondary Mode is in use this second step will allow the radar module on the left side of the truck to have a miss match in SNR with the radar module on the right. By allowing the left radar module to have stronger returns it will effectively widen the detection pattern to the right. The values for this imbalance will be determined when the antenna patterns for the two radar modules are provided by the manufacturer.

Pre-Tracker

The final step in the Multi-Object Detector is to eliminate all but the five best detections. This algorithm is the first stage of a tracker. The detections will be sorted by closing velocity and SNR. The objects that will most likely reach the truck first will be given highest priority. If over five detections exist the pre-tracker will then sort the detections further. The pre-tracker will compare the detection to objects already being tracked from previous sensor cycles. Those detections closest to existing tracks will receive priority within the original sort.

These detections will be "associated" with the existing tracks. If more than one detection associates with a track the closest detection, in speed and SNR, will be marked as the best association with the track. More than one detection may associate with one track. Up to five detections will be passed on. These detections will be the objects that will reach the truck first and have been around the longest. In all cases the shortest time to impact will be given priority. Longevity will only be used to sort on detections that have closing speeds within 10 mph and SNR's within 20 dB of each other. That is if there are more than five detections, all at about the same speed, the associated detections with the longest track existence time will be output.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Association
for all detections - j
    for all tracks - L
        if $Rdot_j - G_s < Rdot_l < Rdot_j + G_s$
            if $(SNR_j - SNR_l) < 20$ dB
                then Associate Where Rdot is the closing rate
    j is the detection counter
    L is the current track
    $G_s$ is the speed gate Objects extending over the track and across the road, such as bridges and signs will require special processing. This processing will use the combined SNR and examine stationary objects over time. The characteristics of the SNR over time from flat or non-complex objects such as a bridge or sign will be used to identify these objects.
    NOTE: The data collection and detection rate of the FLD is 50 milliseconds. The Data Processing, Tracking and Data Fusion functions will use several cycles of detections to produce the best answers. Several points need to be made clear here. First, within the first 100 milliseconds the system can produce an alarm condition when the appropriate time to impact is measured. Second, the calculations for a tracking system of this type become stable over 10 to 15 cycles, this corresponds to .5 to .75 seconds. Third, the higher accuracy of a stable system is only required in computing the larger time to impact numbers. Fourth, in most conditions the stable track will allow the system to "track" an object into the alarm area or region. The same approach is used in the PD and RGD systems and is discussed later. These same four points apply to the PD and RGD, except the cycle time is 6 time longer. These systems are not measuring events that are as time critical, since velocities in the directions being monitored are not nearly as high.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Object ID

With a range estimate, the signal strength versus time (scintillation characteristics) and average signal strength at an estimated range, an ID can be computed for a tracked object. The signal strength at an estimated range provides an estimate of radar cross section. From this radar cross section an initial categorization as a truck/large vehicle, a car or other can be determined. From scintillation combined with a small radar cross section the categorization as a human/large animal or a sign can be determined.

First the algorithm will compare the two forward looking radar module signals. This comparison will be a time-based comparison of a track's speed and SNR, with the current associated detection. Tracks, which are traveling slower then 20 mph, will be designated human. All new tracks will be given a truck designator until more than one cycle of data has been gathered. The SNR will be averaged over time for each track.

$$RCS_j = \{(Savg_j)/R_j^4\}^{1/2} \qquad (6)$$

Where $RCS_j$ is the $j^{th}$ track's radar cross section
$Savg_j$ is the time averaged signal strength
$R_j$ is the estimated range (initialized to 300 feet for the FLD and 25 feet for the PD/RGD IF $RCS_j$ > XdB
    Then $ID_j$ = TRUCK
ELSE IF $RCS_j$ > YdB
    Then $ID_j$ = CAR
ELSE $ID_j$ = HUMAN Where XdB is the expected RCS for a truck in dB meters
YdB is the expected RCS for a car
$ID_j$ is the $j^{th}$ track's ID The Object ID Algorithm will attempt to differentiate between small objects and large objects. This algorithm will help to eliminate false alarms from the side of the road and in front of the truck when approaching and during a turn by identifying the track as not a truck or a car.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

A probability of correct ID and an associated confidence level will be computed for each ID.
These parameters will be set from an equation empirically derived during testing of the system.

IF $ID_j$ = TRUCK
    $PCID_j = 1 - (ZdB - Savg_j)/ZdB$
ELSE IF $ID_j$ = CAR
    $PCID_j = 1 - (VdB - Savg_j)VdB$
ELSE IF $ID_j$ = HUMAN
    $PCID_j = 1 - (UdB - Savg_j)/UdB$ Where ZdB is the expected radar cross section of a truck
    VdB is the expected radar cross section of a car
    UdB is the expected radar cross section of a human
    $PCID_j$ is the $j^{th}$ probability of correct ID for the $j^{th}$ track The ID confidence is given by:

$$CF_j = \frac{\sum_{i=1}^{N} PCID_{ji}}{N}$$

Where $CF_j$ is the confidence factor for the $j^{th}$ track's ID
    N is the current number of cycles tracked Track Report Generator
    The candidate detections will be combined with the object ID data and analyzed for the presence of an object for which a report should be generated. Stable object reports or tracks will be required to achieve the range estimate accuracy desired. The object reports will be of the closest object determined to not be a false object. There will be up to five reports every 50 milliseconds. The object reports will be sent to the Data Fusion algorithm for further processing.

UNITED STATES PATENT AND TRADEMARK OFFICE
CERTIFICATE OF CORRECTION

| | | |
|---|---|---|
| PATENT NO. | : 6,268,803 B1 | |
| DATED | : July 31, 2001 | |
| INVENTOR(S) | : Richard A. Gunderson, Michael A. Parisi, Richard P. Gorman and Kurtis W. Melin | |

It is certified that error appears in the above-identified patent and that said Letters Patent is hereby corrected as shown below:

Condition Checking
      The trackfiles generated by the Multi-Object Detector contain kinematics from previous tracks and, for each track, an associated detection (if one was available). The track and the detection need to be merged. The first step in merging the track and detections is the reduction of detections associated with track. The Condition Checking function will eliminate all but the best detection. If more than one detection associates with a track, this function will compare the SNR of the track to the SNR of the Detection and compare the closing rate of the track with the closing rate of the detection. The closest match in closing rate with a reasonable match in SNR will be correlated with the track and the other detections will be made available to create a new track or correlate with another track.

For all Tracks j
    For all Associations k
        IF NA> 1
            IF $(Rdot_j - Rdot_k) < (Rdot_j - Rdot_b)$
                IF $(SNR_j - SNR_k) < (SNR_j - SNR_b)$
                    $b = CRID_j = k$ Where b is the association number for the best correlated detection
        $CRID_j$ is the $j^{th}$ track best correlating association The Condition Checking function will output a set of "correlated" tracks and detections, one detection per track. There will be up to five existing tracks and five new tracks (if all five detections did not associate with any tracks) output from this function. Normally there will be five correlated tracks.
NOTE: Track speed will be used to convert the detection and track closing rate into object speed. This will prevent large changes in truck speed from eliminating the track correlation.

UNITED STATES PATENT AND TRADEMARK OFFICE
CERTIFICATE OF CORRECTION

PATENT NO.     : 6,268,803 B1
DATED          : July 31, 2001
INVENTOR(S)    : Richard A. Gunderson, Michael A. Parisi, Richard P. Gorman and Kurtis W. Melin It is certified that error appears in the above-identified patent and that said Letters Patent is hereby corrected as shown below:

Track Maintenance
 The correlated track/detection data will be used to maintain the tracks. A new track will be created from detections not associated with tracks. New tracks will be kept for up to five radar module cycles (50 milliseconds per cycle). If a second detection is associated with a new track before five cycles without an association, the new track is made a hold track. Hold tracks must experience 10 cycles in a row of no detection associations before they are eliminated. The Track Maintenance function will apply these rules and output a set of trackfiles containing new and hold tracks. The trackfiles will be identified as coming from the FLD. (See Figure 21, Track Report Generator Funcitons.)

Detection Processing PD and RGD
 The PD and RGD are not as sophisticated as the FLD. The clutter processing will be a simpler version of the FLD processing. The detection process will also be a simpler version of the Multi-Object Detection algorithm used in the FLD. The functional design is shown in Figure 32 and is discussed below.

Clutter Reduction
 The Detection Processing module receives the 20 samples of FFT'd data from the Interface boards. There can be up to 15 sets of data. Each set of data will be clutter processed individually. The clutter processing will have the same functions as described earlier for the FLD but the functions will be adapted to the PD or RGD requirements.

Threshold Computation
 First the main difference is the clutter will have a different spectral characteristic for each radar module view angle. The forward looking radar modules will have similar clutter to the FLD. The side looking sensors will have clutter which is lower in frequency and for the radar modules closest to and viewing the side of the road the clutter will be stronger. The rear modules will have the most action from objects approaching the truck at low speeds relative to the truck's speed. All of these specific conditions will be addressed in the Threshold Computation Function and the Road/ Object Clutter Location Function.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

The frequency domain signal will be analyzed and the clutter removed individually for each sensor (see Equation 1). The clutter is removed in four steps. The first step is to compute a threshold versus frequency (speed) for the received spectrum. This set of numbers (20, one for each sample) is computed from the speed of the truck and the height of the sensor above the road. The frequency spectrum of the clutter is related to the speed of the truck, the distance to the road and the view angle of the radar module. The height of the sensor will be the strongest return and it will be a 0 Hz in the spectrum. The 31 Hz return (1 MPH) will be from a distance where the velocity component of the road is 1 MPH. The next spectral bin will be from 2 MPH and so on. The distance to the road for each frequency will be pre-computed and an equation for clutter will use the resulting values (see Equation 2 except the bin spacing is 31 Hz versus 38.75 Hz). The values in this equation are sensor height and truck speed.

Rain Clutter Removal
Removal of weather related clutter will be done in steps two and three. Rain clutter produces a distinct pattern in the frequency spectrum. The 20-sample frequency spectrum will be examined for this pattern. If found the threshold values at the frequencies where rain is present will be adjusted for the presence of rain.
Snow Clutter Removal
Snow will appear as colored noise. Several frequencies may have more noise than others, but in general the average noise will go up throughout the spectrum. The thresholds will be adjusted accordingly.

Object Clutter Detection
Step four is the search for specific clutter from non-moving objects. This will be done by flagging large returns (see Equation 4). Objects that are stationary will appear at specific frequencies in the spectrum. Depending on the angle to the object the frequency and amplitude will change. Objects on the side of the road at close ranges will appear stronger in one sensor and at frequencies lower than the speed of the truck. These objects and their frequencies will be noted for processing later in the data fusion function.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Multi-Object Detection
    After clutter reduction, the frequency spectrum, and clutter thresholds will be fed into a Multi-Object Detection algorithm. This algorithm will be used to detect multiple objects in the presence of road, snow and rain clutter. This algorithm will be designed to offer up candidate detections, which when combined with other sensor and truck data can be used to determine the actual presence of an object.

Clutter Threshold Application
    The first step is the application of the clutter thresholds to the entire spectrum and the elimination of the colored clutter. If a particular frequency bin exceeds the threshold it will be stored for later processing as a detection candidate. If a certain segment of frequency bins produces an excessive number of detections the thresholds will be raised in that region and the strongest detections will be reported.

Detection
    The second step is to detect the threshold crossings (see equation 5). For a detection to be declared a threshold crossing must have occurred for one radar module. This step will output no more than the two strongest candidate detections.

Pre-Tracker
    The final step in the Multi-Object Detector is to eliminate all but the 15 best detections. This algorithm is the first stage of a tracker. The detections will be sorted by closing velocity, SNR and radar module of origin. The objects that will most likely reach the truck first will be given highest priority. If over 15 detections exist the pre-tracker will then sort the detections further. The pre-tracker will compare the detection to objects already being tracked from previous sensor cycles. Those detections closest to existing tracks will receive priority within the original sort. These detections will be "associated" with the existing tracks (See the pre-tracker of the Signal Data Processing Functions Section). More than one detection can associate with a track. Up to 15 detections will be passed on. These detections will be the objects that will reach the truck first and have been around the longest. In all cases the shortest time to impact will be given priority. Longevity will only be used to sort on detections that have closing speeds within 10 mph and SNR's within 20 dB of each other.
    The Detection Processing module will output detections/velocities, associated signal strengths, pulse timing data, clutter estimates and clutter distribution.

UNITED STATES PATENT AND TRADEMARK OFFICE
CERTIFICATE OF CORRECTION

PATENT NO.   : 6,268,803 B1
DATED        : July 31, 2001
INVENTOR(S)  : Richard A. Gunderson, Michael A. Parisi, Richard P. Gorman and Kurtis W. Melin It is certified that error appears in the above-identified patent and that said Letters Patent is hereby corrected as shown below:

Data Fusion

The Data Fusion algorithm will be designed to take inputs from a N out of M tracker. This Data Fusion algorithm is specifically designed to not require any specific set of sensors and adapts as sensors are added using a lookup table of the new sensor parameters and an indication of the number of and type of sensors added. The Data Fusion Algorithm can also take into account any data from the host vehicle supplied by various sensors. The absence of data will not cause a problem with the algorithm, however, the more data the better the performance. The purpose of the Data Fusion Algorithm is to reduce all of the tracks and detections down to a small set of object tracks representing the objects surrounding the track. Each radar module and sensor set may detect the same object. It is the task of the Data Fusion Algorithm to sort this out. The algorithm uses a technique called Deepest Hole to combine the data from multiple sensor and Kinematics Combination to fuse this data together.

The Data Fusion functions are shown in Figure 33. The purpose of the Data Fusion Algorithm is to reduce all of the tracks and detections down to a small set of object tracks representing the objects surrounding the truck. Each radar module and sensor set (FLD, PD, and RGD) may detect the same object. It is the task of the Data Fusion Algorithm to sort all of this out. This algorithm is described below.

Deepest Hole

The Deepest Hole function "associates" tracks from the sensor sets with existing Fused Tracks. It is assumed that multiple sensor sets may find the same object and that multiple radar modules within a sensor set will often see and report on the same object. The Deepest Hole function will resolve these redundant tracks into a set of fused tracks, one per object. The output of this function is a list of track links linking the tracks from multiple radar modules together for each object.

The purpose of this function is to match new sensor data with current tracks (multi-sensor track or MST). Matched sets of MST and sensor data are found by operating on the agreement matrix with a heuristic search algorithm. The agreement matrix contains the normalized distances (referred to as "standard differences") between shared state variables calculated for every possible combination of sensor and MST track. The "deepest hole" search algorithm finds the set of matches between rows and columns of the agreement matrix to minimize the sum of matrix elements found at the intersection of matched rows and columns.

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

The standard differences are calculated for every possible combination of MST and sensor track. An agreement matrix is built which contains MST tracks as the first index (rows) and sensor tracks as the second index (columns). The standard difference for each MST/sensor pair is put into the appropriate cross-index position.

The standard difference is the sum of the squares of the differences in shared state variables normalized by the sum of the state variances and the number of variables shared by the two tracks.

NOTE: Only the kinematic states NED and Rdot are queried for use in the standard difference calculation; NED is North, East and Down given by the sensor reporting the detection and the pointing angle of the sensor. Down is set to zero.

$$DIFF = \frac{1}{N} \sum_{i=1}^{N} \frac{[X_{mst}(i) - X_{sen}(i)]^2}{[V_{mst}(i) + V_{sen}(i)]} \quad (7)$$

where

| | | |
|---|---|---|
| N | = | number of shared state variables |
| $X_{mst}$ | = | vector of MST track state variables shared with sensor |
| $X_{sen}$ | = | vector of sensor track state variables shared with MST |
| $V_{mst}$ | = | vector of MST track state variances corresponding to $X_{mst}$ |
| $V_{sen}$ | = | vector of sensor track state variances corresponding to $X_{sen}$ |
| DIFF | = | standard difference |

The most probable matches between new sensor data and current MST tracks are found by searching through the agreement matrix. A simple "deepest hole" heuristic algorithm, which closely reproduces the results of exhaustive search algorithms, is used. "Deepest hole" finds the set of matches between rows (MST tracks) and columns (sensor tracks) in the agreement matrix which minimize the sum of the standard differences residing at the intersection of matched rows and columns. Matches are not allowed for matrix elements (standard differences) greater than a user defined limit.

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

The steps in Deepest Hole is as follows:

1) If any matrix element is greater than MAX_DIFF, multiply this element by MAX_DIFF and place it back into the agreement matrix.
2) If there are more rows than columns in the agreement matrix, transpose the matrix. Note that the matrix needs to be transposed again when processing is completed.
3) Set up linked lists containing all unmatched rows and columns.
4) If there is only one row in the list of rows, loop through linked list of columns to find the minimum value. Match this row and column. If there are no more rows to process all possible matches have been made.
5) Loop through the linked list of rows. For each row
   a) Loop through the linked list of columns to find the minimum and next minimum values for this row.
   b) Calculate the difference between minimum and next minimum values in this row. Compare it with the largest value found so far in this loop, and save the larger one.
6) Remove the row with the largest difference, found in step 5b, from the linked list of unmatched rows. Match this row to the column in which its minimum value was found. Remove that column from the linked list of unmatched columns.
7) Return to step 4

Example (Deepest Hole):
   Suppose the following agreement matrix was generated with MST (rows) and sensor (columns) tracks. All possible standard differences between the MST and sensor data are calculated and placed into the matrix. For this example it will be assumed that all standard differences fall below the limiting value (step 1). Since this matdx contains more rows than columns, the matrix is transposed (step 2).

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

|  | Sensor Detections | | | | | | MST Tracks | | | |
|---|---|---|---|---|---|---|---|---|---|---|
|  | 1 | 2 | 3 | | | | 1 | 2 | 3 | 4 |
| MST Tracks 1 | 1.7 | 2.0 | 2.7 | | | 1 | 1.7 | 1.8 | 3.1 | 2.3 |
| 2 | 1.8 | 2.5 | 5.4 | | Sensor | 2 | 2.0 | 2.5 | 2.7 | 6.2 |
| 3 | 3.1 | 2.7 | 1.5 | ⇒ transpose ⇒ | Detections | 3 | 2.7 | 5.4 | 1.5 | 1.9 |
| 4 | 2.3 | 6.2 | 1.9 | | | | | | | |

The difference between the minimum and next minimum values for each row is then calculated (step 5).

|  | Row 1 | Row 2 | Row 3 |
|---|---|---|---|
| (next min)-(min) A: | 0.1 | 0.5 | 0.4 |

The largest value found (i.e. deepest hole) is 0.5 corresponding to Row 2 or Sensor Detection 2. This row is then examined to find the corresponding column (MST track) which has the minimum standard difference. The minimum is 2.0 corresponding to column 1. The smallest value in row 2, 2.0 indicates that MST Track 1 is the closest to sensor detection 2. MST track 2 is the next closest to sensor track 2, with a standard difference of 2.5. The larger the distance between the standard differences the more likely that the actual match is the minimum value found (2.0 in this case). That is why the most probable match is determined from the largest distance between standard differences. Therefore, it is concluded that MST track 1 and sensor detection 2 are a probable match. Row 2 and column 1 are now removed from the matrix (step 6) and the entire procedure repeated on the reduced matrix (step 7). The reduced matrix is:

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

|  | | MST Tracks | |
|---|---|---|---|
| Sensor Tracks | 2 | 3 | 4 |
| 1 | 1.8 | 3.1 | 2.3 |
| 3 | 5.4 | 1.5 | 1.9 |

The difference between the minimum and next minimum values for each row of the reduced agreement matrix is then calculated (step 5).

|  | Row 1 | Row 2 | Row 3 |
|---|---|---|---|
| (next min)-(min) A: | 0.5 | -- | 0.4 |

The "deepest hole" is found to be 0.5 corresponding to row 1 or sensor track 1. The minimum standard difference for this row is 1.8 corresponding to MST track 2, the next probable match.

This row and column are now removed.

|  | MST Tracks | |
|---|---|---|
| Sensor Tracks | 3 | 4 |
| 3 | 1.5 | 1.9 |

Now we need only find the most probable match between sensor detection 3 and the remaining MST tracks. The minimum standard difference is 1.5; hence, the last match pairs sensor detection 3 with MST track 3. Note that MST track 4 remained unpaired with any new sensor data. The status of this track would be evaluated and potentially changed. A summary of the resultant matches found in this example is given below.

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

MATCHED TRACKS

| MST | Sensor |
|-----|--------|
| 1   | 2      |
| 2   | 1      |
| 3   | 3      |

Kinematics combination

The track data from the tracks, which are linked, will be merged in this function. The speeds from each track will be averaged together. The SNR's will be averaged using a weighted average considering radar module antenna gain (the FLD's and potentially one RGD will have 15 to 20 dB more gain than the other radar modules). The range estimate for the new merged track will be handled by the Range Estimator Function. The ID will be merged using the Probability of Correct ID and the ID Confidence.

The kinematics merge process consists of multiple passes, one pass for each sensor being processed on a given cycle. The algorithm acts as a sensor track combiner and does not provide additional filtering to the sensor data. Given that only Radar sensors with differing beamwidths are being considered the merge process would behave as follows.

Let X(k) represent a state vector at cycle k. For brevity, vector notation will be used. Thus X could be any of the vectors (N Not)$^T$, (E Edot)$^T$, (D Ddot)$^T$, (R Rdot)$^T$ where the superscript T indicates transposition. To merge the sensor data the following equation is used:

$$X_M(k) = X_M^1(k) + W(k)\left[X_S^{(E)}(k) - X_M^{(1)}(k)\right] \qquad (8)$$

where:

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

$X_{(I)}^M$ = the merged MST state vector
$X^M$ = the MST state vector
$W^M$ = weight vector
$X_S^{(E)}$ = sensor state vector extrapolated to current MST time The weight vector W(k) is computed from the relation:

$$W(k) = P_M^{(E)}(k)[P_M^{(E)}(k) + P_S^{(E)}(k)]^{-1} \qquad (9)$$

where $P_M^{(E)}$ = extrapolated covariance matrix of the MST track $P_S^{(E)}$ = extrapolated covariance matrix of the sensor detection Note that the sensor data affects the MST track in inverse proportion with the size of its errors.

The fusion process generates an MST track with lower variances. The fused covariance matrix is given by:

$$P_M^{(F)}(k) = [I - W(k)] P_M^{(E)}(k) \qquad (10)$$

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Range Estimation

Range Estimation consists of three steps. These steps are designed to achieve maximum range resolution without using time measurement as a tool. The estimator works using the principal behind radar wave propagation. Radar signals are received in relation to the transmitted power by range to the fourth power. That is the radar signal drops in strength by range to the object squared and on the return by range to the receiver from the object squared. Thus when range goes from 300 feet to 100 feet there is an increase in received power of 81 times. This change in power can be measured and it is greater than the changes due to object size or object perceived size (angle dependent). The range to a object can be estimated by following the curve of the received power over time. This is why tracks are formed in previous functions. The tracks give a time history of the received signal which will be used in the range estimate.

Multi-hypothesis Automatic Difference Ranging (MADR)

To obtain range to the track an algorithm called MADR will be used. The first step in MADR is to apply the SNR history to the radar range curve fit program. An algorithm dubbed "Automatic Ranging" will be used to establish this first range estimate. MADR will estimate the starting range of a track based on the SNR history. This starting range will be added to distance traveled (a negative number for a closing object) and a current range estimate will be computed. The MADR algorithm is discussed in detail below.

A range estimate will be calculated from the signal strength versus time and closing rate of each tracked object. Due to the properties of radar, as an object changes its relative position to the host vehicle, the signal strength will vary, by range to the fourth power and by a scattering property called scintillation. Combining this signal strength property with the distance traveled by the object will yield the starting range and thus the current range to the object. The distance traveled by the object is computed in the sensors by combining time since the data collection and tracking started, with the individual measured closing rates versus time. Using multiple hypotheses the signal strengths versus time will be inserted into an algorithm which matches the hypothetical signal strength curve to a (range and distance traveled) / (range to the fourth) curve. One hypothesis, a set of points drawn through the returned signal levels over time, will correspond to the correct starting range for the object given the measured distance traveled. This hypothesis will provide the best statistical match to a one over range to the fourth curve and will be the range estimate provided. Figure 34 shows an example of multiple hypotheses through amplitude versus time data.

UNITED STATES PATENT AND TRADEMARK OFFICE
CERTIFICATE OF CORRECTION

| | | |
|---|---|---|
| PATENT NO. | : 6,268,803 B1 | |
| DATED | : July 31, 2001 | |
| INVENTOR(S) | : Richard A. Gunderson, Michael A. Parisi, Richard P. Gorman and Kurtis W. Melin | |

It is certified that error appears in the above-identified patent and that said Letters Patent is hereby corrected as shown below:

The multiple hypotheses will be sent into the Automatic Ranging algorithm. Automatic Ranging is a technique first used by the Navy in the late 1970's to passively estimate range to a target. This application is substantially different but it can still use the same principals.

Automatic Ranging (AR) is a technique that was originally developed to determine the range and closing rate of an unknown emitter passively for a fire control radar. Using only a receiver, AR was able to determine the range and closing rate after the emitter's signal strength had changed approximately 1 dB (about 11% change in range). It's primary application was in determining range to noise jammers whose purpose was to deny range information that was required for missile firing equations. In order to do this, AR made two major assumptions: 1) during the time that AR was ranging, the emitters speed was constant, and 2) the emitters signal strength did not vary appreciably. The basis of AR's ranging was the fact that the emitters signal strength varies as range squared ($Range^2$). This non-linearity is exploited in AR's methodology to determine where the emitter is. The key to AR is its implementation which uses both known signal strength relationships and the computational power of the digital computer. In general, AR's ranging technique can be applied to any number of problems where a measurable parameter varies in some non-linear manner while other measurable or assumed parameters are linear. AR's basic implementation concept and its application to the anti-collision warning system is described in the following paragraphs.

The key to AR is converting the non-linear terms of the problem to linear terms and then using the power of the computer to find the correct answer. Converting the radar range equation (either one way $R^2$ or two way $R^4$) to a linear equation merely requires the use of log's (decibel's) so that the equation becomes a series of linear operations. In simplified form, the radar equation can be written:

$$S_{dB} = (\text{Some Constant})_{dB} - (2*Range_{dB}) \qquad (\text{or } (4*Range_{dB}) \text{ for 2-way})$$

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

That is the simple part. The hard part is that we have one equation with two unknowns (the constant and the Range). However, that's where the digital computer comes in. What we do know, is that as range changes the constant remains constant and the signal strength increases or decreases (depending on whether you are closing or opening). We also know (assume) that the range change per unit of time is constant. However, this doesn't help because by making the equation linear (taking the log of everything) we can't use the idea of delta range directly. What we need is the actual range. The solution is to assume an initial range and a speed. If we assume the correct initial range and speed, then the equation will remain linear over time (as range changes). The assumed initial range allows us to solve for the "constant" and use that in subsequent calculations. If we assume the wrong range or speed or both, then the equation will become progressively more incorrect over time. This is what AR does. Calculations for a series of initial ranges and a series of speeds are done. By using a linear regression to do a curve fit, only four terms are required to be saved for each range / speed combination. The linear regression allows calculation of the "slope" of the curve fit line. Since we've made the equation linear, over time the correct combination will have a "slope" of 1 and all other combinations will have slopes greater than or less than 1 (as the curve fits become progressively worse).

The application of AR to the anti-collision system requires only a one dimensional solution, since closing rate is known and only the initial range is calculated using a series of assumed initial ranges. As in all uses of AR, the accuracy of the AR depends on a variety of parameters. These parameters include: signal strength measurement accuracy, signal strength variations (due to scintillation, aspect changes, system non-linearity's), the amount of range change, the number of signal strength measurements, and the number (granularity) of the initial guesses which are calculated (every 5 feet, every 10 feet, etc.). It should be noted that while AR solves for initial conditions, calculation of the current position is straightforward since the time and speed from the initial position are known.

Constant Cross Section Ranging (CCSR)
    The second method is to assume a constant radar cross section for an object. The RCS will be derived from a look-up table and the track ID. The SNR time history curve will be smoothed. Using the estimated RCS and the measured speed an estimate of range will be determined. Assuming a constant K for the losses and gains in the radar sensor the range is given by:

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

$$R_j = \{ K * RCS^2/S_j \}^{1/4} \qquad (11)$$

Where $R_j$ is the CCSR range estimate
RCS is the guess for radar cross section
$S_j$ is the $j^{th}$ track smoothed signal Range Estimate Resolution
The final step will be to resolve the two range estimates. The resolution will be dependent on the history of range estimates for the subject track, the ID of the track, the quality of the SNR history (noise on the SNR curve) and the quality of the track ID.

$$\alpha = \left( \frac{\sigma(R_{ar}(t))}{MAX\ \sigma(R_{ar}(t))} \right)$$

$$\beta = 1 - \alpha$$

$$R_j = \alpha * R_{arj} + \beta * R_{ccsj}$$

Where RCS(t) is the series of Radar Cross Section estimates versus sensor cycles
$\sigma$ is the standard deviation
$R_{ar}$ is the range estimate using automatic ranging versus sensor cycle
$R_{ccs}$ is the Constant Cross Section range estimate.

UNITED STATES PATENT AND TRADEMARK OFFICE
CERTIFICATE OF CORRECTION

PATENT NO.    : 6,268,803 B1
DATED         : July 31, 2001
INVENTOR(S)   : Richard A. Gunderson, Michael A. Parisi, Richard P. Gorman and Kurtis W. Melin It is certified that error appears in the above-identified patent and that said Letters Patent is hereby corrected as shown below:

Situation Report Generator
    The final stage of the processing is the Situation Report Generator. This algorithm is the interface to the Display Driver. The output from this algorithm will depend on the mode of the detectors and the detectors installed on the track. This algorithm will output detected objects in the truck's path as well as objects immediately adjacent to the truck. The design goal for the false alarm rate for reporting to the driver will be less than one per day.
    This algorithm receives trackfiles from the Data Fusion algorithm and range estimates from the Range Estimator. This data is compared to the reporting criteria established by a lookup table in the CM. The lookup table will be mode and RM/sensor system (FLD, PD, RGD) dependent. Depending on the RM(s) reporting and updating the Fused Trackfile, the lookup table will determine whether the track should be formatted and reported. This lookup table will be created and updated by ATI. The format for the table is shown below:

|  | Alarm Threshold | Warning Threshold |
| --- | --- | --- |
| Range FLD | < 3 feet | < 10 feet |
| Range front PD | < 3 feet | < 6 feet |
| Range rear PD/RGD (fwd gear) | – | < 6 feet |
| Range rear PD/RGD (rev gear) | < .5 feet | < 2 feet |
| Range Side PD/RGD (turning) | < 12 feet | < 24 feet |
| Time to Impact FLD | < 3 seconds | < 6 seconds |
| Time to impact rear PD/RGD | < 3 seconds | < 6 seconds |

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

When the vehicle is in reverse, the data from the rear of the truck will be used to provide the transverse angle to an object behind the vehicle. If the object is a point source such as a pole the transverse position will be stable and resolvable into eight increments. Wide objects such as a loading dock cannot be located in the transverse direction. The data fusion algorithm will output the data necessary to provide the transverse location.

Built In Test
The Built In Test (BIT) function will be performed in the CM on all of the system's components. The BIT software will be designed to exercise the sensors such that a known preset performance can be measured. If a fault occurs, the faulty component will be recycled and retested. If the fault persists, a permanent record of the condition and the associated component will be stored in flash memory in the CM and the condition routed to the display processor by the BIT software. The other CM functions will always assume a fully functional system unless BIT informs it of a faulty component. This fault detection will be at a 50-millisecond rate for the FLD and a 333-millisecond rate for the PD and RGD.
Each RM has a distinct clutter response from the surface and an identifying code in its digitized signal being fed to the CM. BIT initiate will cause the BIT software to poll each RM for the FLD, PD and RGD. If an individual RM is faulty, the BIT software will identify the faulty RM through a comparison of the clutter return to the expected clutter return. If the faulty RM is in the FLD, BIT will inform the Object Data Processing module that specific RM is no longer functional. The Object Data Processing module will then revert to a degraded mode. If the faulty RM is in the PD or RGD, BIT will inform the Detection Processing module, which will revert to a degraded mode.
If BIT detects a fault in each of the RM responses connected to a specific interface board or if no response is received from a specific interface board, then BIT will assume that interface board has failed. The failure of the FLD Interface Board will result in complete loss of the FLD capability and this will be reported to the Object Data Processing module. The failure of a PD or RGD will be reported to the Detection Processing module, which will revert to a degraded mode.
BIT will inform the Display Processor of all failures and their severity, so that the operator is aware of the system status.

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Master Clear
   The CM initiates the Master Clear function. On receipt of the Master Clear discrete, the FLD, PD and RGD will reinitialize all functions. All signal processing will cease and be restarted. The A/D and FFT functions will continue to operate. A watch Dog timer set to 1 second will be used to detect a reset condition in the RMs. Upon receiving a time out (no serial request from the CM in the last second) the microcontroller will be reset. All message formatting will stop and any existing but unsent messages will be cleared. --.

UNITED STATES PATENT AND TRADEMARK OFFICE
CERTIFICATE OF CORRECTION

PATENT NO. : 6,268,803 B1 Page 46 of 51
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Drawings,
Sheet 18 of 35, delete

"
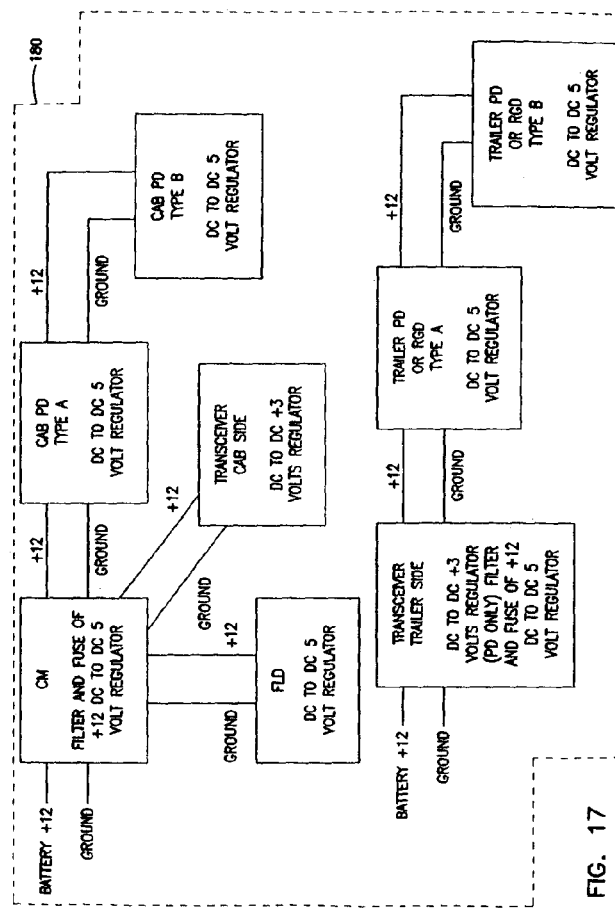
"

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Drawings (cont'd),
and insert
--

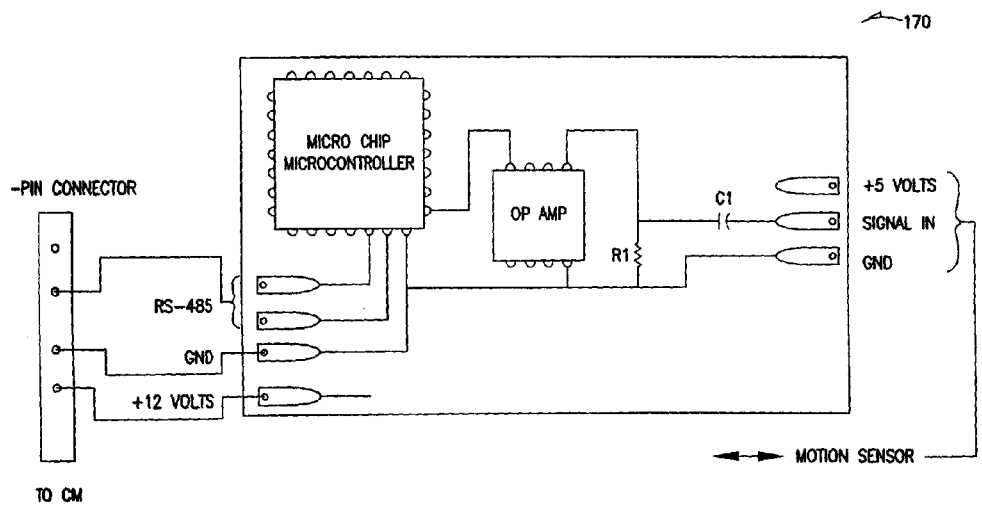

FIG. 17

--, therefor.

UNITED STATES PATENT AND TRADEMARK OFFICE
CERTIFICATE OF CORRECTION

| | |
|---|---|
| PATENT NO. | : 6,268,803 B1 |
| DATED | : July 31, 2001 |
| INVENTOR(S) | : Richard A. Gunderson, Michael A. Parisi, Richard P. Gorman and Kurtis W. Melin |

It is certified that error appears in the above-identified patent and that said Letters Patent is hereby corrected as shown below:

<u>Drawings (cont'd),</u>
Sheet 19 of 35, delete

"

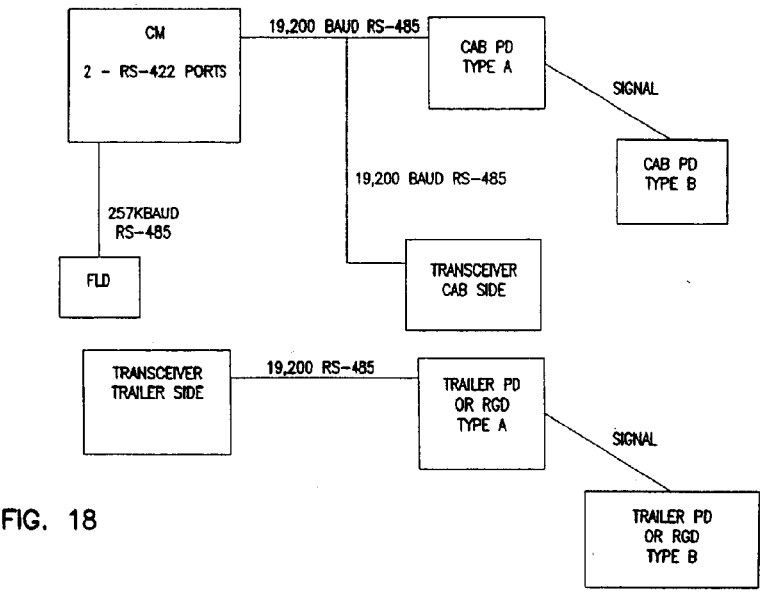

FIG. 18

"

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

Drawings (cont'd),
and insert

--

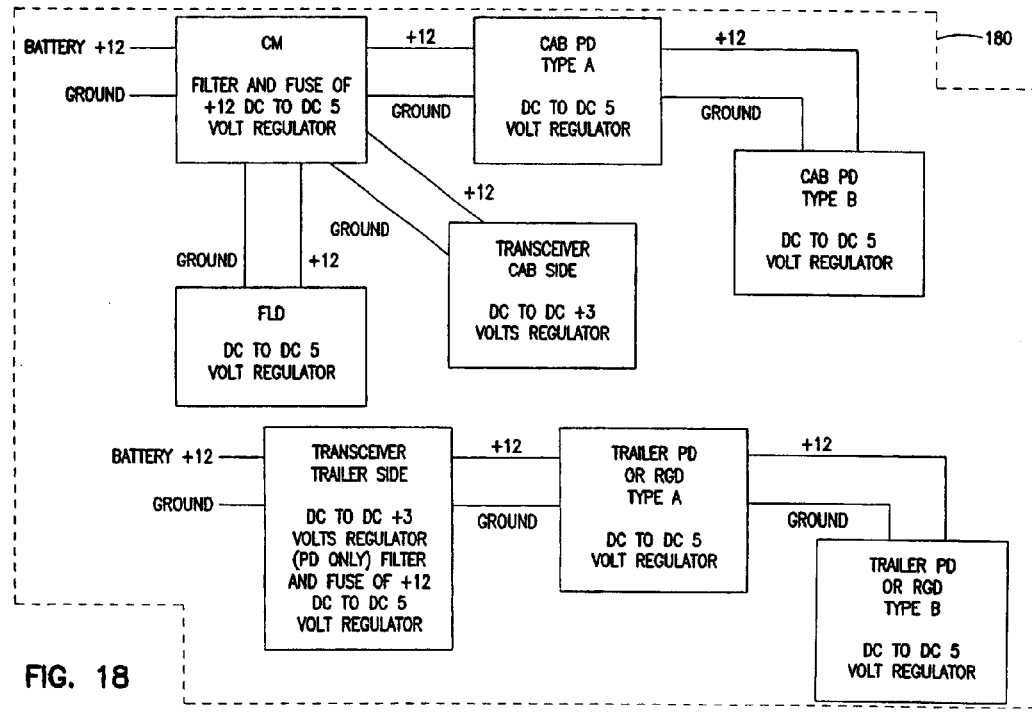

FIG. 18

--, therefor.

UNITED STATES PATENT AND TRADEMARK OFFICE
CERTIFICATE OF CORRECTION

| | | |
|---|---|---|
| PATENT NO. | : 6,268,803 B1 | |
| DATED | : July 31, 2001 | |
| INVENTOR(S) | : Richard A. Gunderson, Michael A. Parisi, Richard P. Gorman and Kurtis W. Melin | |

It is certified that error appears in the above-identified patent and that said Letters Patent is hereby corrected as shown below:

Drawings (cont'd),
Sheet 29 of 35, delete

"

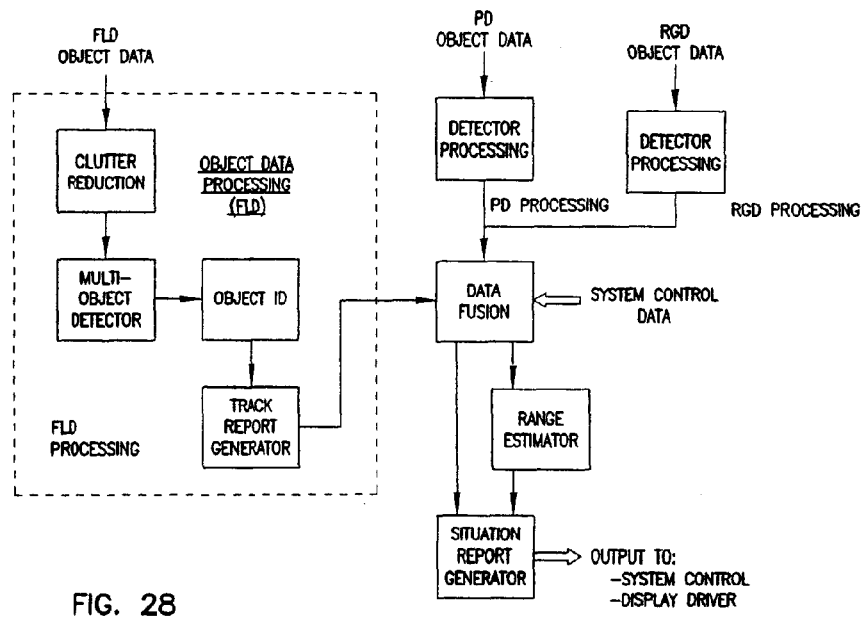

FIG. 28

"

UNITED STATES PATENT AND TRADEMARK OFFICE
CERTIFICATE OF CORRECTION

PATENT NO. : 6,268,803 B1
DATED : July 31, 2001
INVENTOR(S) : Richard A. Gunderson, Michael A. Parisi, Richard P. Gorman and Kurtis W. Melin It is certified that error appears in the above-identified patent and that said Letters Patent is hereby corrected as shown below:

<u>Drawings (cont'd),</u>
and insert
--

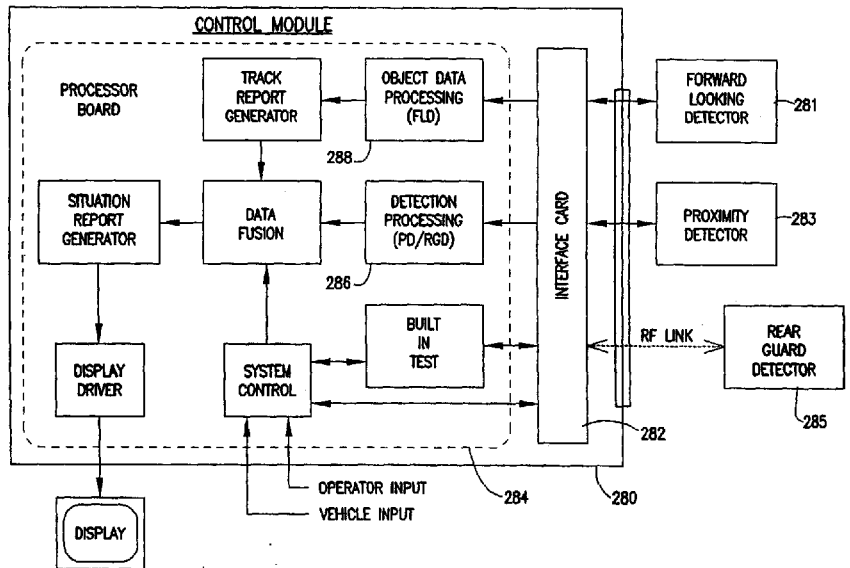

FIG. 28

--, therefor.

Signed and Sealed this

Nineteenth Day of November, 2002

Attest:

JAMES E. ROGAN
*Attesting Officer*    *Director of the United States Patent and Trademark Office*